US011120290B2

(12) United States Patent
Baijal et al.

(10) Patent No.: US 11,120,290 B2
(45) Date of Patent: Sep. 14, 2021

(54) DISPLAY APPARATUS AND OPERATING METHOD OF THE SAME

(71) Applicant: SAMSUNG ELECTRONICS CO., LTD., Suwon-si (KR)

(72) Inventors: Anant Baijal, Suwon-si (KR); Daeeun Hyun, Suwon-si (KR); Mijeong Kwon, Suwon-si (KR); Kangil Chung, Suwon-si (KR); Seungyeon Jeong, Suwon-si (KR); Dongwook Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 120 days.

(21) Appl. No.: 16/545,170

(22) Filed: Aug. 20, 2019

(65) Prior Publication Data
US 2020/0125886 A1    Apr. 23, 2020

(30) Foreign Application Priority Data

Oct. 22, 2018  (KR) .................... 10-2018-0126305
Apr. 23, 2019  (KR) .................... 10-2019-0047516

(51) Int. Cl.
*G06K 9/00* (2006.01)
*G06K 9/46* (2006.01)

(52) U.S. Cl.
CPC ....... *G06K 9/4652* (2013.01); *G06K 9/00536* (2013.01); *G06K 9/00711* (2013.01)

(58) Field of Classification Search
CPC ............ G06K 9/4652; G06K 9/00711; G06K 9/00536; G06K 9/6267; G06F 16/4393;

(Continued)

(56) References Cited

U.S. PATENT DOCUMENTS 7,991,715 B2 *  8/2011  Schiff ............... G06Q 30/0273
                                                       706/20
8,259,192 B2     9/2012  Nair
(Continued)

FOREIGN PATENT DOCUMENTS

AU    2012315625 A1 *  4/2014  ............... G06K 9/66
JP       4160305 B2 * 10/2008  ............... G06K 9/52
(Continued)

OTHER PUBLICATIONS

International Search Report (PCT/ISA/210) and Written Opinion (PCT/ISA/237) dated Dec. 13, 2019, issued by the International Searching Authority in International Application PCT/KR2019/011254.

(Continued)

*Primary Examiner* — Matthew C Bella
*Assistant Examiner* — Kathleen M Broughton
(74) *Attorney, Agent, or Firm* — Sughrue Mion, PLLC

(57) ABSTRACT

A display apparatus includes: a display; a memory storing one or more instructions; and a processor configured to execute the one or more instructions stored in the memory to: select an image to be displayed on the display, classify a category of the image, obtain semantic information of the image according to the category of the image, by using at least one neural network, obtain emotion information corresponding to the image by analyzing the image; determine an audio to be output together with the image, based on the semantic information of the image and the emotion information corresponding to the image, and output the audio while displaying the image.

18 Claims, 41 Drawing Sheets

(58) Field of Classification Search
CPC ...... G06F 16/434; G06F 16/65; G06F 16/686; G06F 16/55; H04N 21/4668; H04N 21/4307; H04N 21/44008; H04N 21/439; H04N 21/44; H04N 21/44213; H04N 21/4508; H04N 21/432; H04N 21/4394; H04N 21/8153; H04N 21/8113; G06N 3/008

See application file for complete search history.

(56) References Cited

U.S. PATENT DOCUMENTS

| | | | |
|---|---|---|---|
| 9,213,747 | B2 | 12/2015 | Cremer et al. |
| 9,283,484 | B1 | 3/2016 | McCarthy |
| 2010/0091138 | A1 | 4/2010 | Nair |
| 2011/0288929 | A1 | 11/2011 | Mei et al. |
| 2016/0125259 | A1* | 5/2016 | Wang ............... G06K 9/4652 382/164 |
| 2017/0092247 | A1 | 3/2017 | Silverstein |
| 2017/0294210 | A1 | 10/2017 | Abramson et al. |
| 2019/0174242 | A1 | 6/2019 | Jin et al. |

FOREIGN PATENT DOCUMENTS

| | | | | |
|---|---|---|---|---|
| KR | 10-2009-0080330 A | | 7/2009 | |
| KR | 10-2013-0110965 A | | 10/2013 | |
| KR | 10-2014-0037439 A | | 3/2014 | |
| KR | 10-2017-0041447 A | | 4/2017 | |
| KR | 20170041447 A | * | 4/2017 | ......... G06F 16/4393 |
| KR | 10-2017-0110473 A | | 10/2017 | |
| KR | 10-2018-0081856 A | | 7/2018 | |

OTHER PUBLICATIONS

Ningning Liu et al., "Visual affective classification by combining visual and text features", PLOS ONE, vol. 12, No. 8, XP055649400, Aug. 29, 2017, pp. 1-21.

Florin Cutzu et al., "Estimating the photorealism of images: Distinguishing paintings from photographs", 2003 IEEE Computer Society Conference on Computer Vision and Pattern Recognition (CVPR'03), vol. 2, IEEE, Los Alamos, CA, XP010644687, Jun. 18, 2003, 8 pages.

Babak Saleh et al., "Large-scale Classification of Fine-Art Paintings: Learning the Right Metric on the Right Feature", XP055649385, May 5, 2015, 22 pages, Retrieved from URL <https://www.researchgate.net/profile/Babak_Saleh/publication/275974573_Large-scale_Classification_of_Fine-Art_Paintings_Learning_The_Right_Metric_on_The_Right_Feature/links/5556123308aeaaff3bf5eca9/Large-scale-Classification-of-Fine-Art-Paintings-Learning-The-Right-Metric-on-The-Right-Feature.pdf>.

Communication dated Dec. 17, 2019 issued by the European Patent Office in counterpart European Application No. 19192057.8.

Anonymous, "Recommending music for affective artworks and photographs", Jun. 2019, ACM ICMR' 19, 9 pages total.

* cited by examiner

FIG. 24
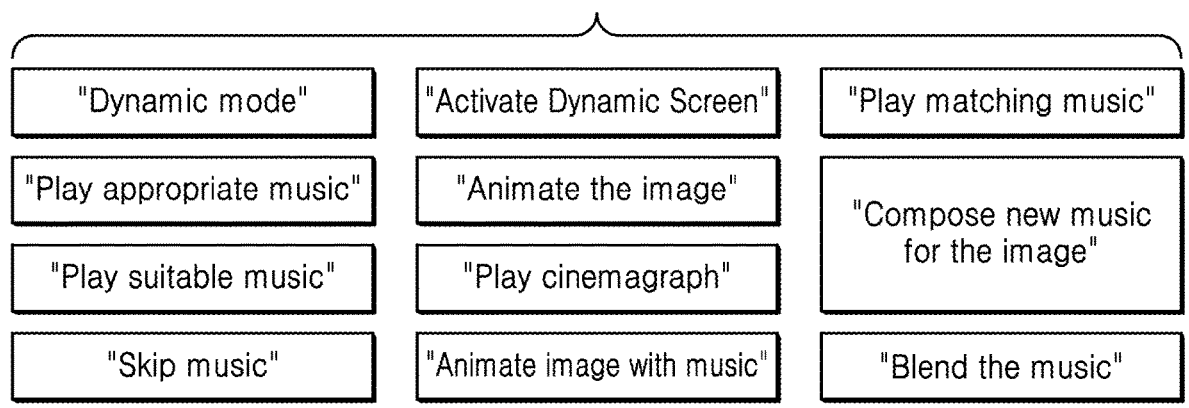
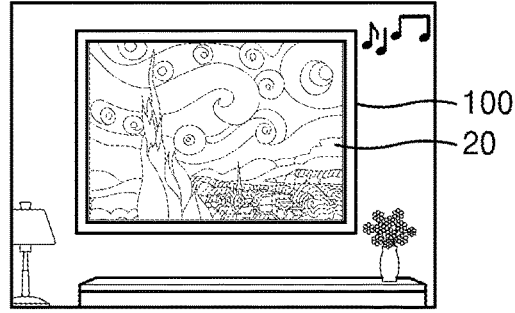

FIG. 27

| | IMAGE EMOTIONAL CONFIGURATION METADATA | SYSTEM METADATA | AUDIO EMOTIONAL CONFIGURATION METADATA | | | |
|---|---|---|---|---|---|---|
| | Image Emotional Configuration | System Metadata | Valence | Tempo | Energy | ... |
| | Calm | Morning | Impressionist | [0.7 – 1] | <0.4 | ... |
| | | Noon Evening | ... | ... | ... | ... |
| | Excited | Morning Noon Evening | ... | ... | ... | ... |
| | Sad | ... | ... | ... | ... | ... |
| | Tired | ... | ... | ... | ... | ... |
| | Relaxed | ... | ... | ... | ... | ... |
| | ... | ... | ... | ... | ... | ... |

2700

DELETE (Calm/Morning row)
ADD (Relaxed row)

FIG. 33
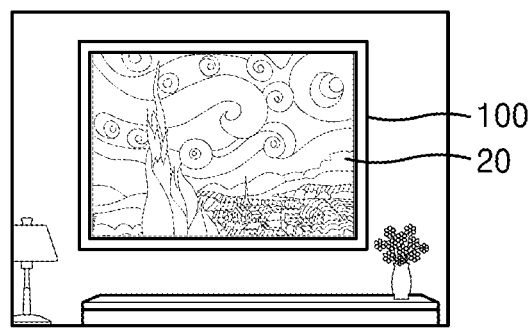
STATIC IMAGE
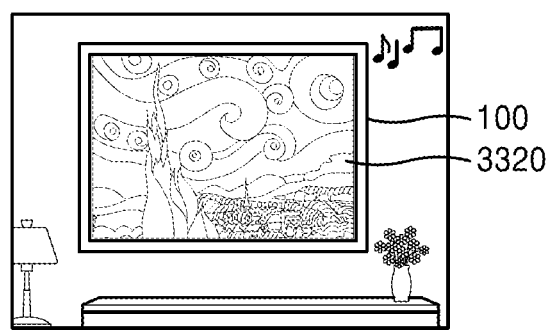
CINEMAGRAPH / GIF IMAGE
SYNCHRONIZED WITH RECOMMENDED AUDIO

DISPLAY APPARATUS AND OPERATING METHOD OF THE SAME

CROSS-REFERENCE TO RELATED APPLICATIONS

This application is based on and claims priority under 35 U.S.C. § 119 to Korean Patent Application No. 10-2018-0126305, filed on Oct. 22, 2018, and Korean Patent Application No. 10-2019-0047516, filed on Apr. 23, 2019, in the Korean Intellectual Property Office, the disclosures of which are incorporated by reference herein in their entireties.

BACKGROUND

1. Field

The disclosure relates to a display apparatus and an operating method of the same, and more particularly, to a display apparatus for providing music adaptively to an image displayed on the display apparatus, and a method of operating the same.

2. Description of Related Art

An image display apparatus displays, on a display, a broadcast which may be selected by the user among broadcast signals transmitted from a broadcast station. A digital broadcast denotes a broadcast transmitting a digital image and a voice signal. Also, the digital broadcast enables a bi-directional service.

A smart television (TV) provides various types of content in addition to a digital broadcasting function. The smart TV aims at analyzing and providing what the user desires without the user's manipulation, rather than being manually operated according to the user's selection.

An artificial intelligence (AI) system is a computer system realizing human-level intelligence and is a system in which a machine trains itself, decides, and becomes smarter, unlike an existing rule-based smart system.

SUMMARY

Provided are a display apparatus for maximizing the aesthetic experience of a user by recommending or determining audio adaptively to an image while the display apparatus is displaying the image and providing audio similar to an impression of the image together with image display, and an operating method of the display apparatus.

Additional aspects will be set forth in part in the description which follows and, in part, will be apparent from the description, or may be learned by practice of the presented embodiments of the disclosure.

In accordance with an aspect of the disclosure, a display apparatus includes: a display; a memory storing one or more instructions; and a processor configured to execute the one or more instructions stored in the memory to: select an image to be displayed on the display; classify a category of the image and obtain semantic information of the image according to the classified category of the image, by using at least one neural network; obtain emotion information corresponding to the image by analyzing the image; determine audio to be output together with the image, based on the semantic information of the image and the emotion information corresponding to the image; and output the determined audio while displaying the selected image.

The processor may be further configured to execute the one or more instructions to: extract a feature from the image; determine whether the category of the image is a photograph or an artwork by using the feature of the image; in response to the category of the image being a photograph, obtain the semantic information by determining at least one semantic style among a plurality of semantic styles corresponding to the photograph; and in response to the category of the image being an artwork, obtain the semantic information by determining at least one semantic style among a plurality of semantic styles corresponding to the artwork.

The processor may be further configured to execute the one or more instructions to: obtain audio semantic metadata corresponding to the semantic information of the image by using a metadata table corresponding to the semantic information of the image; obtain audio emotion metadata corresponding to the emotion information of the image by using a metadata table corresponding to the emotion information of the image; and determine the audio to be output together with the selected image, based on the audio semantic metadata and the audio emotion metadata.

The processor may be further configured to execute the one or more instructions to transmit the audio semantic metadata and the audio emotion metadata to a music service providing server and receive the audio determined based on the audio semantic metadata and the audio emotion metadata from the music service providing server.

The processor may be further configured to execute the one or more instructions to: configure sound based on the audio semantic metadata and the audio emotion metadata; and blend the configured sound with the determined audio.

The processor may be further configured to execute the one or more instructions to: obtain user interaction information about reaction to the image displayed on the display and the output audio; and update at least one of the metadata table corresponding to the semantic information or the metadata table corresponding to the emotion information by using the user interaction information.

The processor may be further configured to execute the one or more instructions to: receive a manual selection of a user with respect to the audio to be output together with the selected image; extract metadata of the audio manually selected by the user; and update at least one of the metadata table corresponding to the semantic information or the metadata table corresponding to the emotion information by using metadata of the image and the metadata of the audio manually selected with respect to the image.

The processor may be further configured to execute the one or more instructions to: obtain system metadata including environment information around the display apparatus; and determine the audio further based on the system metadata together with the semantic information and the emotion information.

The system metadata may include at least one of a place where the display apparatus is installed, the weather of the place where the display apparatus is installed, or a time when the image is output.

The processor may be further configured to execute the one or more instructions to: obtain user interaction information about reaction to the image displayed on the display and the output audio; and update the audio further based on the user interaction information together with the semantic information and the emotion information.

The processor may be further configured to execute the one or more instructions to: extract a feature of the image and process the determined audio based on the extracted feature of the image, or extract a feature of the determined audio and process the image based on the extracted feature of the audio.

In accordance with an aspect of the disclosure, an operating method of a display apparatus, the operating method includes: selecting an image to be displayed on a display; classifying a category of the image, obtaining semantic information of the image according to the classified category of the image, and obtaining emotion information corresponding to the image by analyzing the image, by using at least one neural network; determining audio to be output together with the image, based on the semantic information of the image and the emotion information corresponding to the image; and outputting the determined audio while displaying the selected image.

In accordance with an aspect of the disclosure, a computer program product includes a computer-readable recording medium having recorded thereon a program for executing an operating method of a display apparatus, wherein the operating method includes: selecting an image to be displayed on a display; classifying a category of the image, obtaining semantic information of the image according to the classified category of the image, and obtaining emotion information corresponding to the image by analyzing the image, by using at least one neural network; determining audio to be output together with the image, based on the semantic information of the image and the emotion information corresponding to the image; and outputting the determined audio while displaying the selected image.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 24 is a diagram showing an example of a user interaction method for a display apparatus, according to an embodiment;

FIG. 27 is a diagram of a method of reflecting user interaction information on an image-audio emotional configuration association table, according to an embodiment;

FIG. 33 is a diagram of an example of cinemagraphing a static image, according to an embodiment;

DETAILED DESCRIPTION

Figure 1:
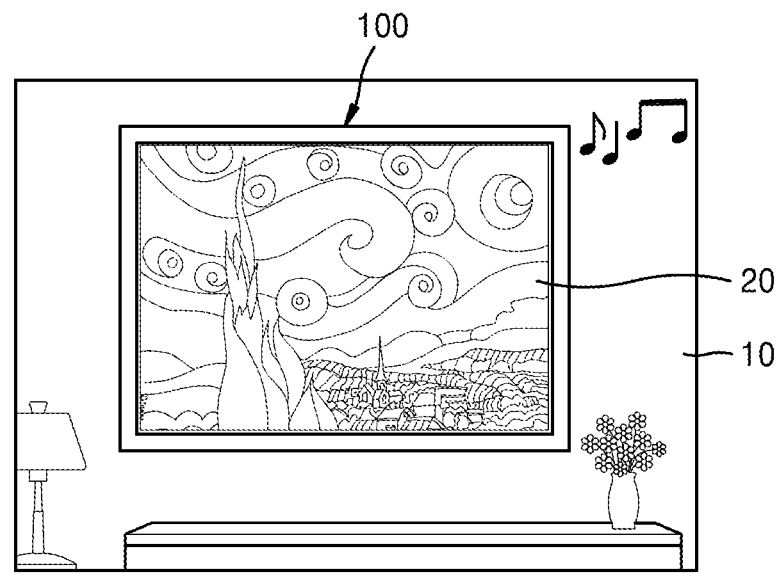
FIG. 1 is an illustration of a display apparatus, having an ambient mode or a frame mode according to an embodiment.

The terms used in the specification will be briefly defined, and the disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

One or more embodiments will now be described more fully with reference to the accompanying drawings. However, one or more embodiments may be embodied in many different forms, and should not be construed as being limited to the embodiments set forth herein. In the following description, well-known functions or constructions are not described in detail because they would obscure one or more embodiments with unnecessary detail, and like reference numerals in the drawings denote like or similar elements throughout the specification.

Throughout the disclosure, the expression "at least one of a, b or c" indicates only a, only b, only c, both a and b, both a and c, both b and c, all of a, b, and c, or variations thereof.

In one or more embodiments, the term "user" denotes a person who controls a function or operation of an image display apparatus by using a control device, and may include a viewer, an administrator, or an installation engineer.

A digital screen or a digital television (DTV) may provide an added value and improve the aesthetic experience by complementing a consumer's lifestyle through decorative content, such as a personal photograph, an artwork, weather forecast, weather information, or music playing in the background. Such a function may be provided in an exclusive screen mode called an 'ambient mode' or a 'frame mode'.

According to embodiments, the aesthetic experience is made naturally by using the technical capability of a 'screen' to appeal to human vision and audition. A dynamic screen intends to increase and enhance recognition to both vision and audition by providing a distinctive service to customers through an image and sound that are aesthetically 'combined'.

Embodiments relate to perceptual multimedia analysis, perceptual multimedia recommendation, perceptual multimedia synthesis, and perceptual multimedia processing. The term 'multimedia' is applied to both image and sound/audio domains. In particular, the embodiments are on an intersection of an image area and a sound area, and connect the image area to the sound area through various creative implementations that add value to consumer products and improve people's lives. A concept according to the embodiments may also be referred to as a 'dynamic screen.'

As the AI system is used, a recognition rate is increased and the AI system may further accurately understand the user's taste.

AI technology includes machine learning (deep learning) and element technologies using machine learning. Machine learning is an algorithm technology that classifies and learns features of input data by its own, and includes technical fields, such as linguistic understanding, visual understanding, deduction or prediction, knowledge representation, and operation control, using a machine learning algorithm as such as deep learning.

Knowledge representation is a technology for automatically processing experience information into knowledge data and includes knowledge building (data generation or classification), knowledge management (data application), and the like. Operation control is technology for controlling automatic driving of a vehicle or movement of a robot, and includes movement control (navigation, collision avoidance, driving) or manipulation control (behavior control).

A wall-mounted TV may be used to improve an interior design of an environment where a TV is installed and a frame type TV may provide aesthetics of a picture frame.

FIG. 1 is a diagram of a display apparatus having an ambient mode or a frame mode according to embodiments.

Referring to FIG. 1, a display apparatus 100 is provided on a wall surface 10. The display apparatus 100 according to an embodiment may display one or more images 20 by using a display of the display apparatus 100 in a state other than a normal operation mode of the display apparatus 100 displaying content according to an input of a user. For example, the display apparatus 100 may display a background image of the wall surface 10, display weather information, display personal photographs of the user, or display an artwork on the display, in an ambient mode. Also, when a photograph or an artwork to be displayed on the display in the ambient mode is to be selected, the display apparatus 100 may self-select the photograph or the artwork or may receive a selection from the user. The display apparatus 100 may further enhance the experience of the user by providing audio suitable for the displayed photograph or artwork, while displaying the photograph or artwork. Because the auditory experience coupled with the visual experience may maximize the display experience of the user, an audio such as music or sound, which best fits the image displayed on the display apparatus 100 may be provided.

Figure 2:
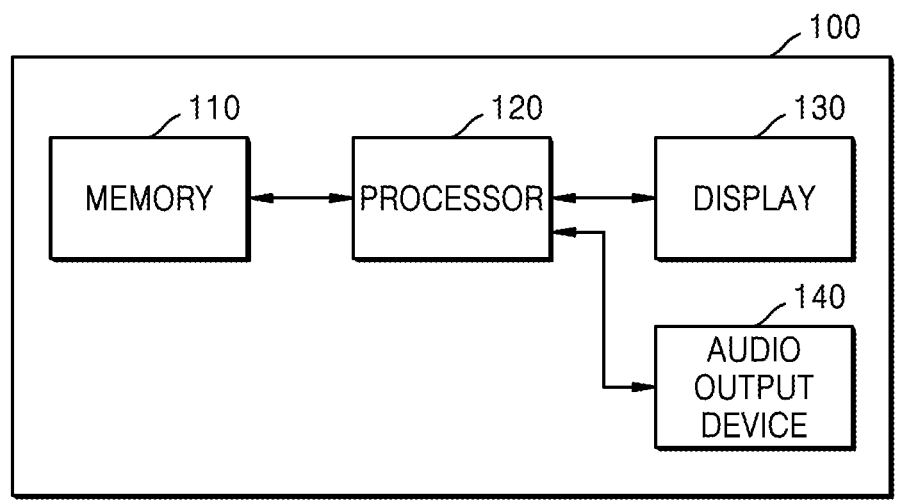
FIG. 2 is a block diagram of a configuration of a display apparatus, according to an embodiment.

FIG. 2 is a block diagram of a configuration of a display apparatus 100, according to an embodiment.

Referring to FIG. 2, the display apparatus 100 may include a memory 110, a processor 120, a display 130, and an audio output device 140. However, the display apparatus 100 may be include more components than those shown in FIG. 2, and is not limited to the above.

The memory 110 according to an embodiment may store a program for processes and controls of the processor 120 and may store data input to or output from the display apparatus 100.

The memory 110 may include a storage medium of at least one type from among a flash memory type, a hard disk type, a multimedia card micro type, a card type memory (for example, a secure digital (SD) or extreme digital (XD) memory), random access memory (RAM) type, static random access memory (SRAM) type, read-only memory (ROM) type, electrically erasable programmable read-only memory (EEPROM) type, programmable read-only memory (PROM) type, a magnetic memory type, a magnetic disk type, or an optical disk type.

The processor 120 according to an embodiment may analyze a feature of an image displayed on the display 130, obtain audio corresponding to the feature of the image, and output the audio, by using a training model using at least one neural network.

According to an embodiment, the processor 120 may control the above operations to be performed by executing one or more instructions stored in the memory 110. In this case, the memory 110 may store one or more instructions executable by the processor 120.

According to an embodiment, the processor 120 may store the one or more instructions in a memory provided therein and control the above operations to be performed by executing the one or more instructions stored in the memory provided therein. In other words, the processor 120 may perform a certain operation by executing at least one instruction or program stored in the memory 110 or in an internal memory provided in the processor 120.

The processor 120 controls all operations of the display apparatus 100. For example, the processor 120 may control the display 130 and perform functions of the display apparatus 100 shown in FIGS. 1 through 14 by executing the one or more instructions stored in the memory 110.

Also, in FIG. 2, one processor 120 is shown, but a plurality of processors may be provided. In this case, operations performed by a display apparatus according to an embodiment may each be performed by at least one of the plurality of processors.

The processor 120 according to an embodiment may obtain image metadata of an image to be displayed on the display 130, obtain audio metadata corresponding to the image metadata, determine audio to be output with the image based on the obtained audio metadata, and output the determined audio while displaying the image, by using the at least one neural network. The processor 120 may extract a feature of the image, classify a category of the image by using the extracted feature, and obtain semantic information of the image according to the classified category of the image. The category of the image may include, for example, a photograph or an artwork. In other words, a semantic style corresponding to a photograph category and a semantic style corresponding to an artwork category exist distinguishably. The processor 120 may obtain emotion information of the image by analyzing the image.

As such, the audio may be further adaptively and elaborately determined by classifying the category of the image, obtaining the semantic information according to the classified category, and determining the audio by using the semantic information while determining the audio suitable for the image to be displayed on the display apparatus 100. For example, by differentiating semantic information obtained when the image is a photograph and semantic information obtained when the image is an artwork, the audio further suitable for the category of the image may be determined.

According to an embodiment, the processor 120 may obtain audio semantic information and audio emotion information respectively corresponding to image semantic information and image emotion information of the image by using an image-audio semantic association table and an image-audio emotional configuration association table, and determine audio corresponding to the audio semantic information and the audio emotion information.

According to an embodiment, the processor 120 may further reflect system metadata including environment information of the display apparatus 100 to the image-audio semantic association table and the image-audio emotional configuration association table.

As such, the audio may be further adaptively and elaborately determined by further using the environment information of the display apparatus 100 while determining the audio suitable for the image to be displayed on the display apparatus 100. For example, even for the same image, the audio may be differently determined based on whether a time when the image is displayed on the display apparatus 100 is morning or evening, and thus the audio may be further suitably determined for an environment in which the image is output.

According to an embodiment, the processor 120 may further reflect user interaction information about reaction to the image displayed on the display 130 and the output audio recommended for the image to the image-audio semantic association table and the image-audio emotional configuration association table.

As such, the audio may be further adaptively and elaborately determined by further using the user interaction information while determining the audio suitable for the image to be displayed on the display apparatus 100. For example, even for the same image, audio similar to that determined with respect to the image may be further recommended when the reaction of the user is positive, and recommendation of the audio similar to that determined with respect to the image may be restricted when the reaction of the user is negative.

According to an embodiment, the processor 120 may perform an aesthetic process on the image to be displayed on the display 130 by using a feature of the determined audio, or may perform an aesthetic process on the audio to be output through the audio output device 140 by using a feature of the image.

As such, by performing the aesthetic process on the image to be displayed on the display 130 by using the feature of the determined audio or by performing the aesthetic process on the audio to be output through the audio output device 140 by using the feature of the image, the image or audio may be provided to further reinforce a synergy effect regarding an interaction of the audio and the image.

When the display 130 includes a touch screen, the display 130 may be used as an input device in addition to an output device. For example, the display 130 may include at least one of a liquid crystal display, a thin film transistor-liquid crystal display, an organic light-emitting diode display, a flexible display, a 3D display, or an electrophoretic display. The display apparatus 100 may include at least two displays 130 according to a type of the display apparatus 100.

The audio output device 140 may output the audio determined adaptively for the image while the image is displayed on the display 130. The audio may include music, sound, voice, and the like.

Figure 3:
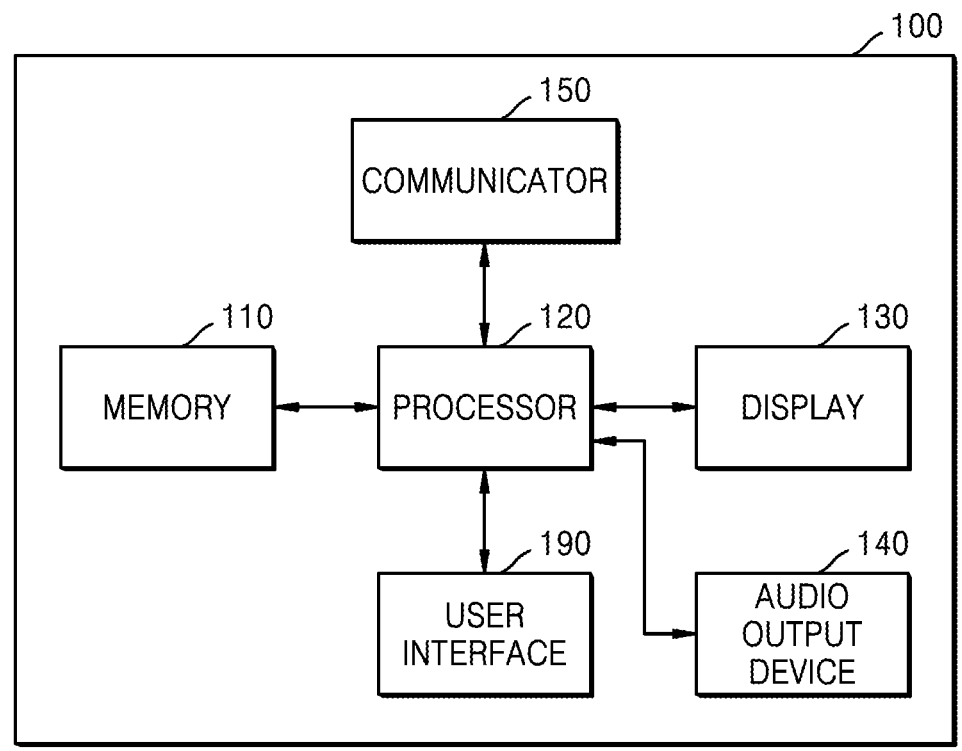
FIG. 3 is a block diagram of a configuration of a display apparatus, according to an embodiment.

FIG. 3 is a block diagram of a configuration of a display apparatus 100, according to an embodiment.

In FIG. 3, components that are the same as those of FIG. 2 are shown with the same reference numerals. Accordingly, descriptions previously given with reference to FIGS. 1 and 2 are omitted from the description of the display apparatus 100. Referring to FIG. 3, the display apparatus 100 may further include a communicator 150 and a user interface 190.

The communicator 150 may communicate with external devices through a wired or wireless network. The communicator 150 may transmit or receive data to or from the external device connected through the wired or wireless network, according to control of the processor 120. The external device may be a music service providing server, an electronic device, or the like, which provides audio recommended to the display apparatus 100.

According to an embodiment, the communicator 150 may transmit the image metadata or audio metadata corresponding to the image to be displayed on the display 130 to the external device, and receive information about the audio corresponding to the image metadata or audio metadata from the external device by using a wired or wireless network.

The communicator 150 includes at least one communication module, such as a short distance communication module, a wired communication module, a mobile communication module, and a broadcast receiving module. At least one communication module indicates a communication module capable of performing data transmission and reception through a network using a communication technology, such as Bluetooth, wireless local area network (WLAN), Wi-Fi, wireless broadband (Wibro), world interoperability for microwave access (Wimax), code division multiple access (CDMA), wideband code division multiple access (WCDMA), or the like, or a tuner, which performs broadcasting reception.

The user interface 190 may receive a user input for controlling the display apparatus 100. The user interface 190 may include a user input device including a touch panel detecting a touch of the user, a button receiving a push operation of the user, a wheel receiving a rotation operation of the user, a keyboard, a dome switch, or the like, but is not limited thereto. Also, when the display apparatus 100 is manipulated by a remote controller, the user interface 190 may receive a control signal from the remote controller.

According to an embodiment, the user interface 190 may receive a user interaction reacting to the audio being output while the image is displayed on the display 130. Alternatively, the user interface 190 may receive a user input of selecting audio to be output while the image is displayed on the display 130. The user interaction or a manual input of the user received through the user interface 190 may be used for an update operation of the audio output while the image is displayed on the display 130.

Figure 4:
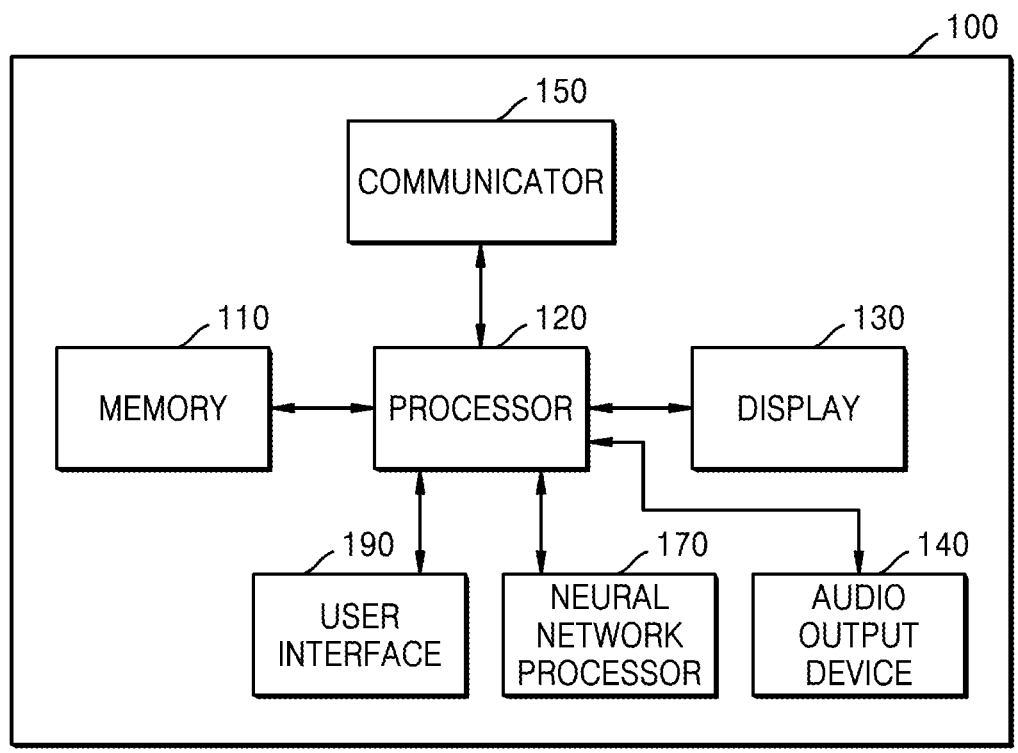
FIG. 4 is a block diagram of a configuration of a display apparatus, according to an embodiment.

FIG. 4 is a block diagram of a configuration of a display apparatus 100, according to an embodiment.

In FIG. 4, components that are the same as those of FIG. 3 are shown with the same reference numerals. Accordingly, descriptions previously given with reference to FIGS. 1 through 3 are omitted from the description of the display apparatus 100.

Referring to FIG. 4, the display apparatus 100 may further include a neural network processor 170.

In the display apparatus 100, the processor 120 performs an operation of controlling a certain operation to be performed by performing an operation through a neural network. The display apparatus 100 according to an embodiment may include the neural network processor 170 that is a separate processor to perform an operation through a neural network.

The neural network processor 170 may perform the operation through the neural network. According to an embodiment, the neural network processor 170 may perform the operation through the neural network by executing one or more instructions.

The neural network processor 170 may obtain audio metadata corresponding to a certain image by performing the operation through the neural network. For example, the neural network processor 170 may obtain audio semantic metadata and audio emotion metadata related to an image to be displayed on the display 130 by performing the operation through the neural network.

Figure 5:
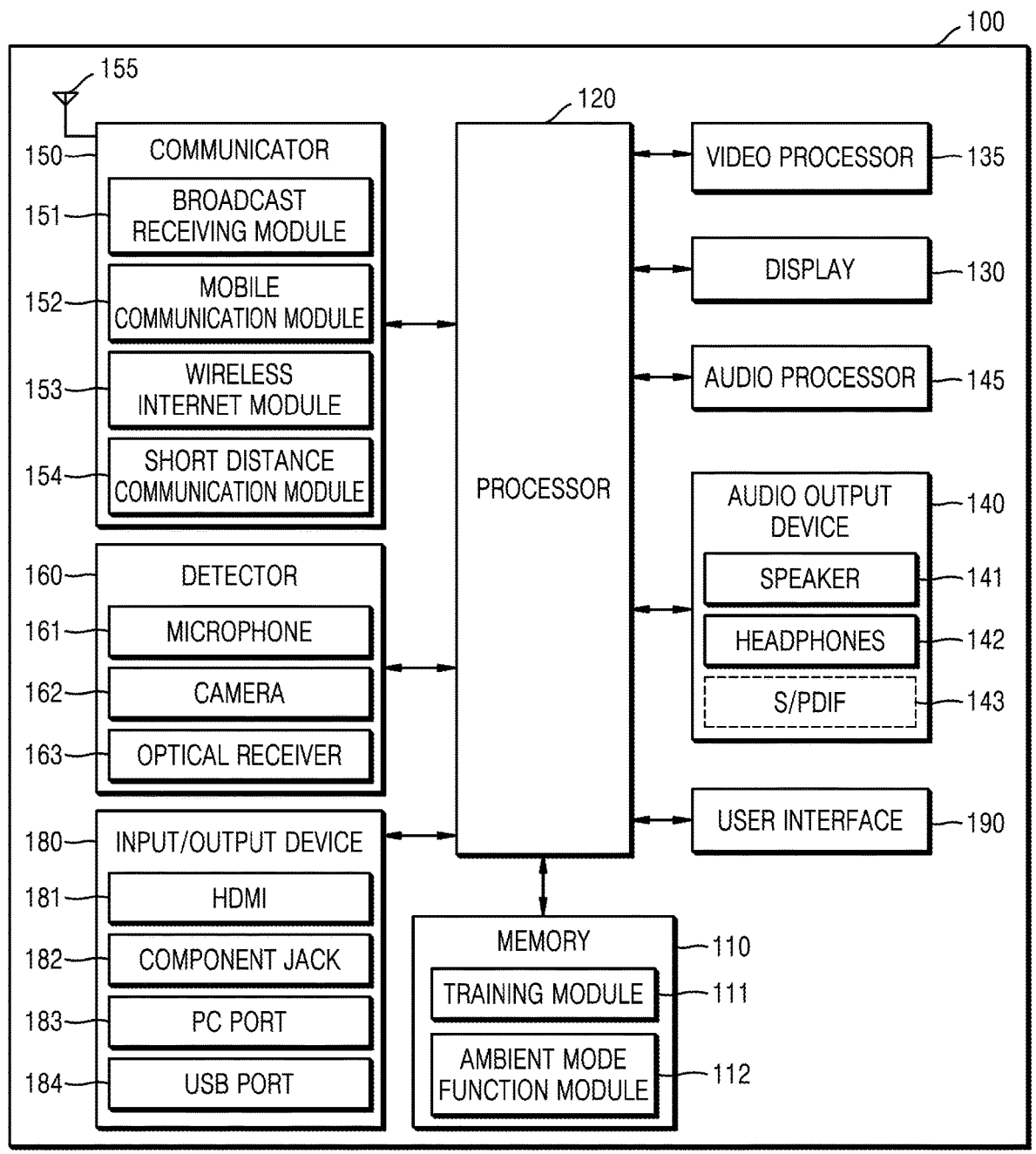
FIG. 5 is a block diagram of a configuration of a display apparatus, according to an embodiment.

FIG. 5 is a block diagram of a configuration of a display apparatus 100 according to an embodiment.

Referring to FIG. 5, the display apparatus 100 may further include an antenna 155, the communicator 150, a detector 160, an input/output device 180, a video processor 135, an audio processor 145, the audio output device 140, and a user interface 190, in addition to the memory 110, the processor 120, and the display 130.

The memory 110, the processor 120, and the display 130 are the same as those described above, and the descriptions previously provided with reference to FIGS. 1 through 4 are omitted from the description of the display apparatus 100 of FIG. 5.

The communicator 150 may connect the display apparatus 100 to an external device (for example, an audio device or the like) according to control of the processor 120. The processor 120 may transmit or receive content to or from the external device connected to the communicator 150, or download or browse an application from the external device.

The antenna 155 receives a signal transmitted from another device or transmits a signal to the other device. One antenna 155 is illustrated in FIG. 5, but a plurality of antennas may be provided. Thus, the display apparatus 100 according to the disclosure may support a multiple-input multiple-output (MIMO) system.

The communicator 150 may include one or more modules enabling wireless communication between the display apparatus 100 and a wireless communication system or between the display apparatus 100 and a network where another electronic device is located. For example, the communicator 150 may include a broadcast receiving module 151, a mobile communication module 152, a wireless Internet module 153, and a short distance communication module 154. The communicator 150 may be referred to as a transceiver.

The broadcast receiving module 151 receives a broadcast signal and/or information related to a broadcast from an external broadcast management server through a broadcast channel. The broadcast signal may include a TV broadcast signal, a radio broadcast signal, a data broadcast signal, a broadcast signal in which a data broadcast signal is combined with a TV broadcast signal or a radio broadcast signal.

The mobile communication module 152 transmits or receives a wireless signal to or from at least one of a base station, an external terminal, or a server on a mobile communication network. The wireless signal may include various types of data according to a voice call signal, a video call signal, or a text/multimedia message transmission or reception.

The wireless Internet module 153 denotes a module for wireless Internet access, and may be provided inside or outside the display apparatus 100. WLAN, Wi-Fi, Wibro, Wimax, or high speed downlink packet access (HSDPA) may be used as a wireless Internet technology. The display apparatus 100 may be connected to another device in a Wi-Fi peer-to-peer (P2P) standard through the wireless Internet module 153. A streaming service may be provided between the display apparatus 100 and the other device through such Wi-Fi P2P connection.

The short distance communication module 154 denotes a module for short distance communication. Bluetooth, radio frequency identification (RFID), infrared data association (IrDA), ultra-wideband (UWB), or ZigBee may be used as a short distance communication technology.

The communicator 150 according to an embodiment may receive a training model using at least one neural network from an external server. The communicator 150 may transmit audio metadata obtained as a result of analyzing the image to find audio suitable for the image to be displayed on the display 130 to the external server, and receive information about audio recommended according to the audio metadata from the external server in response.

The detector 160 detects voice of the user, an image of the user, or an interaction of the user, and may include a microphone 161, a camera 162, and/or an optical receiver 163.

The microphone 161 receives voice uttered by the user. The microphone 161 may convert the received voice into an electric signal and output the electric signal to the processor 120.

The camera 162 may receive an image (for example, consecutive frames) corresponding to motion of the user including a gesture within a camera recognition range.

The optical receiver 163 receives an optical signal (including a control signal) received from a remote controller. The optical receiver 163 may receive an optical signal corresponding to a user input (for example, touching, pressing, touching gesture, voice, or motion) from the remote controller. The control signal may be extracted from the received optical signal according to control of the processor 120.

According to an embodiment, a user interaction reacting to audio output while the image is displayed on the display 130 may be received through at least one of the microphone 161, the camera 162, or the optical receiver 163. For example, the user interaction may include at least one of utterance of the user's voice using the microphone 161, a user gesture using the camera 162, or the control signal from the remote controller using the optical receiver 163. User interaction information received as such may be used for an updating operation of the audio output while the image is displayed.

The input/output device 180 receives video (for example, a moving image or the like), audio (for example, voice, music, or the like), and additional information (for example, an electronic program guide (EPG) or the like) from outside the display apparatus 100, according to control of the processor 120. The input/output device 180 may include one of a high-definition multimedia interface (HDMI) port 181, a component jack 182, a personal computer (PC) port 183, and a universal serial bus (USB) port 184. The input/output device 180 may include a combination of the HDMI port 181, the component jack 182, the PC port 183, and the USB port 184.

The memory 110 according to an embodiment may store a program for processing and control of the processor 120 and may store data input to or output from the display apparatus 100. The memory 110 may store data required for operations of the display apparatus 100.

Programs stored in the memory 110 may be classified into a plurality of modules based on functions. The memory 110 may store at least one program for performing a certain operation by using a neural network. For example, the at least one program stored in the memory 110 may be a training module 111 and/or an ambient mode function module 112.

The training module 111 may include a training model determined by learning a method of obtaining at least one of the audio metadata or the image metadata corresponding to a plurality of training images, in response to the plurality of training images input to the at least one neural network. The training model may be received from an external server, and the received training model may be stored in the training module 111.

The ambient mode function module 112 may include one or more instructions for obtaining image metadata of the image to be displayed on the display 130, obtaining audio metadata corresponding to the image metadata, determining audio to be output with the image, based on the obtained audio metadata, and outputting the determined audio while displaying the image, by using the at least one neural network.

The ambient mode function module 112 may include one or more algorithms for determining the audio most suitable for and adaptive to the image while determining the audio to be output while displaying the image. Also, one or more programs for performing certain operations by using the neural network or one or more instructions for performing certain operations by using the neural network may be stored in an internal memory included in the processor 120.

The processor 120 controls all operations of the display apparatus 100 and signal flow between internal components of the display apparatus 100, and processes data. The processor 120 may execute an operation system (OS) and various applications stored in the memory 110 when a pre-set and stored condition is satisfied or when there is a user input.

The processor 120 may include the internal memory. In this case, at least one of the data, the program, or the instruction stored in the memory 110 may be stored in the internal memory of the processor 120. For example, the internal memory of the processor 120 may store one or more programs for performing certain operations by using the neural network or one or more instructions for performing certain operations by using the neural network.

The video processor 135 may process data of the image to be displayed on the display 130 and may perform various image processing operations, such as decoding, rendering, scaling, noise filtering, frame rate converting, and resolution converting, on the data of the image.

The display 130 may display, on a screen, a video in a broadcast signal received through a communicator 150, according to control of the processor 120. The display 130 may display content (for example, a moving image) input through the communicator 150 or the input/output device 180. The display 130 may output an image stored in the memory 110 according to control of the processor 120.

The audio processor 145 processes audio data. The audio processor 145 may perform various processes, such as decoding, amplifying, noise filtering, and the like, on the audio data.

The audio output device 140 may output audio in the broadcast signal received through the communicator 150, audio input through the communicator 150 or the input/output device 180, and audio stored in the memory 110, according to control of the processor 120. The audio output device 140 may include at least one of a speaker 141, headphones 142, or a Sony/Phillips digital interface (S/PDIF) 143 that is an output terminal.

The user interface 190 denotes a unit into which the user inputs data for controlling the display apparatus 100. For example, the user interface 190 may include a keypad, a dome switch, a touch pad, a jog wheel, a jog switch, or the like, but is not limited thereto.

The user interface 190 may be a component of a remote controller or a component of the display apparatus 100.

The user interface 190 according to an embodiment may receive a user input reacting to the audio output while the image is displayed on the display 130. For example, when the user interface 190 is configured as a keypad or a dome switch, the user may control reproducing of one or more pieces of audio via an input of clicking or pressing a key for skipping or re-reproducing an audio track currently output, or via an input of clicking or pressing a direction key, but is not limited thereto.

Meanwhile, the block diagrams of the display apparatus 100 of FIGS. 2 through 5 are block diagrams for embodiments. At least one component in the block diagrams may be combined or omitted, or another component may be added, according to the specifications of the display apparatus 100. For example, two or more components may be combined into one component or one component may be divided into two or more components as required. A function performed in each block is for describing an embodiment of the disclosure, and a specific operation or device thereof does not limit the scope of the disclosure.

Figure 6:
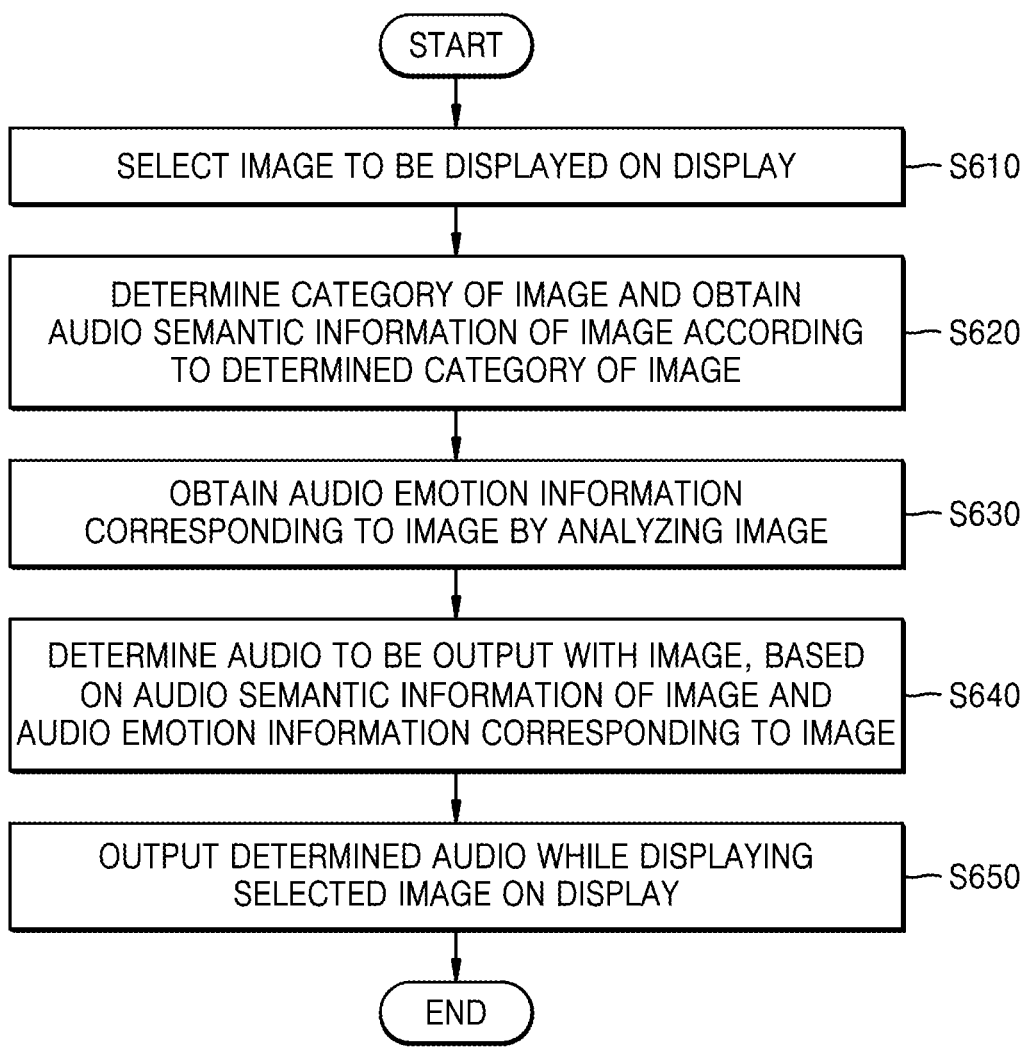
FIG. 6 is a flowchart of a method of determining audio adaptively according to an image displayed on a display and outputting the audio, according to an embodiment.

FIG. 6 is a flowchart of a method of, performed by a display apparatus 100, determining audio adaptively according to an image displayed on a display and outputting the audio, according to an embodiment.

Referring to FIG. 6, in operation S610, the display apparatus 100 may select an image to be displayed on the display. For example, the display apparatus 100 may select the image to be displayed on the display when operating in a functional mode referred to as an ambient mode, a frame mode, an information mode, or the like, other than a general operation mode in which a user selects and views general content. The image to be displayed on the display may be variously determined, for example, may be selected by the user or may be self-determined by the display apparatus 100. The image to be displayed on the display may include a photograph, an artwork, or other various graphic images.

In operation S620, the display apparatus 100 may determine a category of the selected image and obtain audio semantic information according to the determined category of the image.

According to an embodiment, the display apparatus 100 may classify the category of the image based on whether the image is a photograph or an artwork. However, the category of the image is not limited to a photograph or an artwork, and for example, a graphic image may also be classified as a separate category.

According to an embodiment, the display apparatus 100 may determine a style of the image according to the classified category of the image. For example, when the category of the image is a photograph, semantic information about whether the photograph is related to nature or a person, and whether the photograph is related to a trip when the photograph is related to nature or related to a family when the photograph is related to a person, may be determined based on an object and a background shown in the photograph. For example, when the category of the image is an artwork, semantic information about an era of the artwork, a genre of the artwork, and an expressing method of the artwork may be determined. As such, because the semantic information derivable based on whether the image is the photograph or the artwork may vary, the display apparatus 100 may determine the category of the image.

According to an embodiment, the display apparatus 100 may obtain audio semantic information corresponding to determined image semantic information, by using an image-audio association semantic metadata table. The image-audio association semantic metadata table is a table in which semantic metadata of an image and semantic metadata of audio are associated with each other.

According to an embodiment, system metadata may be further associated in the image-audio association semantic metadata table.

According to an embodiment, the image-audio association semantic metadata table may be updated by reflecting user interaction information.

In operation S630, the display apparatus 100 may obtain audio emotion information corresponding to the image by analyzing the image.

According to an embodiment, the display apparatus 100 may obtain image emotion information by analyzing the image.

According to an embodiment, the display apparatus 100 may obtain audio emotion information corresponding to determined image emotion information, by using an image-audio association emotion metadata table. The image-audio association emotion metadata table is a table in which emotion metadata of an image and emotion metadata of audio are associated with each other.

According to an embodiment, the system metadata may be further associated in the image-audio association emotion metadata table.

According to an embodiment, the image-audio association emotion metadata table may be updated by reflecting the user interaction information.

In operation S640, the display apparatus 100 may determine audio to be output with the image based on the audio semantic information of the image and the audio emotion information corresponding to the image.

According to an embodiment, the display apparatus 100 may self-determine the audio based on the audio semantic information and the audio emotion information, or may provide the audio semantic information and the audio emotion information to an external music service providing server and receive information about recommended audio from the external music service providing server.

In operation S650, the display apparatus 100 may output the determined audio while displaying the selected image on the display.

According to an embodiment, the display apparatus 100 may perform a multimedia aesthetic process on the selected image, and output the image.

According to an embodiment, the display apparatus 100 may perform a multimedia aesthetic process on the determined audio, and output the audio.

According to an embodiment, the display apparatus 100 may perform an audio-based image process on the selected image by using a feature of the determined audio, and output the image.

According to an embodiment, the display apparatus 100 may perform an image-based audio process on the determined audio by using a feature of the selected image, and output the audio.

According to an embodiment, when the display apparatus 100 received a user interaction from the user reacting to the image and the audio output in the ambient mode, the display apparatus 100 may use the user interaction information to update the audio. For example, the user interaction information may be used to update at least one of image-audio association semantic metadata table or the image-audio association emotion metadata table.

Figure 7:
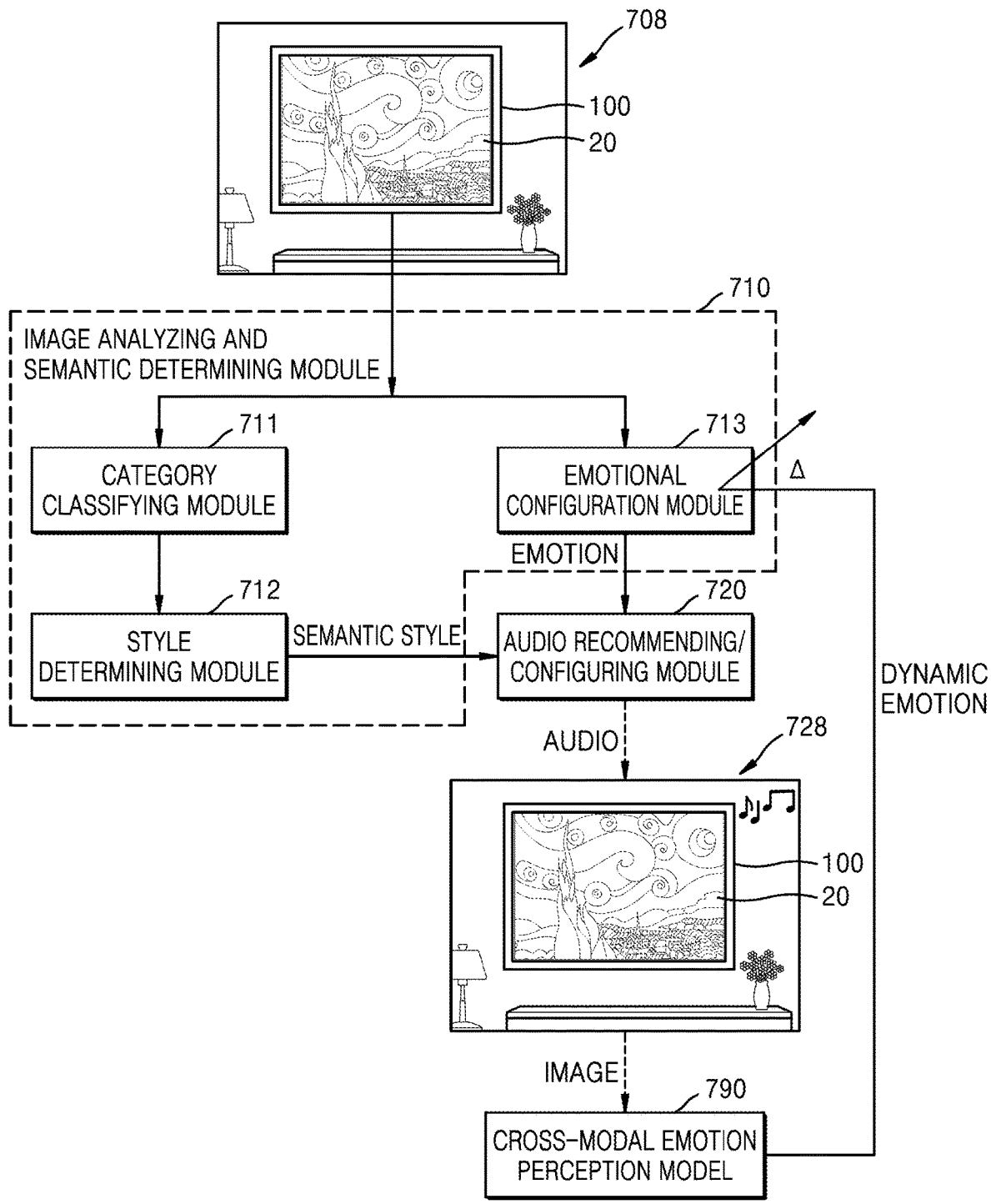
FIG. 7 is a block diagram of an example of operations of a display apparatus, according to an embodiment.

FIG. 7 is a block diagram of an example of operations of the display apparatus 100, according to an embodiment.

Referring to FIG. 7, when the image 20 to be displayed on the display apparatus 100 is determined or selected (reference 708), the image 20 is input to an image analyzing and semantic determining module 710 that determines emotional configuration of an image, and also analyzes and determines the image based on whether the image is an artwork or a photograph. The image analyzing and semantic determining module 710 may first obtain a semantic style (of an artwork or a photograph) and image information by analyzing the image 20. A category classifying module 711 of the image analyzing and semantic determining module 710 may classify a category of the image 20 to determine whether the image 20 is an artwork or a photograph, and a style determining module 712 may obtain a semantic category/style by determining a style based on the classified category, i.e., the artwork or the photograph. An emotional configuration module 713 of the image analyzing and semantic determining module 710 may obtain image information of the image 20 by analyzing the image 20.

The semantic style and the emotional configuration are transmitted to an audio recommending/configuring module 720, and the audio recommending/configuring module 720 may suitably blend recommended audio with composed or configured audio to output audio suitable for the image 20. Accordingly, a user of the display apparatus 100 may experience recommended or composed audio suitable for the image 20, together with the image 20 (reference 728). Audio may representatively be music, but is not limited thereto, and may include sound, voice, or the like.

Although initially emotion is determined only from the image 20, but once the output audio is reproduced, emotion perceived by a human being is changed due to a "cross-modal interaction" of emotion generated by experiencing image and audio modality, and thus emotion determined initially may no longer be valid. Emotion resulting from the cross-modal interaction between the image 20 and the audio over a certain period of time may be referred to as "dynamic emotion" and obtained by a cross-modal emotion perception model 790. Such dynamic emotion may be used by the emotional configuration module 713 that dynamically updates the emotional configuration to output a suitable audio playlist that continually compensates for image audio perception of the user.

Figure 8:
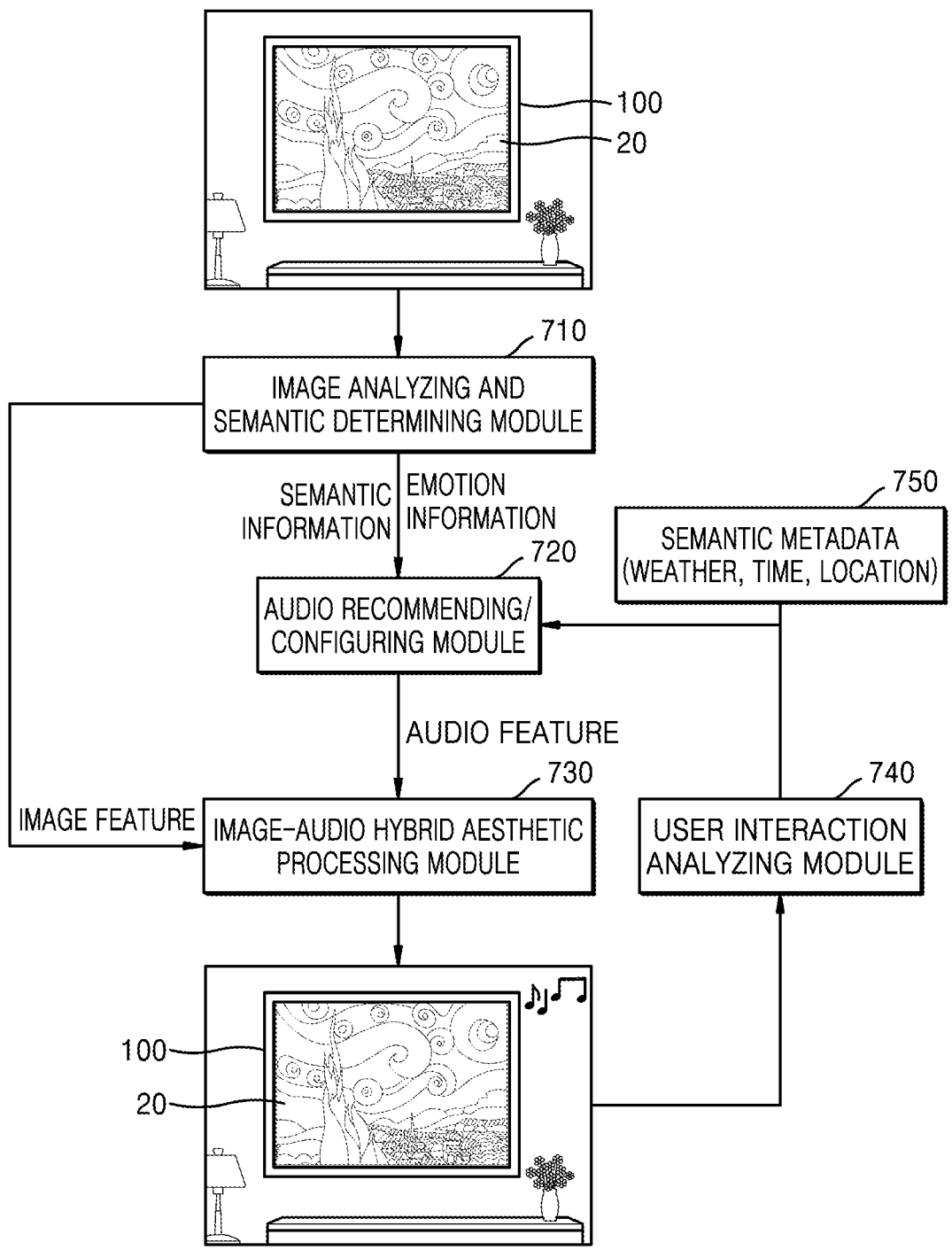
FIG. 8 is a block diagram of an example of operations of the display apparatus, according to an embodiment.

FIG. 8 is a block diagram of an example of operations of the display apparatus 100, according to an embodiment.

Metadata, for example, semantic style information of the artwork or the photograph and emotional configuration information, obtained as an analyzing result of the image analyzing and semantic determining module 710 may be transmitted to a music service providing server that recommends suitable music. The metadata obtained as the analyzing result may be transmitted to a music composing module that automatically composes music based on the metadata. Recommended music provided from the music service providing server and music composed by the music composing module may be blended/mixed by the audio recommending/configuring module 720. An image-audio hybrid aesthetic processing module 730 may generate a cinemagraph based on an image feature, and also, may perform a process, such as an image-based audio process and/or an audio-based image process by using system-related metadata available to aesthetically render multimedia. The aesthetically processed multimedia (a dynamic image and recommended/composed audio) may be rendered on a screen of the display apparatus 100.

User interaction data (reproduction, pause, skip, a voice command, or the like) related to the screen of the display apparatus 100 is transmitted to a user interaction analyzing module 740 that recommends audio adaptively based on a user interaction on the screen, and a user interaction analyzing result output from the user interaction analyzing module 740 may be input to the audio recommending/configuring module 720.

The audio recommending/configuring module 720 may further reflect semantic metadata 750 related to an environment of the display apparatus 100, for example, metadata of weather, time, location, or the like of a place where the display apparatus 100 is located, to recommend/configure audio.

Figure 9:
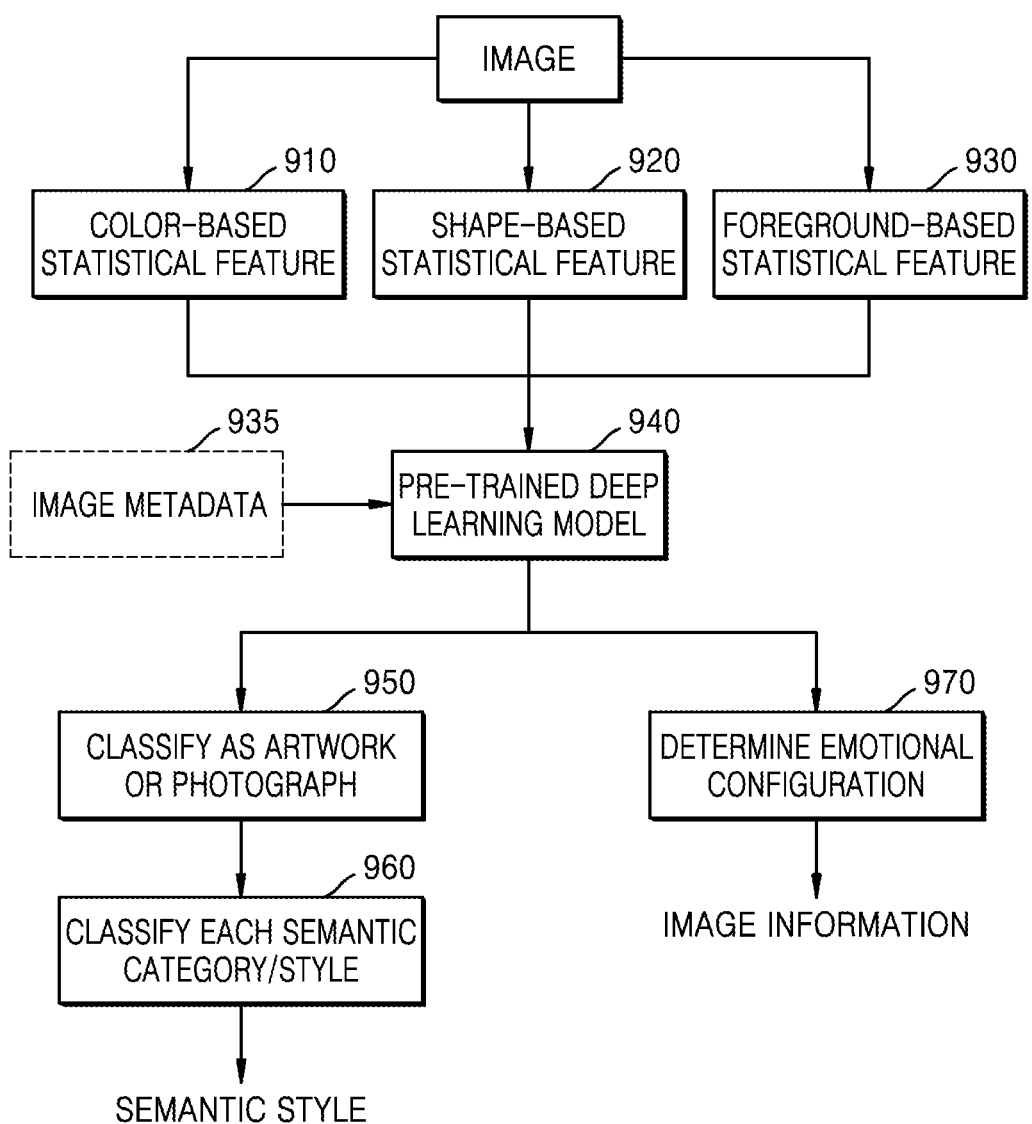
FIG. 9 is a diagram of a method of obtaining a semantic style and emotional configuration from an image, according to an embodiment.

FIG. 9 is a diagram of a method of obtaining a semantic style and emotional configuration from an image, according to an embodiment.

Referring to FIG. 9, the image analyzing and semantic determining module 710 may extract a color-based statistical feature 910, a shape-based statistical feature 920, and a foreground-based statistical feature 930 from an image to be displayed on a screen of a display apparatus. The image analyzing and semantic determining module 710 may subdivide a feature by performing a partial statistical analysis, such as mean, variance, skewness, curtosis after primitive feature extraction. Such a statistical feature may be used as an input of a pre-trained deep learning model 940 to determine a semantic style and image information of the image.

A category of the image may be classified in operation 950 by the deep learning model 940. The category of the image may include, for example, an artwork or a photograph. According to an embodiment, the deep learning model 940 may accurately classify the image by using image metadata 935, for example, text. For example, when the image is an artwork, an artist, an era, a title, or the like of the artwork may be included in the image metadata 935 in text. Also, when the image is a photograph, a date, a capturing device, a captured place, or the like of the photograph may be included in the image metadata 935 in text. For example, the deep learning model 940 may classify the image as the photograph when the image metadata 935 includes information about a camera, a captured place, or the like. For example, the deep learning model 940 may classify the image as the artwork when the image metadata 935 includes information about a title, an artist, or the like. The image metadata 935 is not necessarily required in the deep learning model 940, and may be used when available. Even when the image metadata 935 is not available, a neural network may automatically determine whether the image is an artwork or a photograph, and determine a semantic style according to the artwork or the photograph.

After the image is classified as the category of an artwork or a photograph, a semantic style of the image may be determined for each category in operation 960. Semantic information available when the image is a photograph and semantic information available when the image is an artwork may be different from each other. Accordingly, the semantic style of the image may be classified in each category.

The deep learning model 940 may obtain emotional configuration by analyzing the image in operation 970.

Figure 10:
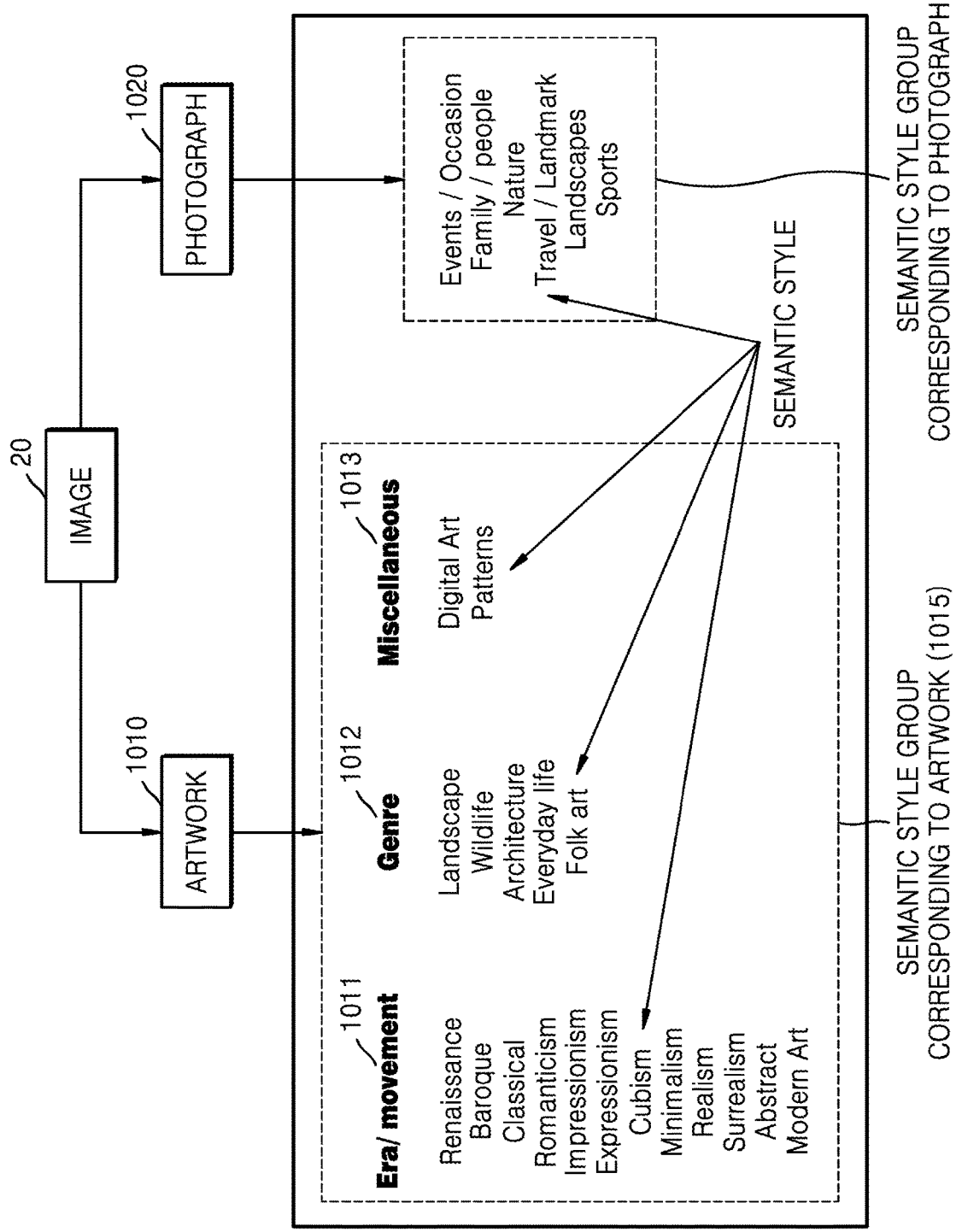
FIG. 10 is a diagram of an example of classifying an image according to categories and classifying the image according to semantic styles in each category, according to an embodiment.

FIG. 10 is a diagram of an example of classifying an image 20 based on categories and classifying the image 20 based on semantic styles in each category, according to an embodiment.

Referring to FIG. 10, the image 20 may first be classified according to categories, according to an embodiment. The categories of the image 20 may include, for example, an artwork 1010 and a photograph 1020. A user may upload an artwork or a photograph as an image to be displayed on a screen of a display apparatus. Accordingly, quality/performance of a system may be deteriorated when music is recommended only based on emotional configuration of the image. By first classifying a category of the image into the artwork or the photograph, and sub-classifying the image within each category, further appropriate music recommendation may be provided compared to a related art system based only on emotional configuration. For example, an artwork in the Renaissance era and a personal photograph during recent vacations may both deliver the same happiness. However, music suitable for the Renaissance era and music suitable for a personal photograph taken during the vacations may be completely different from each other. The related art system may have low performance/quality because such an artwork/photograph category is not reflected. Thus, an image analyzing and semantic determining module of an embodiment outputs emotional configuration of an input image, and an image semantic style related to an artwork/photograph.

Referring to FIG. 10, an era 1011, a genre 1012, miscellaneous 1013 may be provided as sub-classification in the category classified as the artwork 1010. The era 1011 of the artwork 1010 may include, for example, Renaissance, Baroque, Classical, and the like as the sub-classification. The genre 1012 of the artwork 1010 may include, for example, landscape, wildlife, architecture, and the like as the sub-classification. The miscellaneous 1013 of the artwork 1010 may include digital art, patterns, and the like. Each sub-classification in the category of the artwork 1010 configures a semantic style.

The category classified as the photograph 1020 may include sub-classifications, such as events/occasion, family/people, nature, and the like.

When a semantic style is determined by using a group of same semantic styles with respect to an artwork or a photograph without classifying the image as an artwork or a photograph, an elaborate difference resulting from whether the image is an artwork or a photograph is unable to be reflected. However, in an embodiment, the image 20 is first classified according to categories and semantic style information may be further elaborately extracted from the image by using different style groups for each category, i.e., by using a semantic style group 1015 corresponding to an artwork when the category is an artwork and by using a semantic style group 1025 corresponding to a photograph when the category is a photograph.

Operation 970 of FIG. 9 will now be described in detail.

An image feature extracted from the image to be displayed on the display apparatus, such as color distribution, may be used to map the image to one of standard emotion models used in human psychology. Examples of the standard emotion models include a circumplex model of emotion also known as a pleasure-arousal-dominance (PAD) model or a valence-arousal (V-A) model.

Figure 11:
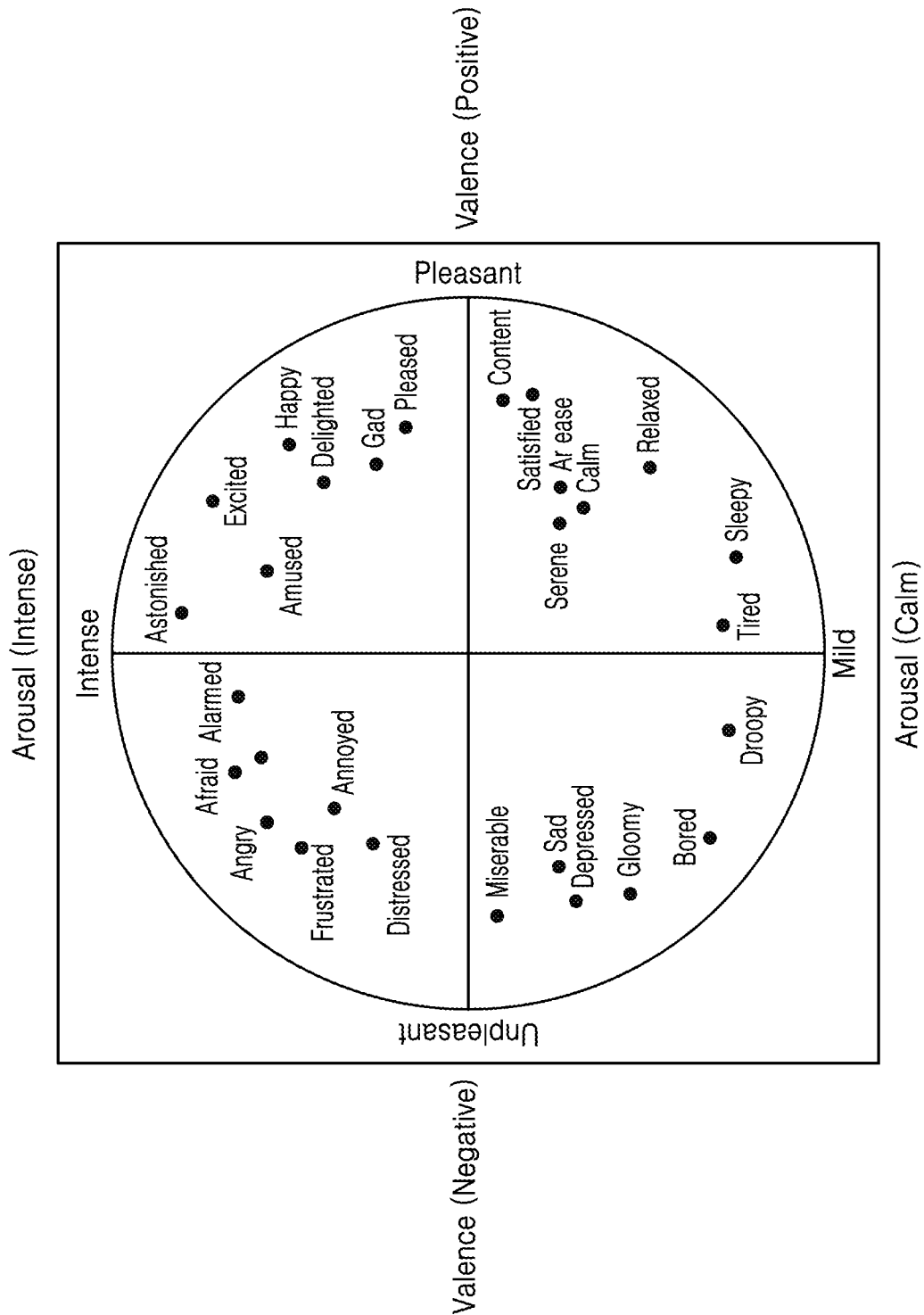
FIG. 11 illustrates an example of an emotional configuration in a valence-arousal model, according to an embodiment.

FIG. 11 illustrates an example of emotional configuration in a V-A model, according to an embodiment.

Various studies on color perception and color psychology strongly correlate a color with human emotion. For example, Valdez and Mehrabian, "Effect of Colors on Emotions", Jour of Experimental Psychology, Vol. 123, No. 4, pp 394-409, 1994 provide following equations for PAD model. (This article is incorporated herein by reference in its entirety).

[B—Brightness, S—Saturation]

$$\text{Pleasure}(P)=0.69B+0.22S$$

$$\text{Arousal}(A)=-0.31B+0.60S$$

$$\text{Dominance}(D)=-0.76B+0.32S$$

P, A, and D for each pixel may be obtained by substituting brightness and saturation of each pixel of an image into the above equations, and an emotional configuration graph as shown in FIG. 11 may be obtained by using relative values of P, A, and D. For example, when the relative values of P, A, and D are all positive, emotion may be indicated as bold, creative, or powerful, and when the relative values of P, A, and D are all negative, the emotion may be indicated as bored, depressed, dull, or lonely.

Referring to FIG. 11, the emotion is pleasant towards the right and is unpleasant towards the left. The emotion is intense towards the top and is mild and calm towards the bottom. For example, when the pleasant emotion and the intense emotion are strong, emotion such as delight or happiness may be derived, and for example, when the unpleasant emotion and the mild emotion are strong, emotion such as boredom or depression may be derived. For example, emotional configuration with respect to each image may be obtained via such a method.

Emotion is derived not only by image analysis, and the emotional configuration may be updated based on emotion generated by a cross-modal interaction appearing by experiencing music output together with an image over time, as described with reference to FIG. 7. Such a cross-modal interaction may be obtained by a cross-modal emotion perception model supported by studies in fields of human psychology, emotion perception, and neuroscience. Such emotion may be referred to as "dynamic emotion.". Accordingly, any one point pre-determined on a V-A plane as shown in FIG. 11 may be changed based on a feature of music currently associated with an input image, so as to determine next music.

Figure 12:
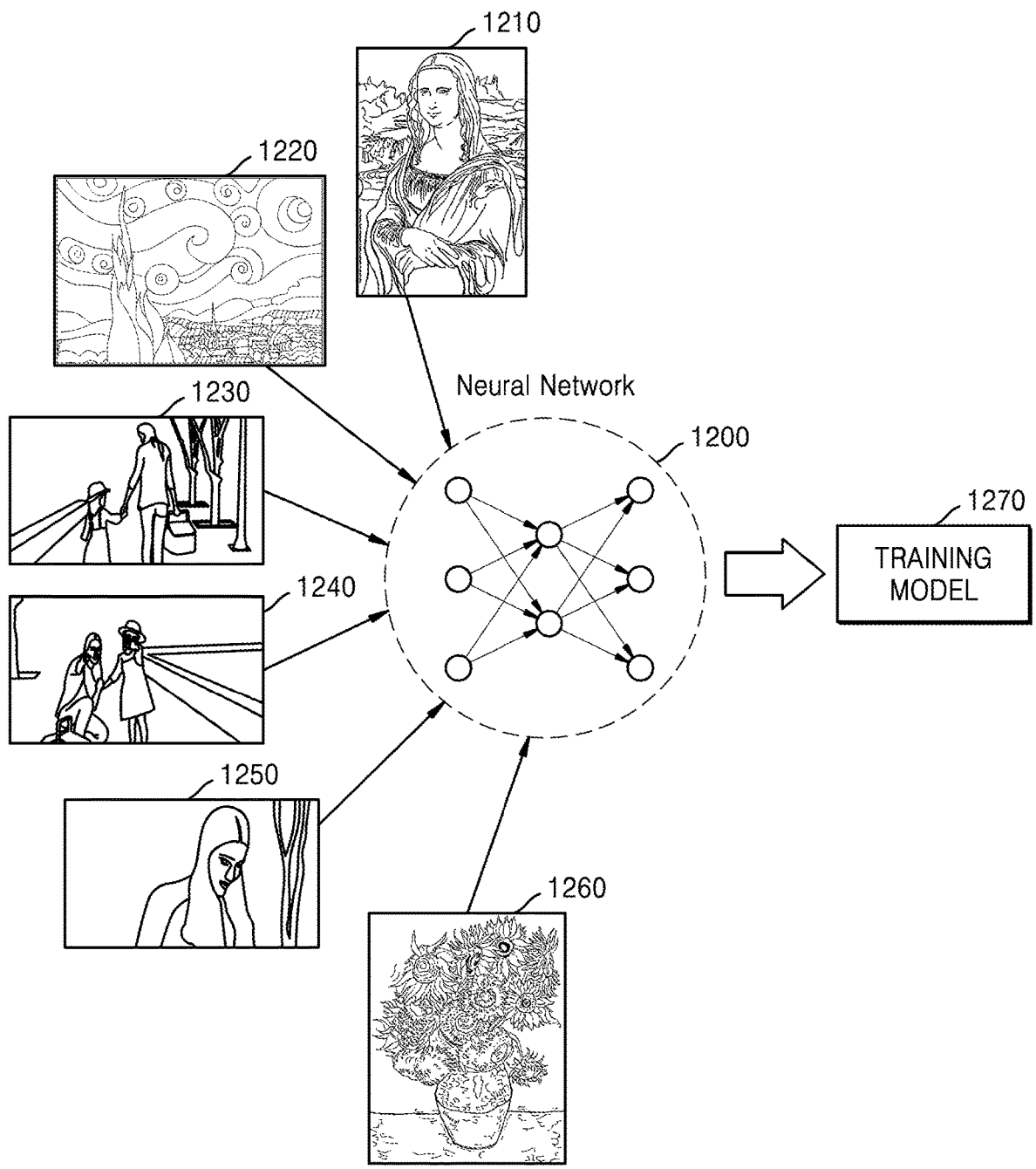
FIG. 12 is a diagram showing an example of a neural network that learns metadata corresponding to features of images from the images, according to an embodiment.

FIG. 12 is a diagram showing an example of a neural network that learns metadata corresponding to features of images from the images, according to an embodiment.

Referring to FIG. 12, one or more neural networks 1200 may learn a method of obtaining metadata from an image by using a plurality of training images 1210, 1220, 1230, 1240, 1250, and 1260 as input values. For example, the neural network 1200 may learn a method of obtaining an image semantic category/style and image emotional configuration from the plurality of training images 1210 through 1260. The plurality of training images 1210 through 1260 may include an artwork, a photograph, and the like, but are not limited thereto.

At least one neural network 1200 may learn the method of obtaining an image semantic category/style and image emotional configuration corresponding to the plurality of training images 1210 through 1260, in response to the plurality of training images 1210 through 1260 being input, and generate a training model 1270 based on a training result.

The training model 1270 may be a trained neural network itself that allows a target result to be obtained through the neural network 1200. In particular, in order to obtain metadata corresponding to a feature of an image, the neural network 1200 may be trained by using the plurality of training images 1210 through 1260 to set a plurality of values of weights respectively applied to a plurality of nodes forming the neural network 1200. The weights may denote connection strength between the nodes in the neural network 1200. The value of weight may be optimized via repetitive learning, and may be repeatedly modified until result accuracy satisfies certain reliability. The training model 1270 may be the neural network 1200 formed by the values of weights that are finally set.

According to one or more embodiments, an operation of learning a method of obtaining the metadata corresponding to the feature of the image from the image by using the at least one neural network 1200 may be performed in advance. The training model 1270 may be updated when some of the plurality of training images 1210 through 1260 are changed. For example, when the user views an image through the display apparatus 100, the viewed image may be used as a training image. At least one image viewable by the user may be extracted in units of a certain period (for example, 24 hours), and the extracted image may be used as a training image. When a new training image is added, the at least one neural network 1200 may learn a method of recognizing an object from an image again, and accordingly, the training model 1270 may be updated.

The operation of training the method of obtaining the metadata corresponding to the feature of the image from the image by using the at least one neural network 1200 may be performed by the display apparatus 100 or may be performed by an external server according to an embodiment. For example, the operation of obtaining the metadata corresponding to the feature of the image from the image by using the at least one neural network 1200 may require a relatively complicated throughput. Accordingly, the external server may perform the operation of learning, and the display apparatus 100 may receive the training model 1270 from the external server, thereby reducing the throughput to be performed by the display apparatus 100. The display apparatus 100 may receive the training model 1270 from the external server in advance and store the training model 1270 in a memory, and obtain the metadata corresponding to the feature of the image by using the stored training model 1270.

According to an embodiment, the display apparatus 100 may include the neural network processor 170 that is a separate exclusive processor performing a learning operation through the neural network 1200. The neural network processor 170 may perform learning through the neural network 1200 to determine the training model 1270, and perform a metadata obtaining process through the determined training model 1270.

An operation of performing an operation through the neural network 1200 will now be additionally described with reference to FIGS. 13A through 13D.

Figure 13A:
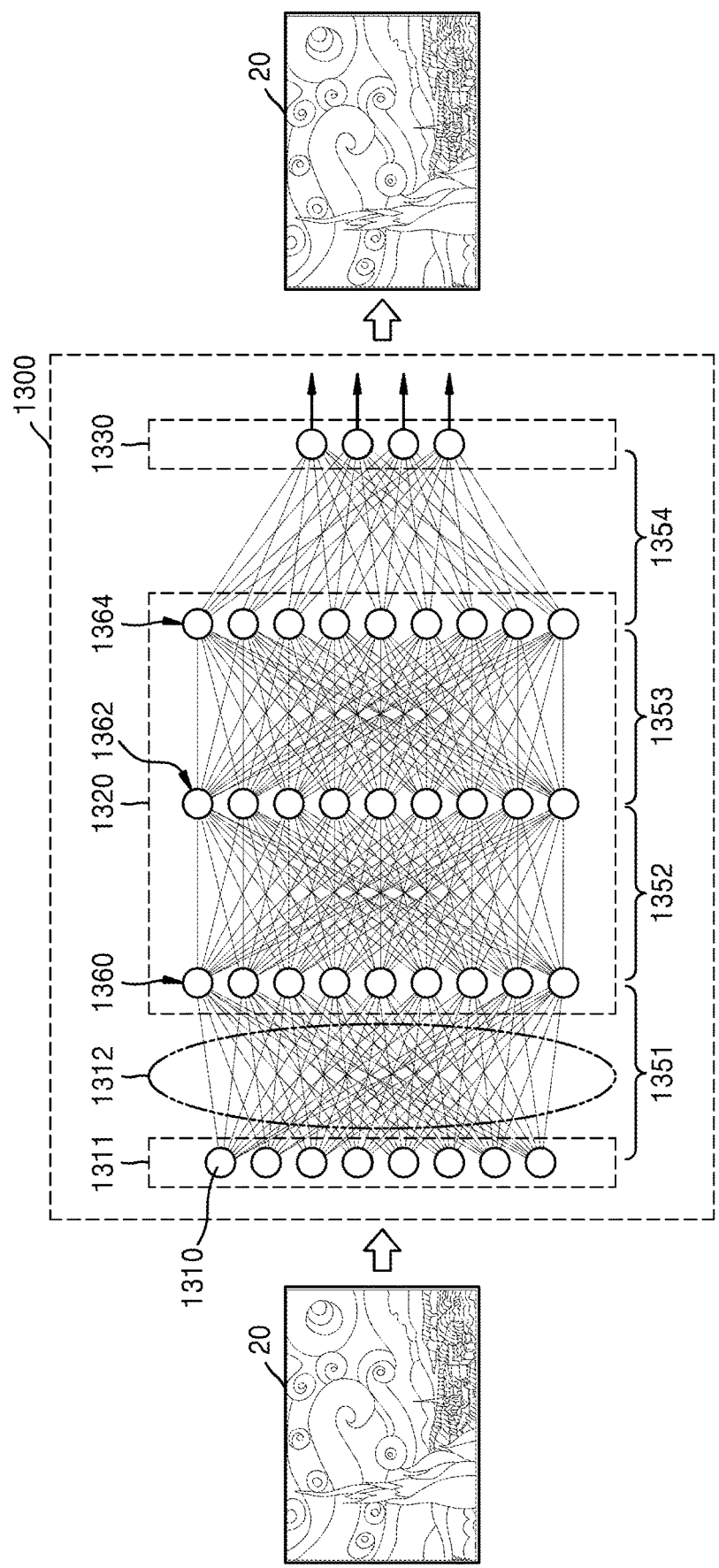
FIG. 13A is a diagram illustrating the obtaining of metadata from an image by using a neural network, according to an embodiment.

FIG. 13A is a diagram illustrating the obtaining of metadata from an image by using a neural network, according to an embodiment. In particular, FIG. 13A illustrates an example of a deep neural network (DNN) 1300 in which a depth of a hidden layer has three depths.

Referring to FIG. 13A, the DNN 1300 may be trained through training data. The trained DNN 1300 may perform inference operation that is an operation for object recognition. The DNN 1300 may be variously designed according to a model implementation method (for example, a convolution neural network (CNN)), accuracy of a result, reliability of a result, a throughput speed of a processor, and capacity of the processor.

The DNN 1300 may include an input layer 1311, a hidden layer 1320, and an output layer 1330 to perform an operation for obtaining metadata. The DNN 1300 may include a first layer 1351 provided between the input layer 1311 and a first hidden layer, a second layer 1352 provided between the first hidden layer and a second hidden layer, a third layer 1353 provided between the second hidden layer and a third hidden layer, and a fourth layer 1354 provided between the third hidden layer and the output layer 1330.

Also, each of a plurality of layers forming the DNN 1300 may include at least one node. For example, the input layer 1311 may include at least one node 1310 receiving data. FIG. 13A illustrates an example in which the input layer 1311 includes a plurality of nodes 1310. A plurality of images obtained by scaling the image 20 according to frequency bands may be input to the plurality of nodes 1310.

Two adjacent layers are connected via a plurality of edges 1312 as shown in FIG. 13A. Each of nodes have respective weight values, and the DNN 1300 may obtain output data based on a value obtained by calculating an input signal and the weight value, for example, multiplying the input signal and the weight value.

The DNN 1300 may be constructed as a model that is trained based on a plurality of training images and extracts metadata corresponding to an image by recognizing a feature of the image. In particular, so as to increase the accuracy of a result output through the DNN 1300, the weight value may be modified such that the accuracy of the result is increased while repeatedly performing training in a direction from the output layer 1330 to the input layer 1311 based on a plurality of training images.

The DNN 1300 having the finally modified weight values may be used as a metadata extracting model. The DNN 1300 may output a result indicating metadata corresponding to a training image by analyzing information included in a plurality of training images that are input data.

Figure 13B:
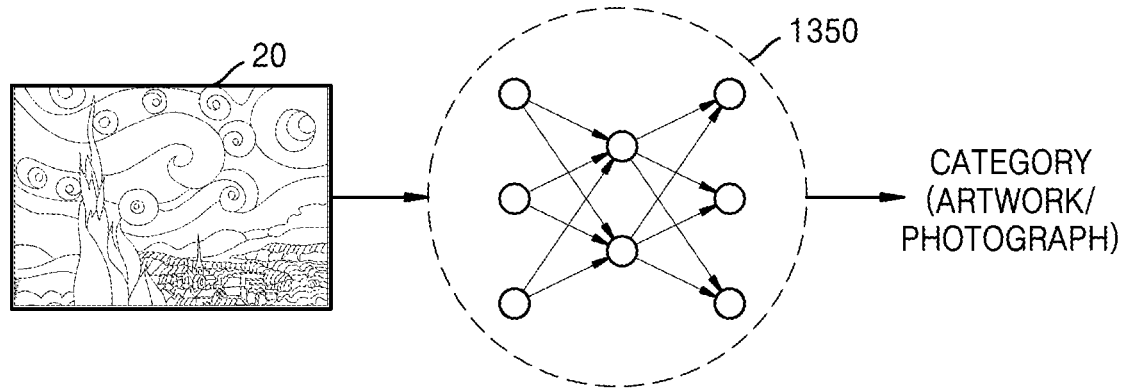
FIG. 13B is a diagram illustrating the extracting of category from an image by using a neural network, according to an embodiment.

FIG. 13B illustrates an example of a first neural network 1350 extracting a category from the image 20, according to an embodiment.

Referring to FIG. 13B, the first neural network 1350 may receive the image 20 selected to be displayed on a display apparatus, extract a feature from the image 20 by using a plurality of layers, determine whether the image 20 is an artwork or a photograph, based on the extracted feature, and output a category result.

Figure 13C:
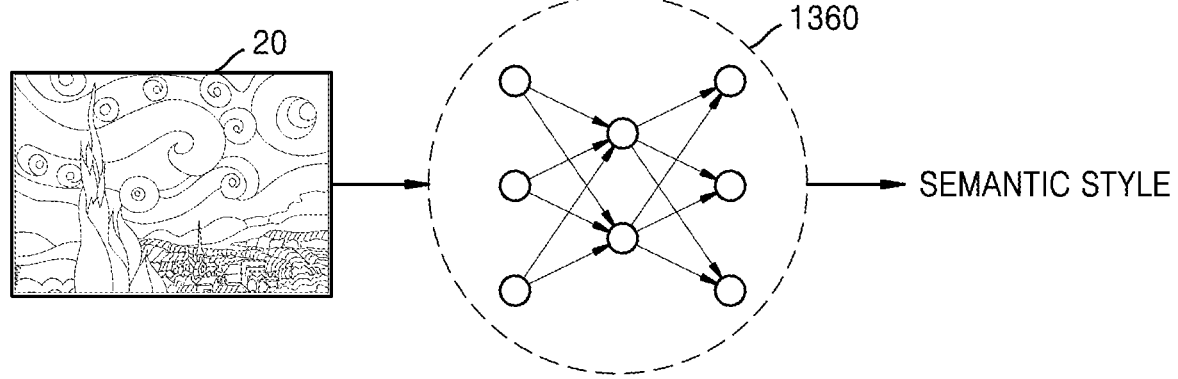
FIG. 13C is a diagram illustrating the extracting of semantic style from an image by using a neural network, according to an embodiment.

FIG. 13C illustrates an example of a second neural network 1360 extracting a semantic style from the image 20, according to an embodiment.

Referring to FIG. 13C, the second neural network 1360 may receive the image 20 and/or a category of the image 20, extract a semantic style according to an artwork category when the image 20 is an artwork and extract a semantic style according to a photograph category when the image 20 is a photograph, and output a result.

Figure 13D:
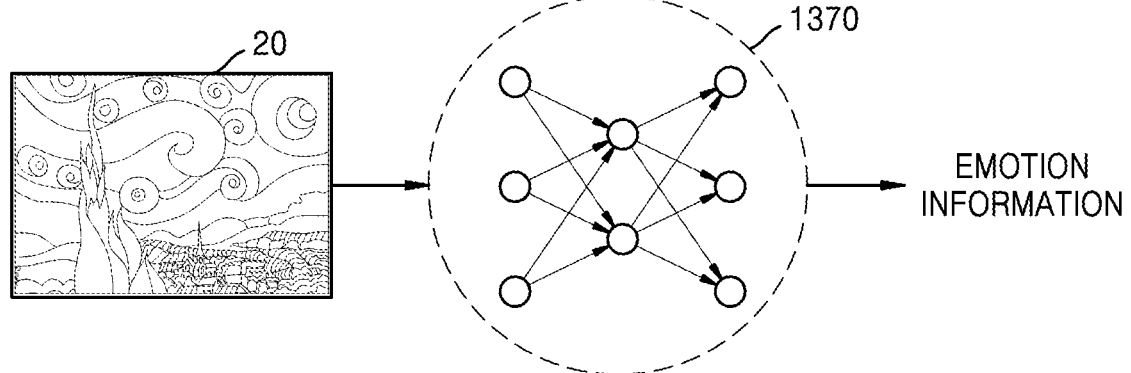
FIG. 13D is a diagram illustrating the extracting of emotion information from an image by using a neural network, according to an embodiment.

FIG. 13D illustrates an example of a third neural network 1370 extracting emotion information from the image 20, according to an embodiment.

Referring to FIG. 13D, upon receiving the image 20 selected to be displayed on a display apparatus, the third neural network 1370 may determine emotional configuration based on a feature of the image 20 and output the emotional configuration as a result.

Figure 14A:
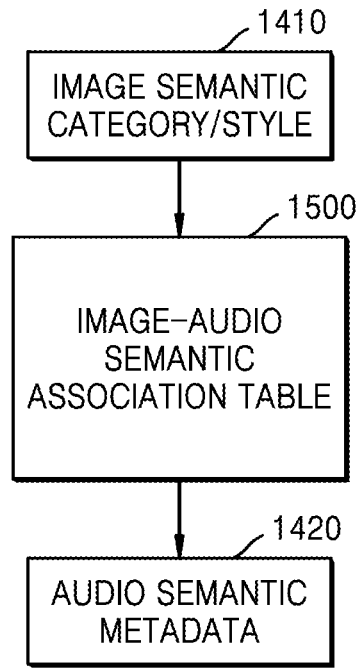
FIGS. 14A and 14B are diagrams of a method of converting metadata of an image into audio metadata, according to an embodiment.
Figure 14B:
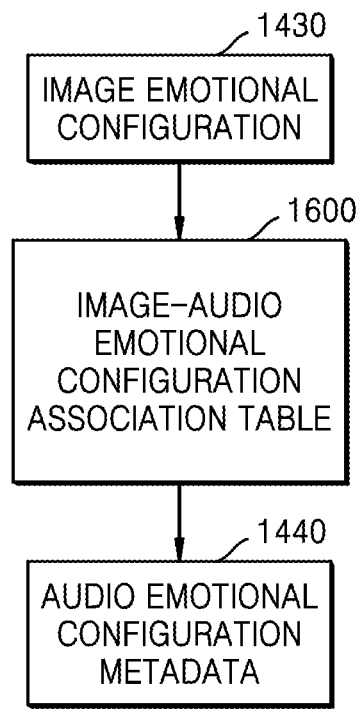

FIGS. 14A and 14B are diagrams of a method of converting metadata of an image into audio metadata, according to an embodiment.

Referring to FIGS. 14A and 14B, an image semantic category/style 1410 obtained by using a neural network with respect to an image to be displayed on a display apparatus may obtain audio semantic metadata 1420 by using an image-audio semantic association table 1500. An image emotional configuration 1430 may obtain audio emotional configuration metadata 1440 by using an image-audio emotional configuration association table 1600.

A style of an image may be strongly associated with a genre or era of music, and emotional configuration of an image is strongly associated with balance, tempo, and music energy. Accordingly, pieces of metadata that are associated with each other may be pre-stored in a lookup table, and when a semantic style and emotional configuration of an image are determined, the semantic style and the emotional configuration are each used as inputs of the lookup table to determine associated music metadata.

Figure 15:
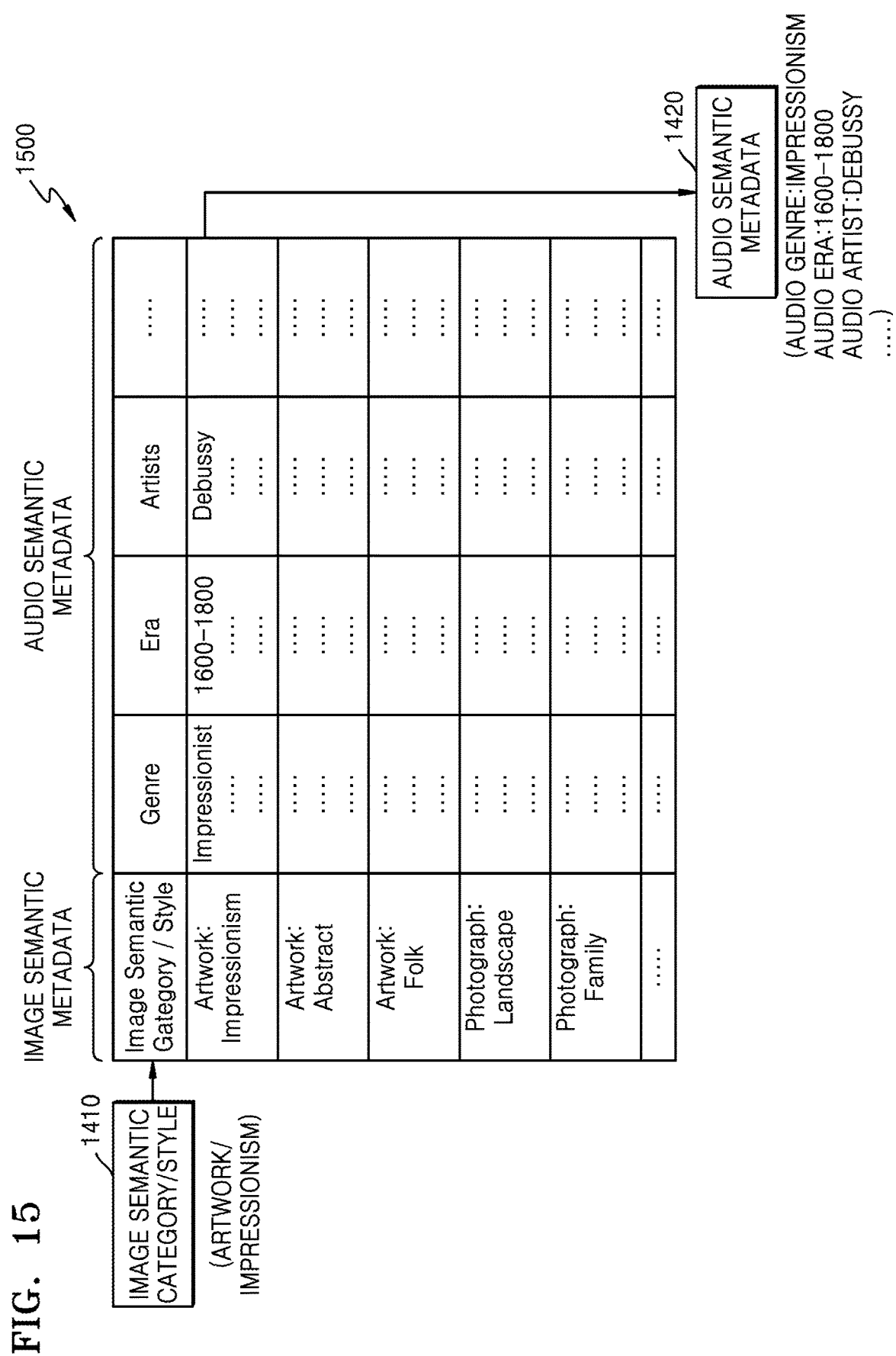
FIG. 15 illustrates an example of an image-audio semantic association table according to an embodiment.

FIG. 15 illustrates an example of the image-audio semantic association table 1500 according to an embodiment.

Referring to FIG. 15, the image-audio semantic association table 1500 includes image semantic metadata and audio semantic metadata. The image semantic metadata includes an image semantic category/style based on, for example, whether an image is a photograph or an artwork. However, this is not limiting and separate tables may be provided for the artwork and the photograph. An image semantic style indicates a style in each category. As described above with reference to FIG. 10, styles corresponding to categories of an image are different from each other. The audio semantic metadata includes audio semantic metadata corresponding to each image semantic category/style, such as a genre, an age, artist, and the like.

For example, when (artwork/impressionism) is obtained as the image semantic category/style as a result of analyzing a feature of the image, because (artwork/impressionism) is mapped to (genre: impressionism, era: 1600-1800, artist: Debussy, etc.) of audio semantic metadata, (genre: impressionism, era: 1600-1800, artist: Debussy, etc.) may be obtained as the audio semantic metadata 1420.

Figure 16:
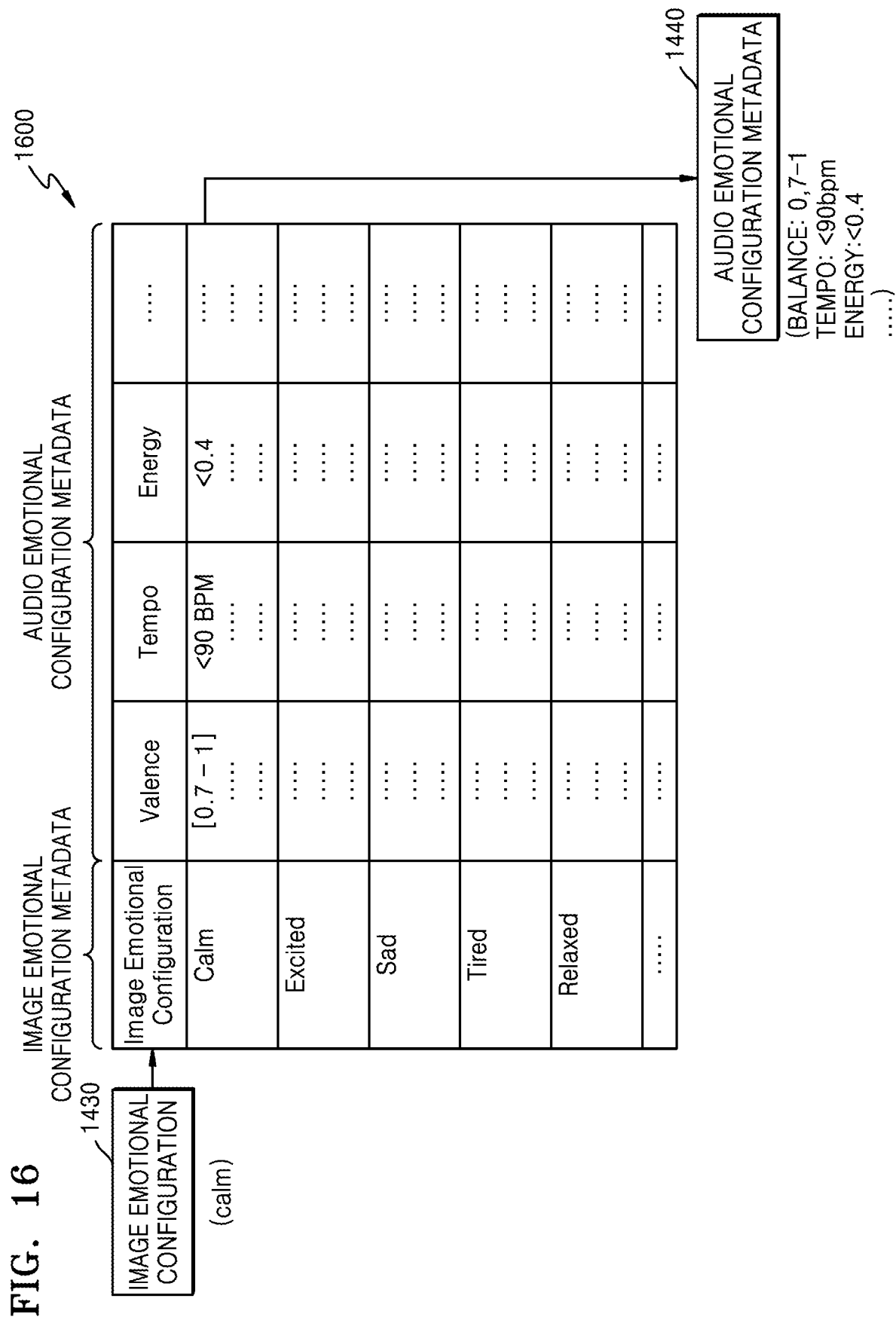
FIG. 16 illustrates an example of an image-audio emotional configuration association table according to an embodiment.

FIG. 16 illustrates an example of the image-audio emotional configuration association table 1600 according to an embodiment.

Referring to FIG. 16, the image-audio emotional configuration association table 1600 includes image emotional configuration metadata and audio emotional configuration metadata. The audio emotional configuration metadata includes audio emotional configuration metadata corresponding to each piece of image emotional configuration metadata, and the audio emotional configuration metadata may include balance, tempo, energy, and the like.

For example, when (calm) is obtained as image emotional configuration metadata as a result of analyzing a feature of an image, because (calm) is mapped to (balance: 0.7-1, tempo: <90 BPM, energy: <0.4, etc.) of audio emotional configuration metadata in the image-audio emotional configuration association table 1600, (balance: 0.7-1, tempo: <90 BPM, energy: <0.4, etc.) may be obtained as audio emotional configuration metadata 1440.

Audio semantic metadata and audio emotional configuration metadata of an image obtained as such may be used to search for or compose audio such as music or sound suitable for the image.

Figure 17:
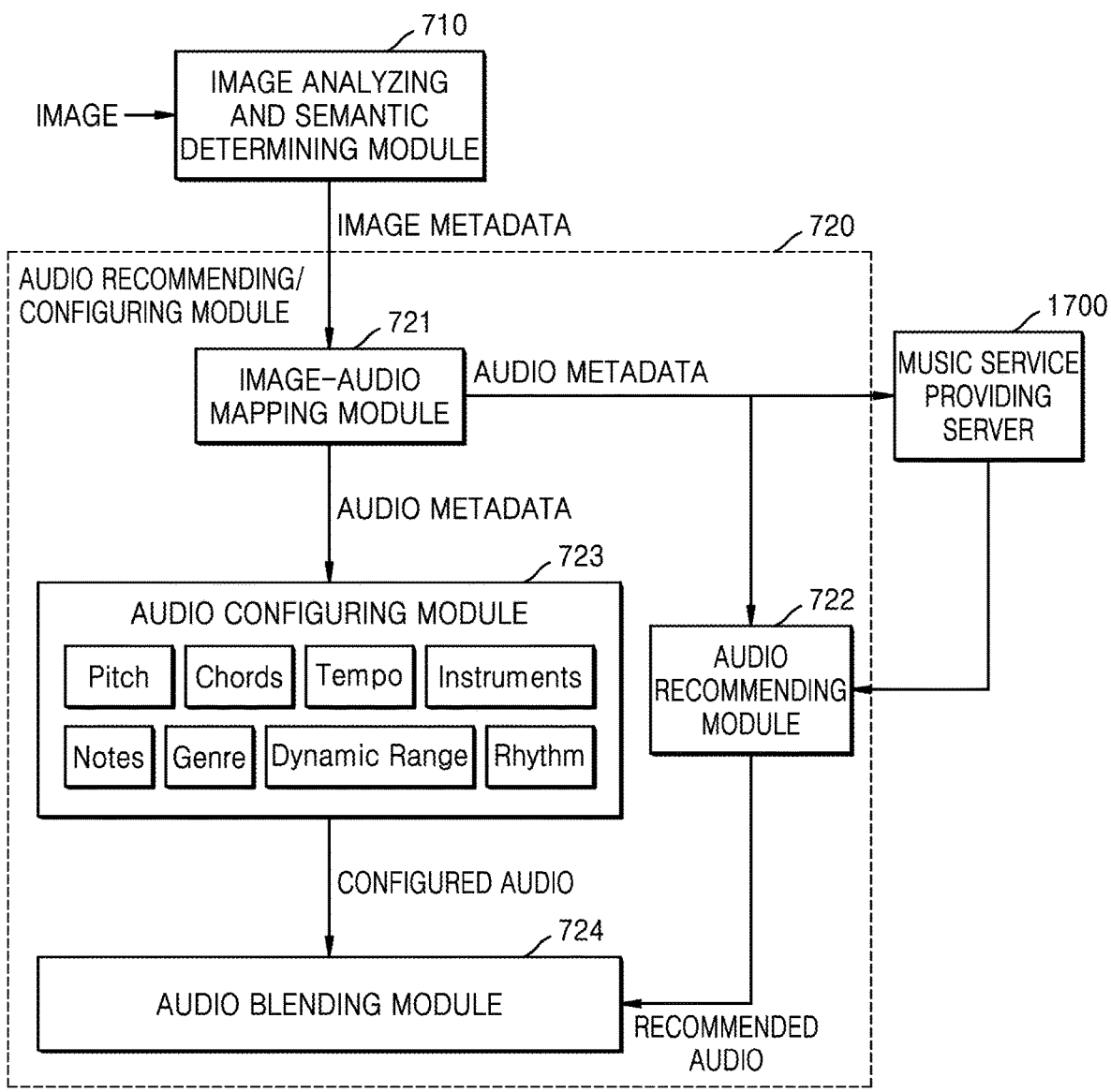
FIG. 17 is a block diagram of a method of obtaining audio suitable for an image, based on audio metadata of the image, according to an embodiment.

FIG. 17 is a block diagram of a method of obtaining audio suitable for an image, based on audio metadata of the image, according to an embodiment.

Referring to FIG. 17, upon receiving an image to be displayed on the display apparatus 100, the image analyzing and semantic determining module 710 analyzes the image and determines a semantic to output image metadata. The image metadata may include an image semantic category/style and image emotional configuration data according to an embodiment.

The audio recommending/configuring module 720 may receive the image metadata from the image analyzing and semantic determining module 710 and recommend audio suitable for the image metadata. The audio recommending/configuring module 720 may include an image-audio mapping module 721, an audio recommending module 722, an audio configuring module 723, and an audio blending module 724.

The image-audio mapping module 721 may obtain audio metadata corresponding to image metadata received by using an image-audio association table, and provide the audio metadata to at least one of a music service providing server 1700, the audio recommending module 722 or the audio configuring module 723. The audio metadata may include, for example, audio semantic metadata and audio emotional configuration metadata.

The music service providing server 1700 may provide, to the audio recommending module 722, at least one piece of music corresponding to the audio metadata, based on the received audio metadata. The music service providing server 1700 may provide at least one piece of music corresponding to the audio metadata or may provide information about the at least one piece of music, i.e., a playlist of the at least one piece of music.

The audio recommending module 722 may receive a list of at least one piece of music from the music service providing server 1700 and recommend music as a continuous playlist, according to an embodiment. The audio metadata may be matched to the at least one piece of music, and the music service providing server 1700 may periodically update or refresh the playlist of music. A user may pause, skip, or replay music as desired when the music in the playlist is reproduced.

The audio recommending module 722 may receive the list of at least one piece of music from the music service providing server 1700, and/or may directly obtain the at least one piece of music corresponding to the audio metadata based on the audio metadata received from the image-audio mapping module 721, according to an embodiment. The audio configuring module 723 may perform a music composing function suitable for the image. The audio configuring module 723 may receive the audio metadata from the image-audio mapping module 721 and automatically compose music. The audio configuring module 723 may compose music by using an AI model that composes music by receiving a music parameter as an input, based on tempo, genre, pitch, and the like. The audio configuring module 723 may use any AI-based technology to compose music. The audio configuring module 723 may compose music, and configure an audio effect or specific sound, such as rain, wind, and atmosphere.

The audio blending module 724 may supplement, blend, or mix composed music received from the audio configuring module 723 with recommended music received from the audio recommending module 722, so as to provide an improved value and aesthetical experience. For example, when the audio metadata is calm, the audio recommending module 722 may recommend calm music and the audio configuring module 723 may configure specific sound such as rain sound or gentle music to improve overall aesthetic element of music. Accordingly, when the calm music is received from the audio recommending module 722 and the rain sound is received from the audio configuring module 723, the audio blending module 724 may blend the recommended calm music with the rain sound. Alternatively, the audio blending module 724 may configure a playlist by alternately arranging recommended music and configured music in the playlist, in addition to blending the recommended music and the configured music.

According to an embodiment, the audio blending module 724 may select and output one of the recommended music and the configured music instead of blending them, based on preference of the user. For example, when the user preference is music recommendation, the audio blending module 724 may output only the recommended music and ignore the configured music.

According to an embodiment, the audio recommending module 722 may directly perform a music recommending function without receiving a list of recommended music from the music service providing server 1700. When the performance of the display apparatus 100 is satisfied, the audio recommending module 722 may directly receive the audio metadata from the image-audio mapping module 721 and obtain music corresponding to the audio metadata. The audio recommending module 722 may use at least one neural network when searching for music corresponding to the audio metadata.

Figure 18:
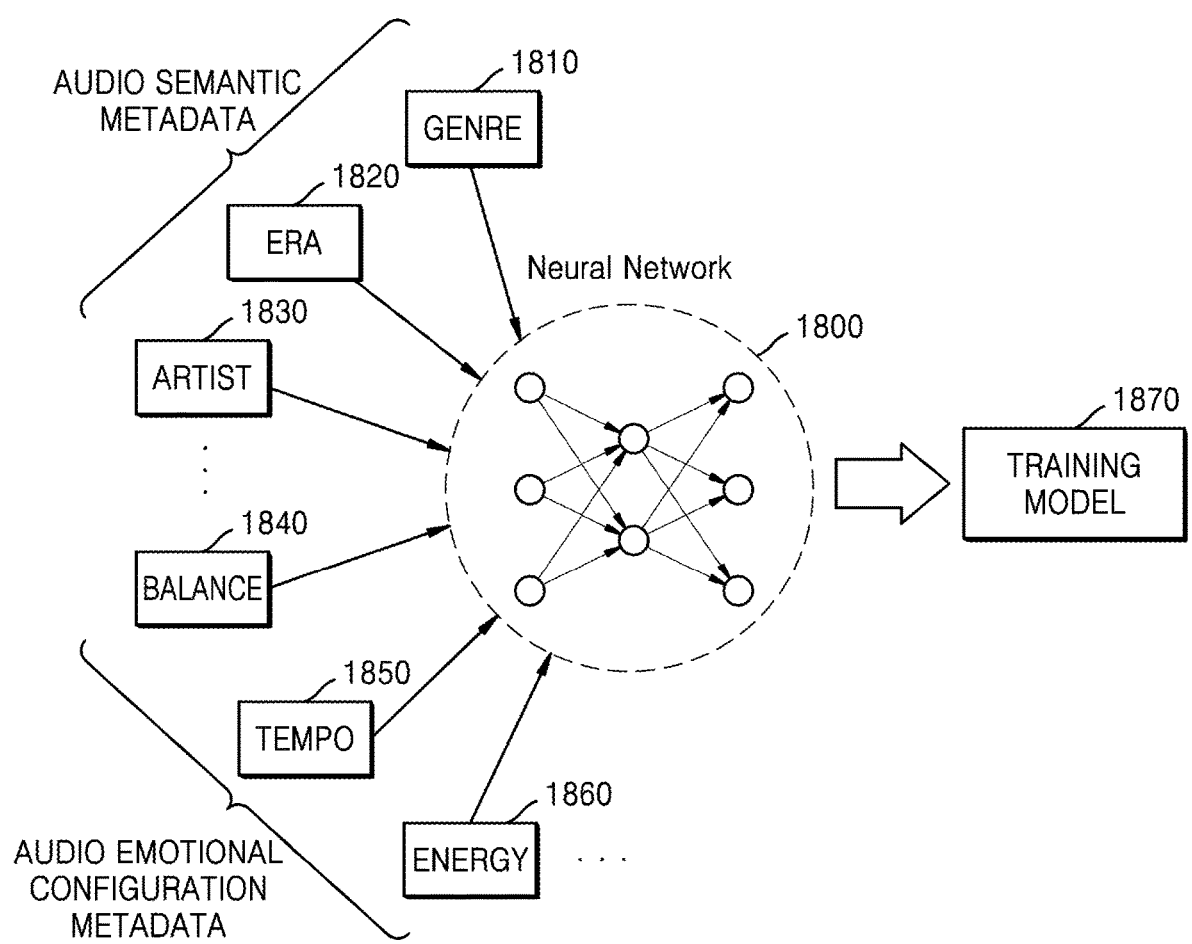
FIG. 18 is a diagram showing an example of a neural network learning recommended audio by using audio metadata of an image, according to an embodiment.

FIG. 18 is a diagram showing an example of a neural network learning recommended audio by using audio metadata of an image, according to an embodiment.

Referring to FIG. 18, one or more neural networks 1800 may learn a method of obtaining recommended audio from a plurality of pieces of training metadata 1810 through 1860 by using the plurality of pieces of training metadata 1810, 1820, 1830, 1840, 1850 and 1860 as input values.

At least one neural network 1800 may learn the method of obtaining recommended audio corresponding to the plurality of pieces of training metadata 1810 through 1860, in response to the plurality of pieces of training metadata 1810 through 1860 being input, and generate a training model 1870 based on a training result.

The training model 1870 may be a trained neural network itself that allows a target result to be obtained through the neural network 1800. In particular, values of a plurality of weights applied respectively to a plurality of nodes forming the neural network 1800 may be set by training the neural network 1800 by using the plurality of pieces of training metadata 1810 through 1860. The weights may denote connection strength between the nodes in the neural network 1800. The value of weight may be optimized via repetitive learning, and may be repeatedly modified until result accuracy satisfies certain reliability. The training model 1870 may be the neural network 1800 formed by the values of weights that are finally set.

Figure 19:
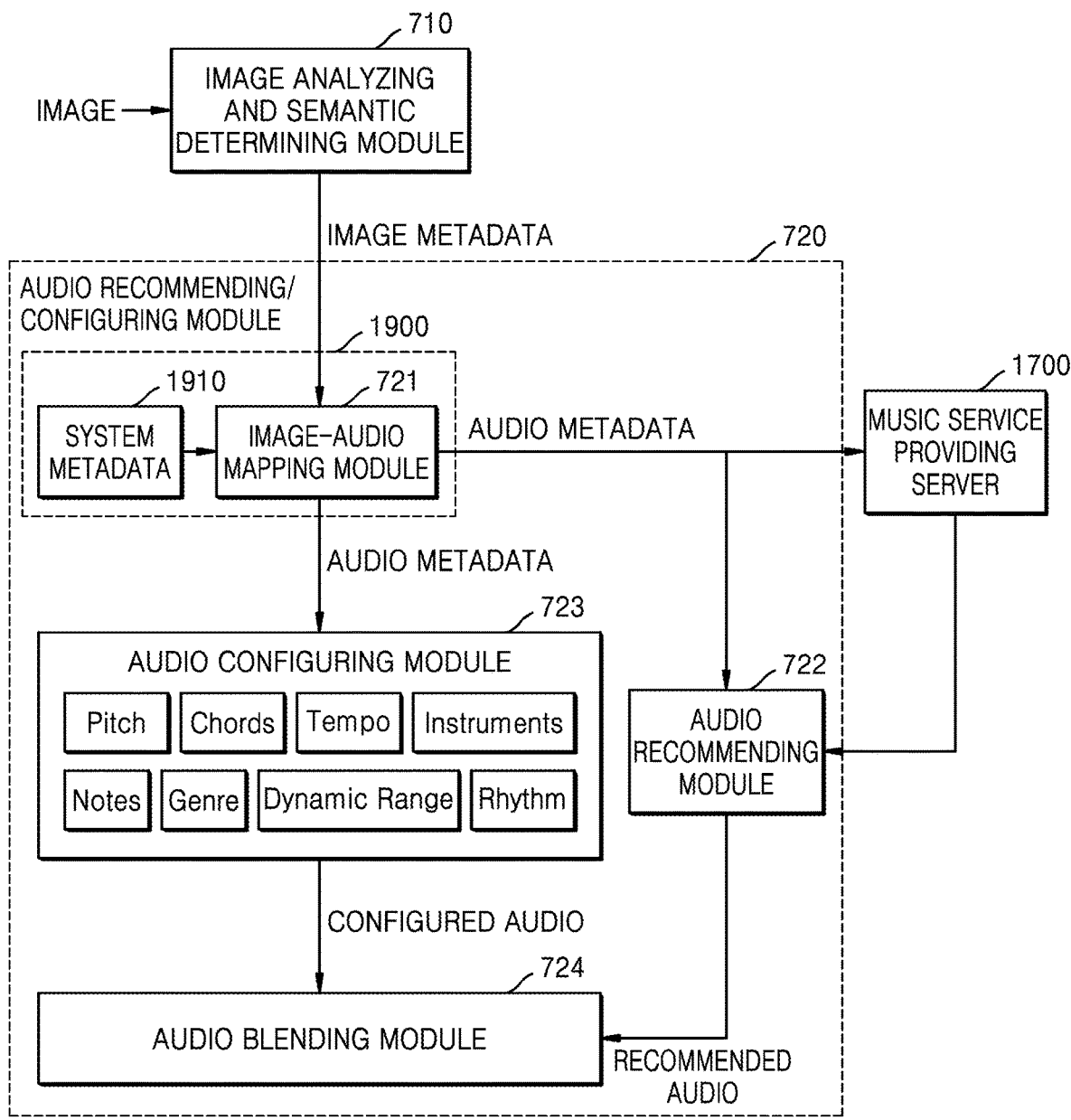
FIG. 19 is a block diagram of a method of using system metadata to determine music to be output together with an image to be displayed on a display apparatus, according to an embodiment.

FIG. 19 is a block diagram of a method of using system metadata 1910 to determine music to be output together with an image to be displayed on the display apparatus 100, according to an embodiment. The block diagram of FIG. 19 is identical to that of FIG. 17, except that the block diagram of FIG. 19 further illustrates the system metadata 1910.

Referring to FIG. 19, the image-audio mapping module 721 may obtain the audio metadata by further reflecting the system metadata 1910 in addition to metadata of the image.

The system metadata 1910 indicates information about an environment in which the display apparatus 100 operates. Operation environment information of the display apparatus 100 may include, for example, the weather when the display apparatus 100 operates, the time when the display apparatus 100 operates, and a place where the display apparatus 100 is located. For example, music being recommended may be different even for a same input image depending on whether the music is reproduced in the morning or in the evening. For example, music being recommended may be different even for a same input image depending on a place where the music is reproduced. For example, music being recommended in Korea and music being recommended in US may be different even for a same image. For example, music being recommended may be different even for a same input image depending on the weather of a day when the music is reproduced. For example, music being recommended on a hot day and music being recommended on a cold day may be different even for a same image.

As such, according to an embodiment, the system metadata 1910 may be used to recommend music. As shown in FIG. 19, the system metadata 1910 may be reflected to the image-audio mapping module 721. According to an embodiment, the system metadata 1910 may be reflected to an image-audio semantic association table and an image-audio emotional configuration association table.

Figure 20A:
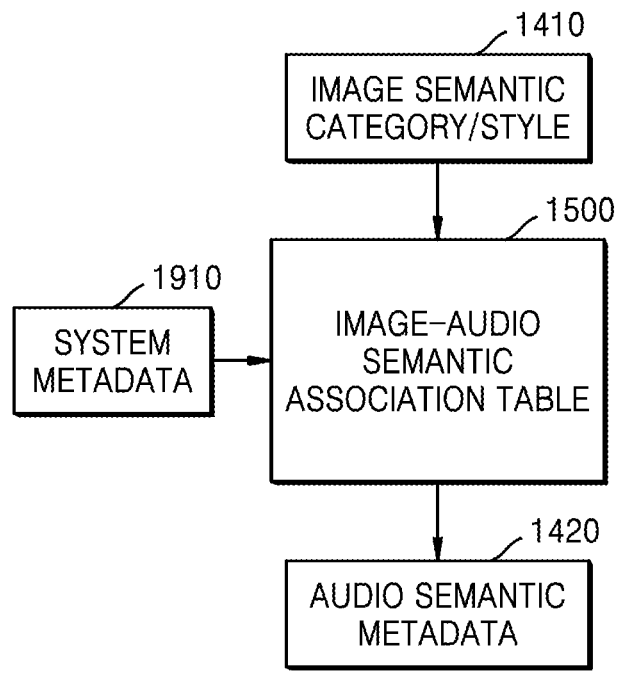
FIGS. 20A and 20B are diagrams of a method of reflecting system metadata on an image-audio semantic association table and an image-audio emotional configuration association table, according to an embodiment.
Figure 20B:
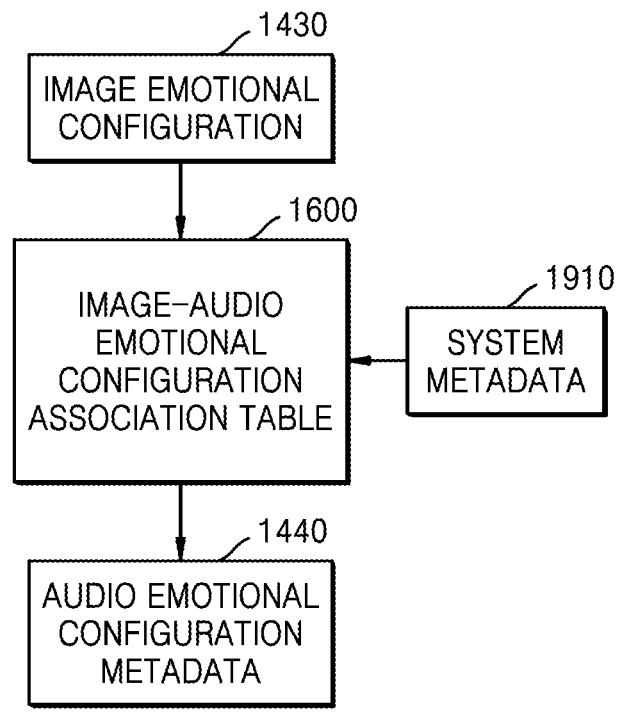

FIGS. 20A and 20B are diagrams of a method of further reflecting the system metadata 1910 on the image-audio semantic association table 1500 and the image-audio emotional configuration association table 1600, according to an embodiment.

A system shown in FIGS. 20A and 20B is identical to that shown in FIGS. 14A and 14B, except that the system metadata 1910 is further reflected to each association table.

Referring to FIGS. 20A and 20B, the system metadata 1910 may be further reflected to the image-audio semantic association table 1500, and the system metadata 1910 may be further reflected to the image-audio emotional configuration association table 1600. Accordingly, in the system shown in FIGS. 20A and 20B, the audio semantic metadata 1420 may be determined by further considering the system metadata 1910 in addition to image semantic metadata, i.e., the image semantic category/style 1410. The audio emotional configuration metadata 1440 may be determined by further considering the system metadata 1910 in addition to the image emotional configuration metadata.

Figure 21:
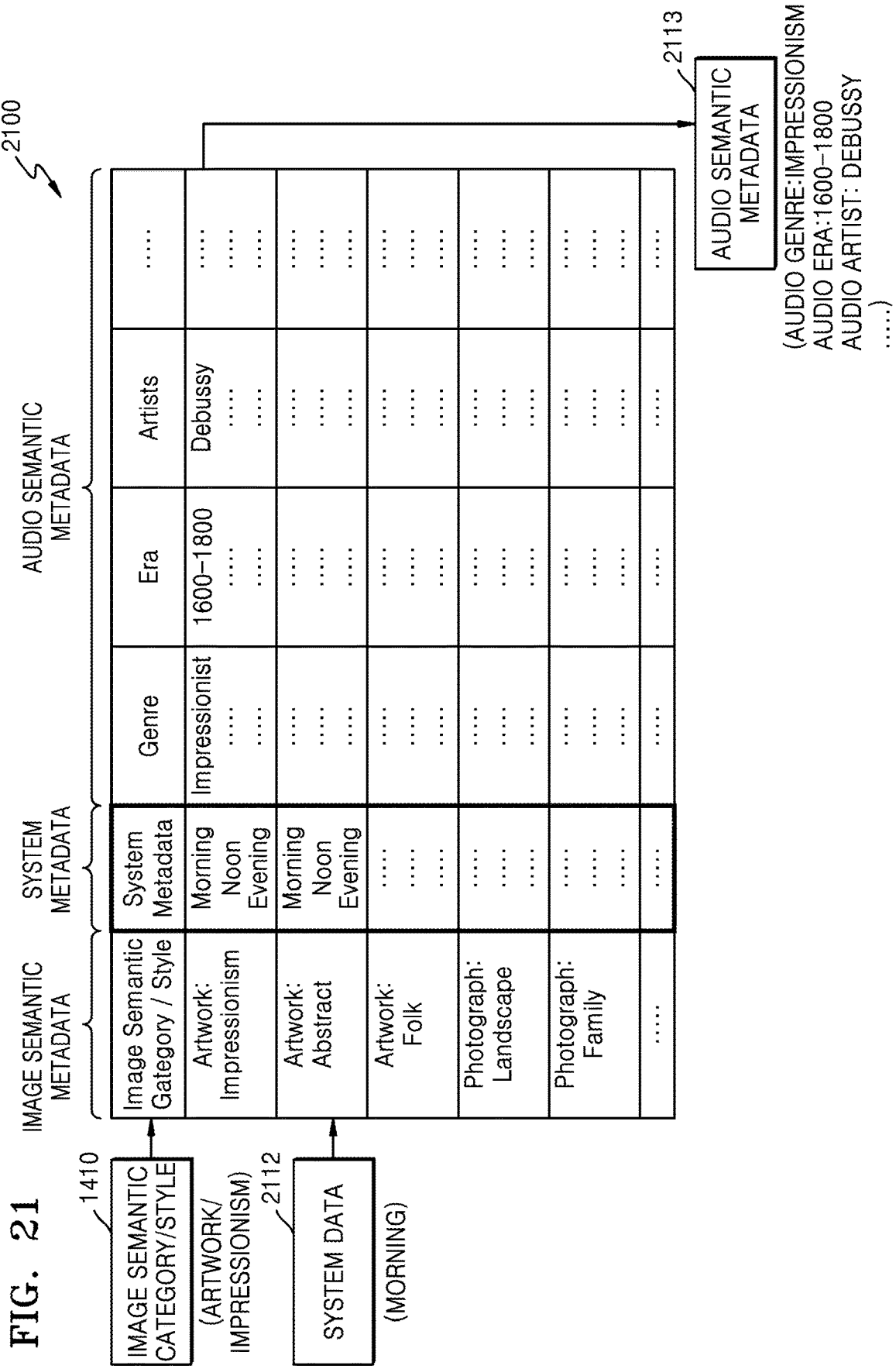
FIG. 21 illustrates an example of an image-audio semantic association table on which system metadata is reflected, according to an embodiment.

FIG. 21 illustrates an example of an image-audio semantic association table 2100 on which system metadata 1910 is reflected, according to an embodiment.

Referring to FIG. 21, the image-audio semantic association table 2100 further includes system metadata 1910 in addition to image semantic metadata and audio semantic metadata. The image semantic metadata includes an image semantic category/style, and may include, for example, whether an image is a photograph or an artwork. An image semantic style indicates a style in each category. It has been described above with reference to FIG. 10 that styles corresponding to categories of an image are different from each other. The system metadata 1910 may include, for example, time information. For example, the time information may be classified into morning, noon, and evening. The audio semantic metadata includes audio semantic metadata corresponding to each image semantic category/style and time of system metadata, such as a genre, an age, artist, and the like.

For example, when (artwork/impressionism) is obtained as image semantic category/style 1410 and (morning) is obtained as system data 2112 as a result of analyzing a feature of an image, because (genre: impressionism, era: 1600-1800, artist: Debussy, etc.) of audio semantic metadata is mapped to (artwork/impressionism) and (morning) in the image-audio semantic association table 2100, (genre: impressionism, era: 1600-1800, artiest: Debussy, etc.) may be obtained as audio semantic metadata 2113.

Figure 22:
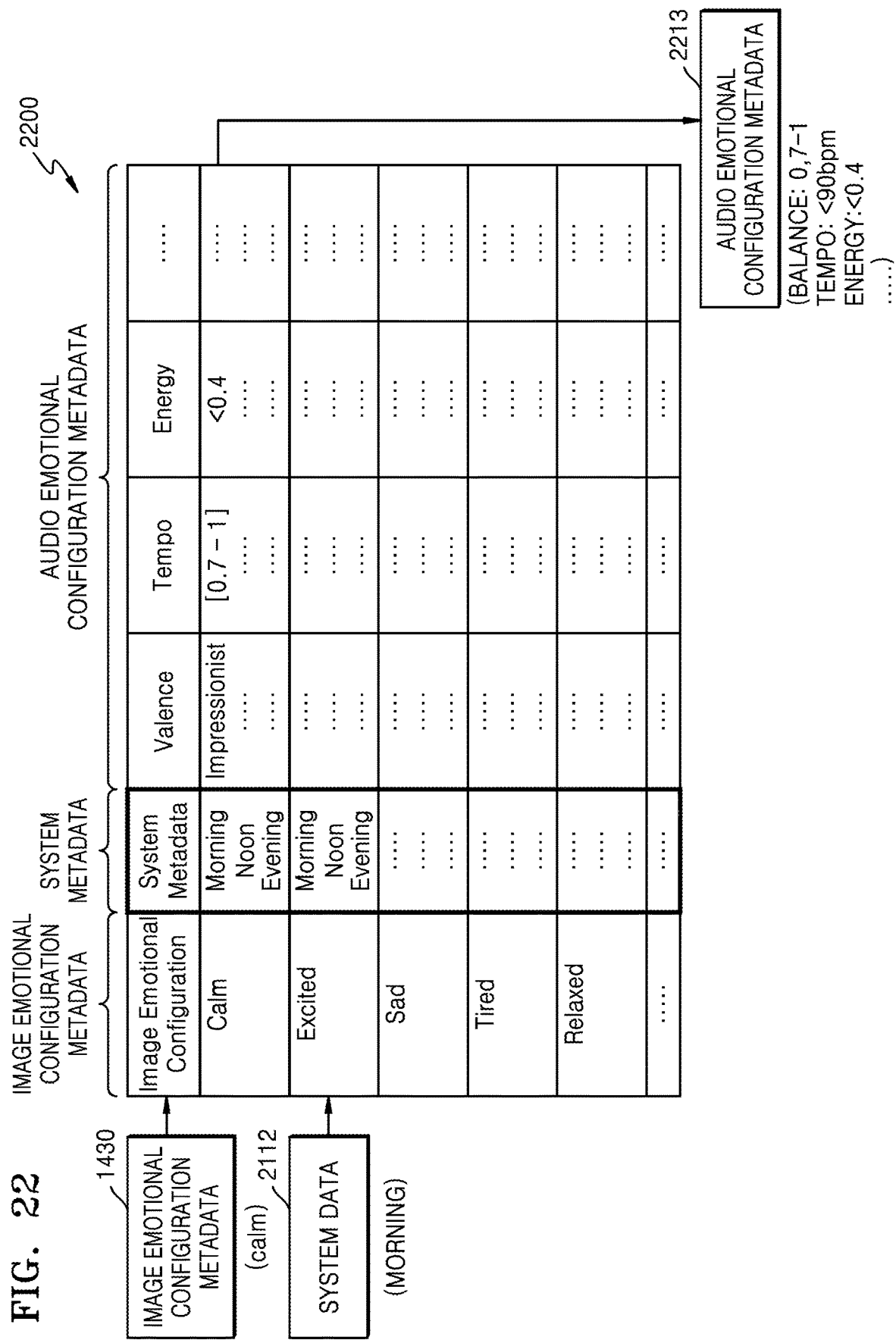
FIG. 22 illustrates an example of an image-audio emotional configuration association table on which system metadata is reflected, according to an embodiment.

FIG. 22 illustrates an example of an image-audio emotional configuration association table 2200 on which system metadata 1910 is reflected, according to an embodiment.

Referring to FIG. 22, the image-audio emotional configuration association table 2200 further includes system metadata 1910 in addition to image emotional configuration metadata and audio emotional configuration metadata. The image emotional configuration metadata may include, for example, calm, excited, sad, and the like. The system metadata 1910 may include, for example, time information. For example, the time information may be classified into morning, noon, and evening. The audio emotional configuration metadata includes audio emotional configuration metadata corresponding to each image emotional configuration metadata and time of system metadata, such as a genre, an age, artist, and the like.

For example, when (calm) is obtained as image emotional configuration 1430 as a result of analyzing a feature of an image and (morning) is obtained as system data 2112, because (calm) and (morning) is mapped to (balance: 0.7-1, tempo: <90 BPM, energy: <0.4, etc.) of audio emotional configuration metadata in the image-audio emotional configuration association table 2200, (balance: 0.7-1, tempo: <90 BPM, energy: <0.4, etc.) may be obtained as audio emotional configuration metadata 2213.

Figure 23:
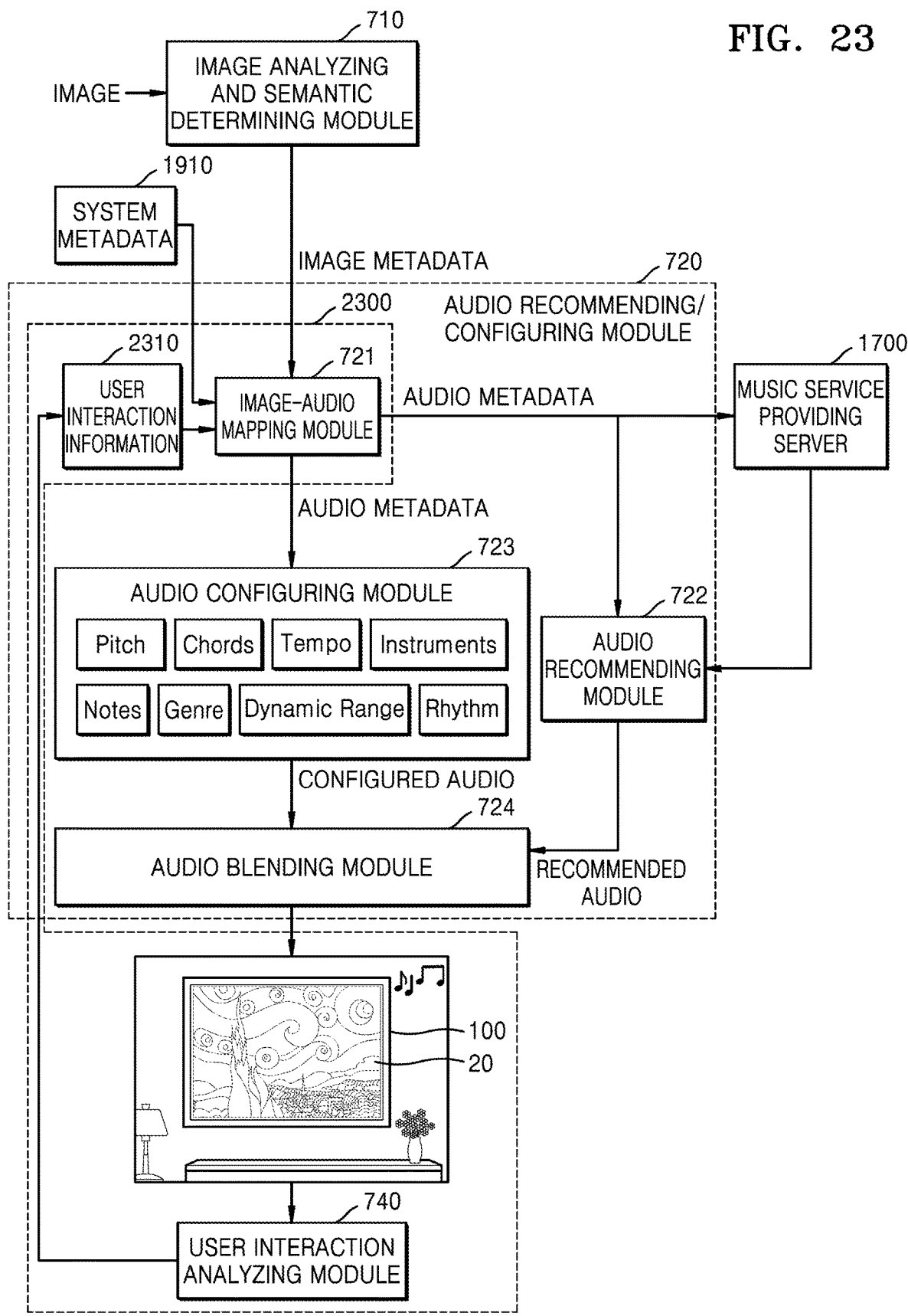
FIG. 23 is a block diagram of a method of using user interaction metadata to determine music to be output together with an image to be displayed on a display apparatus, according to an embodiment.

FIG. 23 is a block diagram of a method of using user interaction information 2310 to determine music to be output together with an image to be displayed on the display apparatus 100, according to an embodiment. The block diagram of FIG. 23 is identical to that of FIG. 19, except that the block diagram further illustrates a block 2300 for reflecting the user interaction information 2310.

A user may react to the display apparatus 100 displaying an image in an ambient mode and outputting audio by receiving the audio suitable for the image, according to his or her preference. For example, when the user like recommended music output while the image is displayed on the display apparatus 100, the user may replay the recommended music, and when the user does not like the recommended music, the user may skip and reproduce next music in a playlist. The user may manually select and reproduce music to be output together with the image displayed on the display apparatus 100. Such a reaction of the user may be reflected to a music recommending system of the display apparatus 100 to update the music recommending system, thereby personalizing the music recommending system of the display apparatus 100 to fit the user.

Referring to FIG. 23, the user interaction analyzing module 740 collects and analyzes the reaction of the user, i.e., the user interaction information 2310, with respect to the audio output while the image is displayed on the display apparatus 100. The user interaction analyzing module 740 may transmit the collected user interaction information 2310 to the image-audio mapping module 721.

The image-audio mapping module 721 may obtain audio metadata by further reflecting the user interaction information 2310 in addition to image metadata and the system metadata 1910.

As such, according to an embodiment, the user interaction information 2310 may be used to recommend music. As shown in FIG. 23, the user interaction information 2310 may be reflected to the image-audio mapping module 721. According to an embodiment, the user interaction information 2310 may be reflected to an image-audio semantic association table and an image-audio emotional configuration association table.

FIG. 24 is a diagram showing an example of a user interaction method for the display apparatus 100 outputting the image 20 and outputting music suitable for the image 20, according to an embodiment.

The user interaction method for the display apparatus 100 outputting the image 20 and outputting the music suitable for the image 20 may be variously determined.

According to an embodiment, the display apparatus 100 may receive user interaction information through the user interface 190. The user interface 190 may include, for example, a keypad or the like provided at a rear surface or the like of the display apparatus 100.

According to an embodiment, the display apparatus 100 may receive the user interaction information through the communicator 150 that receives data through a communication network. For example, the display apparatus 100 may receive the user interaction information from an external terminal via Bluetooth communication.

According to an embodiment, the display apparatus 100 may receive the user interaction information through an optical receiver 163 of the detector 160 that receives a control signal from a remote controller.

According to an embodiment, the display apparatus 100 may receive the user interaction information through the camera 162 that detects a gesture of a user.

According to an embodiment, the display apparatus 100 may receive the user interaction information through the microphone 161 that receives uttered voice of the user.

Referring to FIG. 24, the image 20 displayed on the display apparatus 100 and examples of voice control commands for controlling reproduction of music output from the display apparatus 100 are illustrated. In order to instruct an operation of an ambient mode in which the display apparatus 100 displays the image 20 and outputs music recommended for the image 20, the user may, for example, utter a voice control command, such as "dynamic mode", "activate dynamic screen", or the like. In order to instruct recommendation of music to be output with the image 20 in the ambient mode, the user may, for example, utter a voice control command, such as "play appropriate music", "play suitable music", "play matching music", or the like. In order to control the image 20 displayed in the ambient mode, the user may, for example, utter a voice control command, such as "animate image", "play cinemagraph", "animate image with music", or the like. In order to control music output in the ambient mode, the user may, for example, utter a voice control command, such as "skip music", "compose new music for the image", "blend the music", or the like.

Figure 25:
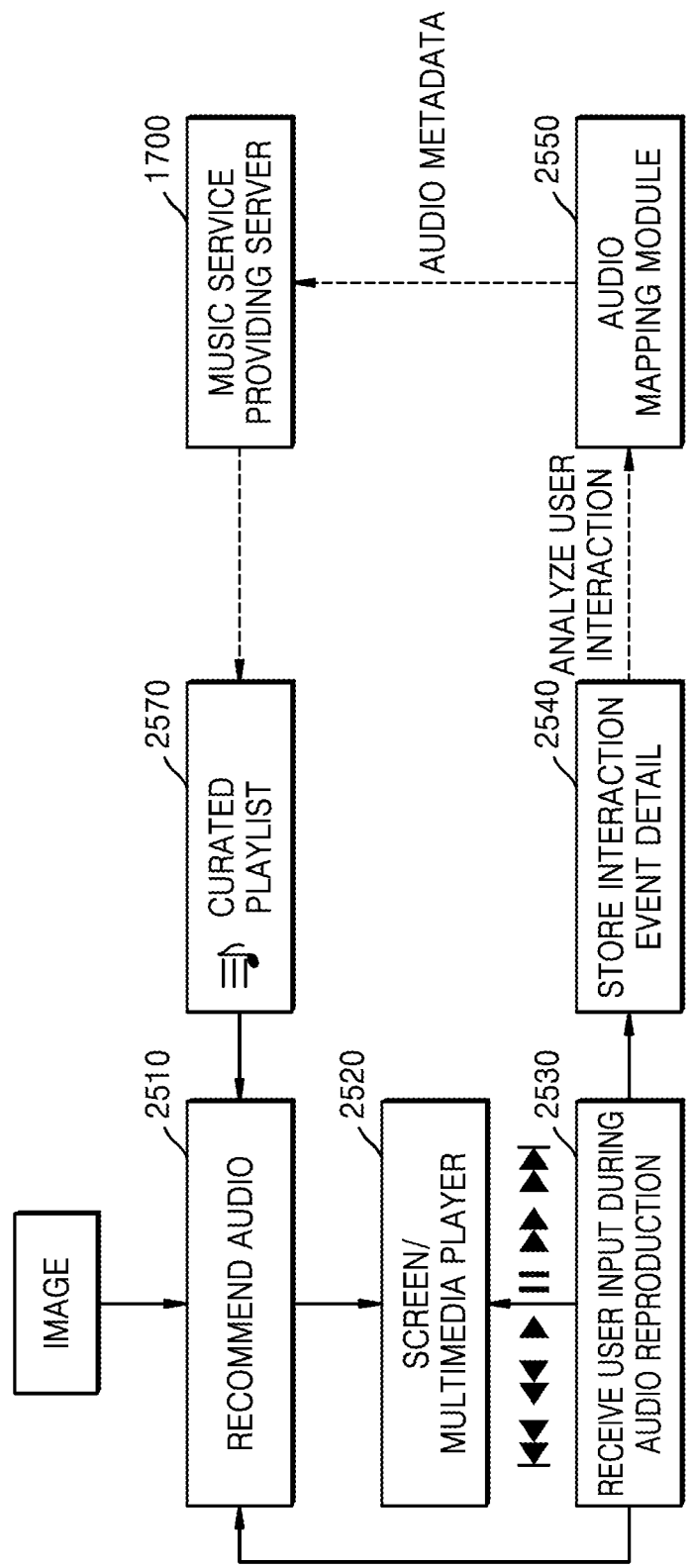
FIG. 25 is a diagram of an example of a process of reflecting user interaction in a display apparatus, according to an embodiment.

FIG. 25 is a diagram of an example of a process of reflecting user interaction in the display apparatus 100, according to an embodiment.

Referring to FIG. 25, when an image to be displayed on a display is selected, the display apparatus 100 recommends music suitable for semantic information or emotion information of the image (operation 2510) and outputs the recommended music through a screen/multimedia player 2520. The display apparatus 100 may receive a user input reacting to such output of image/audio (operation 2530).

The display apparatus 100 may store an interaction event detail (operation 2540) whenever the user input is received and analyze user interaction.

The display apparatus 100 may reflect a result of analyzing the user interaction to an audio mapping module 2550, and extract and transmit audio metadata to which user interaction information is reflected to a music service providing server 1700. The music service providing server 1700 may curate a playlist based on the received audio metadata and transmit a curated playlist 2570 to the display apparatus 100. The display apparatus 100 may recommend music based on the curated playlist 2570.

Figure 26A:
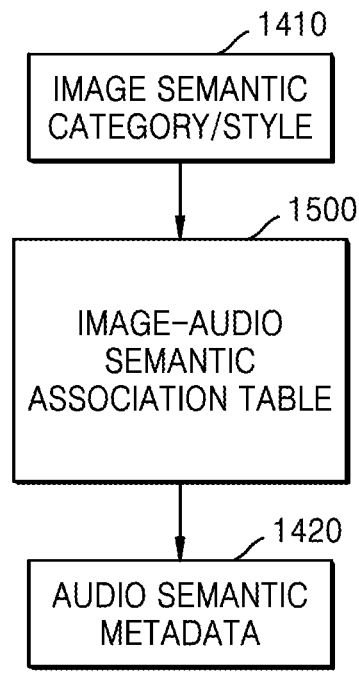
FIGS. 26A and 26B are diagrams of a method of reflecting user interaction information on an image-audio association table, according to an embodiment.
Figure 26B:
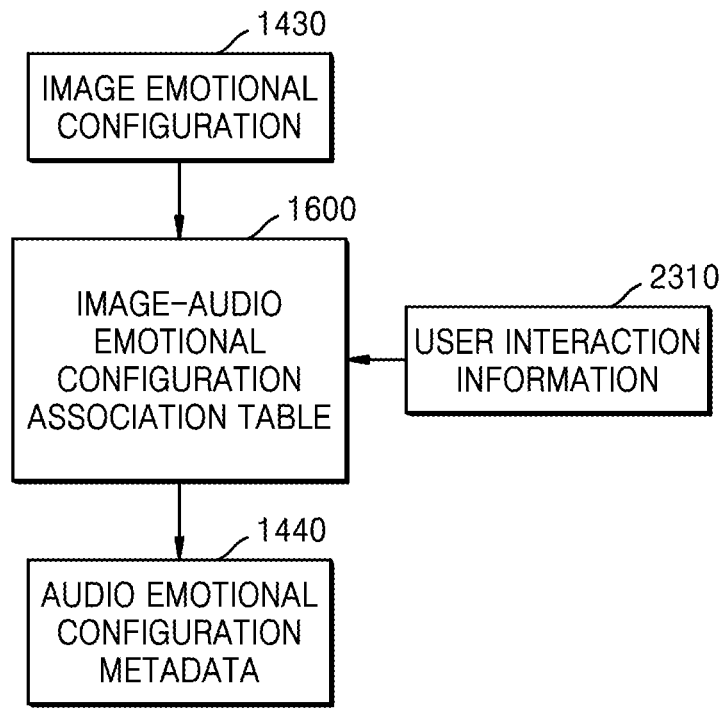

FIGS. 26A and 26B are diagrams of a method of reflecting the user interaction information 2310 on an image-audio association table, according to an embodiment.

The image-audio association table including the image-audio semantic association table 1500 and the image-audio emotional configuration association table 1600 may be personalized adaptively according to user interaction analysis. For example, when a user skips a certain type of music reproduced from the display apparatus 100 in an ambient mode, metadata of the skipped music may be replaced in the image-audio association table. Initially, a default image-audio association table may be pre-stored in the display apparatus 100, but the default image-audio association table may be personalized adaptively according to user interaction.

The user interaction information 2310 may be adaptively/continuously updated in the image-audio association table such that the image-audio association table is personalized to each user. The user interaction with a screen/multimedia player may be recorded whenever the user reproduces recommended music, replays the recommended music, or skips the recommended music. A time period from when music is reproduced may also be collected as the user interaction information 2310. Because the user likes and dislikes are estimated based on the user interaction information 2310, the image-audio association table may be personalized when the user interaction information 2310 is reflected thereto.

The image-audio association table is updated as such. For example, when the user frequently skips a certain type of music, metadata of the certain type of music may be removed from the image-audio association table.

In FIGS. 26A and 26B, it is shown that the user interaction information 2310 is reflected to only the image-audio emotional configuration association table 1600, but according to an embodiment, the user interaction information 2310 may also be reflected to the image-audio semantic association table 1500.

FIG. 27 is a diagram of a method of reflecting user interaction information on an image-audio emotional configuration association table 2700, according to an embodiment.

Referring to FIG. 27, the image-audio emotional configuration association table 2700 includes image emotional configuration metadata, system metadata 1910, and audio emotional configuration metadata. Metadata may be added or deleted to or from the image-audio emotional configuration association table 2700 according to user interaction information.

For example, when a user input of skipping first music is received in response to the display apparatus 100 outputting the first music recommended based on audio emotional configuration metadata, i.e., (balance: 0.7-1, tempo: <90 BPM, energy: <0.4, etc.), corresponding to image emotional configuration (calm) and system metadata (morning), the display apparatus 100 may delete (balance: 0.7-1, tempo: <90 BPM, energy: <0.4, etc.) that is the audio emotional configuration metadata corresponding to the skipped first music from the image-audio emotional configuration association table 2700.

For example, when second music selected by a user manually is reproduced while the display apparatus 100 displays an image, the display apparatus 100 may analyze the displayed image to obtain image emotional configuration metadata, and analyze a feature of the second music selected and reproduced by the user while the image is displayed to obtain audio emotional configuration metadata of the second music. The display apparatus 100 may add the audio emotional configuration of the second music to the image-audio emotional configuration association table 2700 accordingly to the image emotional configuration metadata. As such, the image-audio emotional configuration association table 2700 may include global information instead of personalized information in the beginning, but by receiving user interaction information as the display apparatus 100 operates and reflecting the user interaction information to the image-audio emotional configuration association table 2700, audio metadata personalized to the user using the display apparatus 100 may be extracted to further accurate suitable music recommendation.

Figure 28:
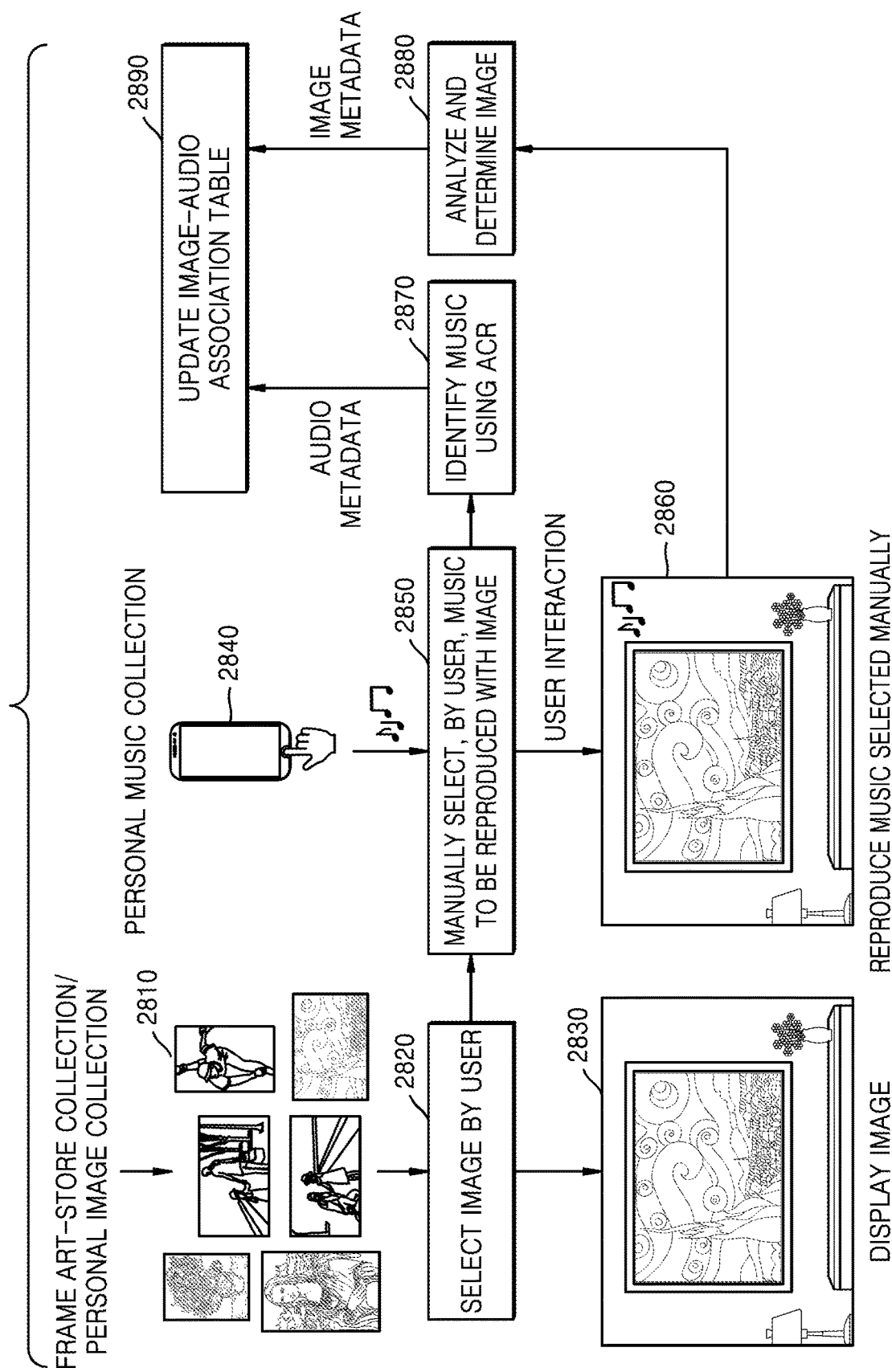
FIG. 28 is a diagram of an example of a method of dynamically updating an image-audio association table, according to an embodiment.

FIG. 28 is a diagram of an example of a method of dynamically updating an image-audio association table, according to an embodiment.

Referring to FIG. 28, a user may select one image from a frame art-store collection or a personal image collection 2810 in operation 2820, and the image selected by the user may be displayed on the display apparatus 100 in operation 2830. Also, while the selected image is displayed, the user may select music to be reproduced to from a personal music collection 2840, in operation 2850. Accordingly, the display apparatus 100 may reproduce the music selected by the user while displaying the image selected by the user, in operation 2860.

As user interaction, such as selection of the image to be displayed on the display apparatus 100 and selection of the music to be reproduced, is performed, the display apparatus 100 may extract audio metadata of the music by identifying the music using automatic content recognition (ACR), in operation 2870. The display apparatus 100 may analyze and determine the image in operation 2880 to extract image metadata of the image. Accordingly, the display apparatus 100 may update an image-audio association table in operation 2890 by using the audio metadata and the image metadata. A method of updating an association table has been described above with reference to FIG. 27.

Figure 29:
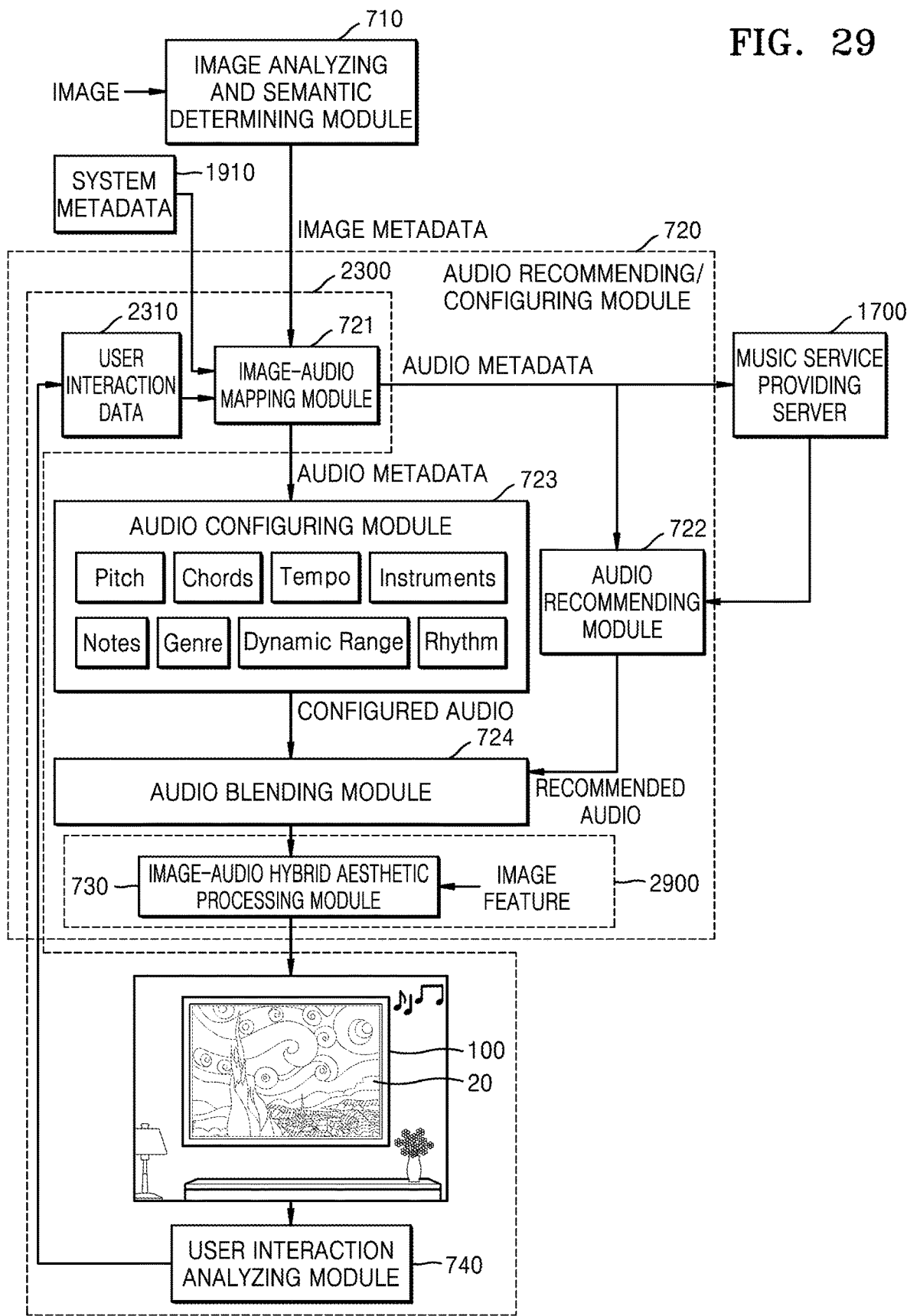
FIG. 29 is a diagram of an example of a method of performing, by a display apparatus, an aesthetic process on an image to be displayed and recommended music, according to an embodiment.

FIG. 29 is a diagram of an example of a method of performing, by the display apparatus 100, an aesthetic process on an image to be displayed and recommended music, according to an embodiment.

The block diagram of FIG. 29 is identical to that of FIG. 23, except that the block diagram of FIG. 29 further includes a block 2900 for performing the aesthetic process on the image to be displayed on the display apparatus 100 and music to be output.

Referring to FIG. 29, the image-audio hybrid aesthetic processing module 730 may perform an aesthetic multimedia process on an input image and recommended music before being rendered by a multimedia player. Such an aesthetic multimedia process may include an image process, an audio process, a hybrid image-based audio process, and a hybrid audio-based image process. Through such an aesthetic multimedia process, enhanced aesthetic experience may be provided to a user.

Figure 30A:
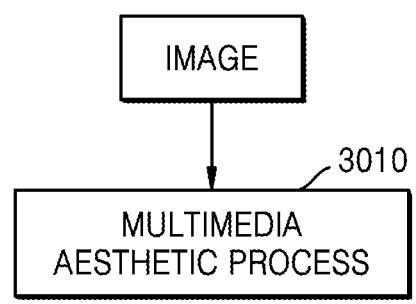
FIG. 30A is a diagram of a display apparatus, performing an aesthetic process on an image to be displayed, according to an embodiment.
Figure 30B:
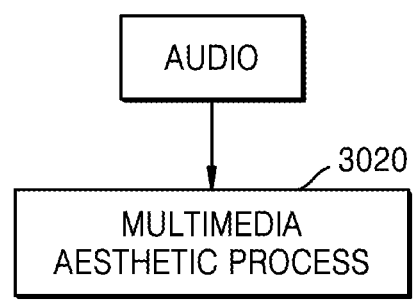
FIG. 30B is a diagram of a display apparatus, performing an aesthetic process on an audio to be output, according to an embodiment.

FIGS. 30A and 30B are diagrams of the display apparatus 100 performing an aesthetic process on an image to be displayed and recommended audio, according to an embodiment.

Referring to FIG. 30A, various types of multimedia aesthetic process 3010 may be performed on an input image to enhance aesthetic experience of a user.

Referring to FIG. 30B, various types of multimedia aesthetic process 3020 may be performed on audio. Recommended music may also be aesthetically processed. At least one signal processing technique, such as a dynamic range or adjustment of overall volume of an audio signal, may be applied to the recommended music.

In a related art apparatus, a user uploads a static image and such an image is statistically displayed. However, according to an embodiment, at least one dynamic texture is synthesized to convert an image into a cinemagraph. For example, when the user uploads a landscape image, the landscape image may be converted into a cinemagraph as if clouds were animated along repetitive texture movement and water was synthesized with texture movement like waves. Likewise, an audio may reflect a wave sound or movement. According to an image feature, different motions/animations may be automatically applied to a dynamic image to render the dynamic image.

As another example, an input image may be converted into a high resolution image via an automatic image upscaling technique. At least one aesthetical image process may be performed on an input image before the input image is transmitted to a multimedia player.

Figure 31:
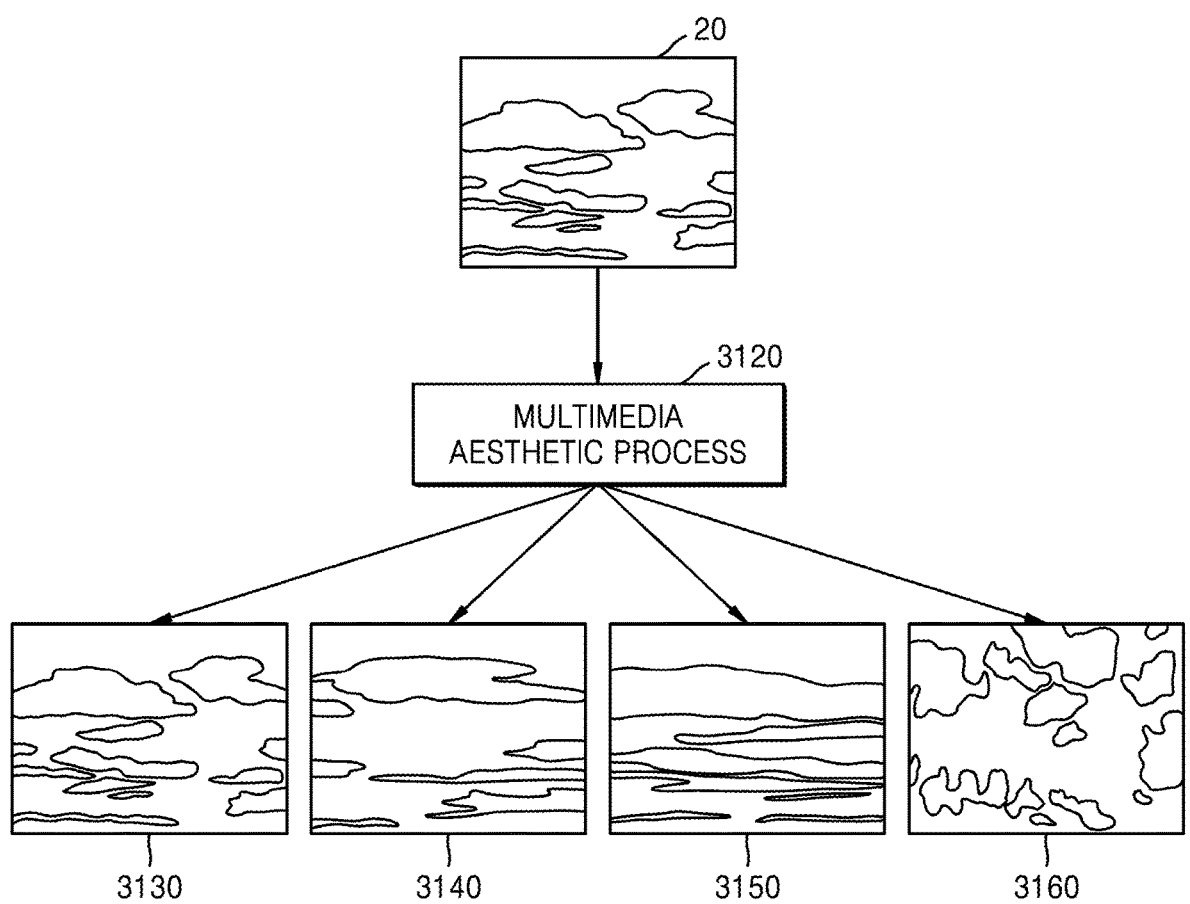
FIG. 31 is a diagram of an example of performing various multimedia aesthetic processes on an input image, according to an embodiment.

Referring to FIG. 31, an input image 20 may be converted into various types of images 3130, 3140, 3150, and 3160 via a multimedia aesthetic process 3120.

Figure 32A:
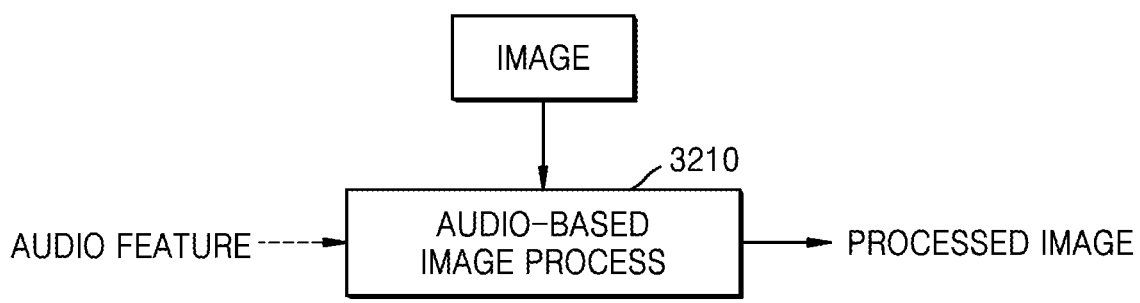
FIG. 32A is a diagram of a display apparatus, performing an image audio hybrid aesthetic process, according to an embodiment.
Figure 32B:
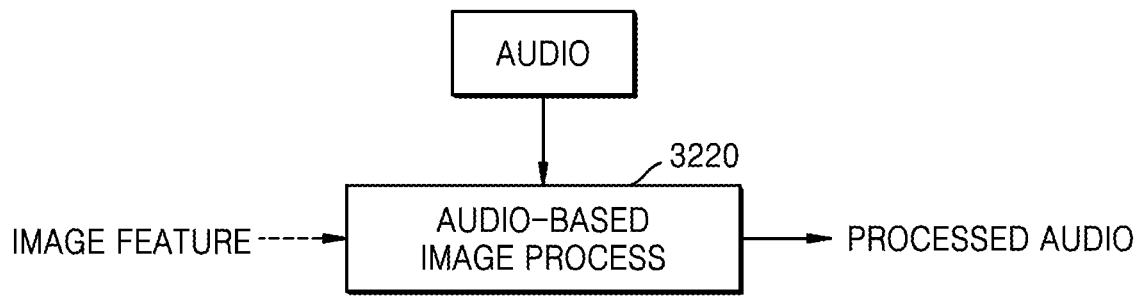
FIG. 32B is a diagram of a display apparatus, performing an image audio hybrid aesthetic process, according to an embodiment.

FIGS. 32A and 32B are diagrams of the display apparatus 100 performing an image audio hybrid aesthetic process, according to an embodiment.

A hybrid process includes a cross-domain audio-based image process and an image-based audio process. When a screen outputs recommended music together with an image, interplay between two modalities of an image and sound may provide an additional aesthetic value to a user.

FIG. 32A illustrates an example in which a processed image obtained by performing an audio-based image process 3210 on an input image by reflecting an audio feature is output.

For example, referring to FIG. 33, when a static input image 20 is converted into a cinemagraph 3320, a speed of motion texture may be synchronized with recommended music. Accordingly, matched aesthetic experience suitable for both vision and audition of a human being may be provided.

According to an embodiment, a type of motion texture applied to a cinemagraph may be based on each genre/style of music. For example, motion texture when a genre of music is classic and motion texture when a genre of music is rock may be different from each other. Also, individual objects in a cinemagraph aesthetically processed may be arranged on a screen in relation to a directional feature of sound, and such arrangement is useful particularly in a large-screen display. For example, in the case of special sound, such as ambient/nature sound, when chirping of a bird is coming from a left speaker, the bird may be located on the left in a cinemagraph. Meanwhile, when sound moves in a right direction, a corresponding object in a cinemagraph may gradually move in the right direction. In such a manner, a cinemagraph that is more natural and aesthetically appealing may be configured.

FIG. 32B illustrates an example in which processed audio obtained by performing image-based audio process 3220 on recommended audio by reflecting an image feature is output.

In a hybrid aesthetic process according to an embodiment, when an input image itself is dynamic (animated), tempo of composed music may be based on a speed of animation of the input image.

At least some of operations of outputting adaptively determined audio while displaying an image by determining or configuring the audio adaptively to the image to be displayed on the display apparatus 100 as described above may be performed by using at least one neural network.

Figure 34:
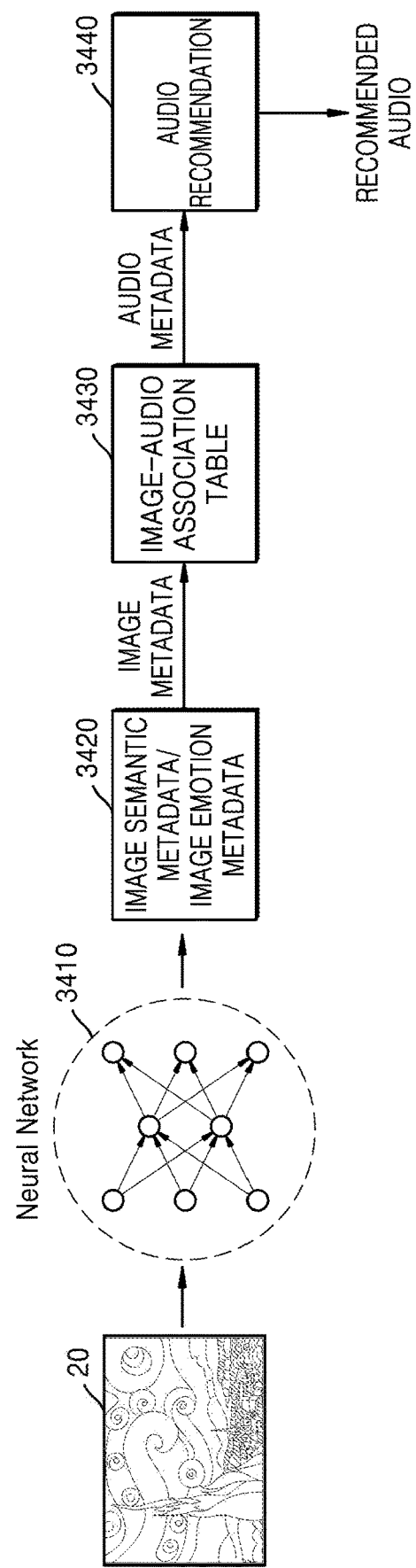
FIG. 34 illustrates an example of an operation of determining music to be output adaptively to an image to be displayed on a display apparatus, according to an embodiment.

FIG. 34 illustrates an example of an operation of determining music to be output adaptively to the image 20 to be displayed on the display apparatus 100, by using at least one neural network 3410, according to an embodiment.

Referring to FIG. 34, when the image 20 to be displayed on the display apparatus 100 is selected, the selected image 20 is input to the at least one neural network 3410, and image semantic metadata/image emotion metadata 3420 corresponding to a feature of the image 20 may be obtained from the input image 20 and the obtained image semantic metadata/image emotion metadata 3420 may be output by using the neural network 3410.

The display apparatus 100 may obtain audio metadata corresponding to the output image semantic metadata/image emotion metadata 3420 by using an image-audio association table 3430 with respect to the image semantic metadata/image emotion metadata 3420 output from the neural network 3410.

Next, the display apparatus 100 may perform audio recommendation 3440 by using the obtained audio metadata.

Figure 35:
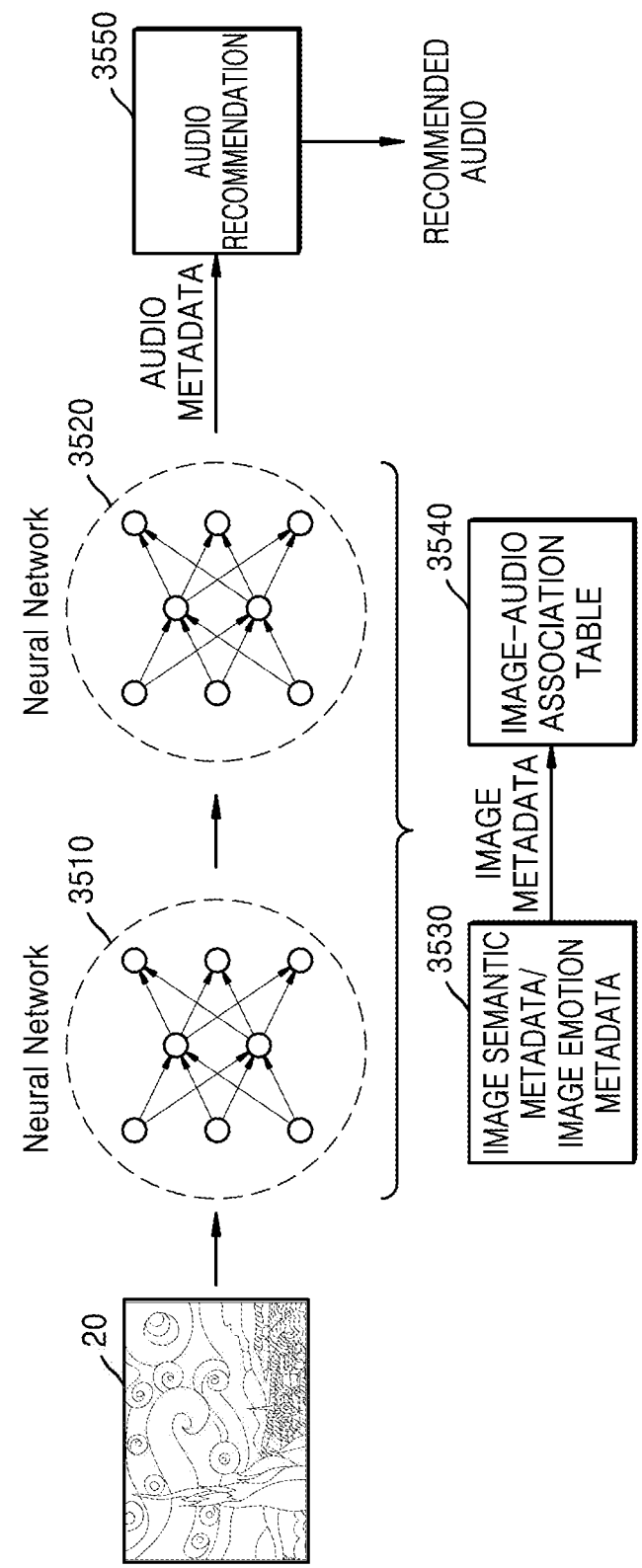
FIG. 35 illustrates an example of an operation of determining music to be output adaptively to an image to be displayed on a display apparatus, according to an embodiment.

FIG. 35 illustrates an example of an operation of determining music to be output adaptively to the image 20 to be displayed on the display apparatus 100, by using one or more among neural networks 3510 and 3520, according to an embodiment.

Referring to FIG. 35, when the image 20 to be displayed on the display apparatus 100 is selected, the selected image 20 is input to the neural network 3510, and image semantic metadata/image emotion metadata 3530 corresponding to a feature of the image 20 may be obtained from the input image 20 and the obtained image semantic metadata/image emotion metadata 3530 may be output by using the neural network 3510.

The image semantic metadata/image emotion metadata 3530 output from the neural network 3510 is input to the neural network 3520, and audio metadata corresponding to the image semantic metadata/image emotion metadata 3530 may be obtained and output by using an image-audio association table 3540 with respect to the image semantic metadata/image emotion metadata 3530 by using the neural network 3520.

Next, the display apparatus 100 may perform audio recommendation 3550 by using the obtained audio metadata.

The neural network 3510 and the neural network 3520 may be two separate independent neural networks, or may be sub-neural networks included in one neural network.

Figure 36:
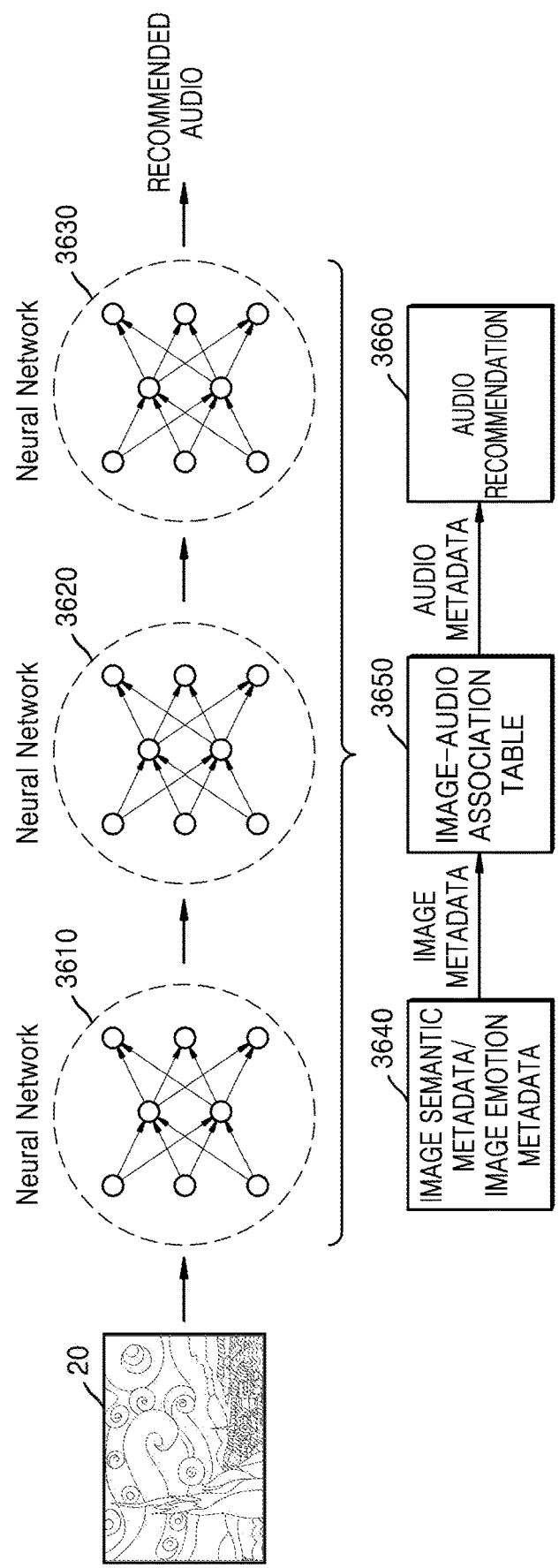
FIG. 36 illustrates an example of an operation of determining music to be output adaptively to an image to be displayed on a display apparatus, according to an embodiment.

FIG. 36 illustrates an example of an operation of determining music to be output adaptively to the image 20 to be displayed on the display apparatus 100, by using one or more among neural networks 3610, 3620, and 3630, according to an embodiment.

Referring to FIG. 36, when the image 20 to be displayed on the display apparatus 100 is selected, the selected image 20 is input to the neural network 3610, and image semantic metadata/image emotion metadata 3640 corresponding to a feature of the image 20 may be obtained from the input image 20 and the obtained image semantic metadata/image emotion metadata 3640 may be output by using the neural network 3610.

The image semantic metadata/image emotion metadata 3640 output from the neural network 3610 is input to the neural network 3620, and audio metadata corresponding to the image semantic metadata/image emotion metadata 3640 may be obtained and output by using an image-audio association table 3650 with respect to the image semantic metadata/image emotion metadata 3640 by using the neural network 3620.

The audio metadata output from the neural network 3620 is input to the neural network 3630, and recommended audio suitable for the audio metadata may be obtained 3660 and output by using the neural network 3630.

The neural networks 3610 through 3630 may be separate independent neural networks, or may be sub-neural networks included in one neural network.

Figure 37:
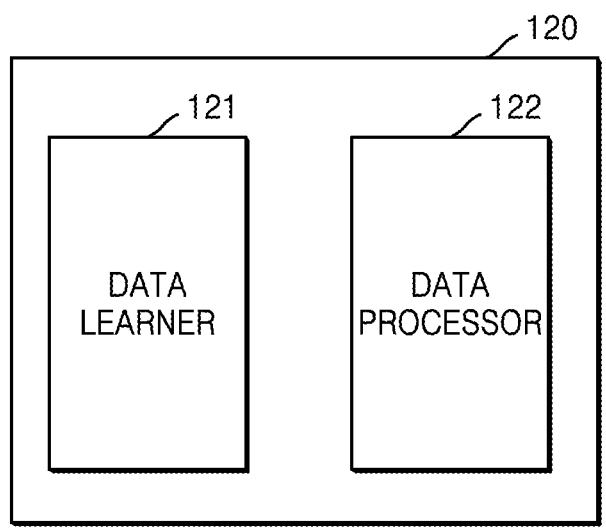
FIG. 37 is a block diagram of a configuration of a processor according to an embodiment.

FIG. 37 is a block diagram of a configuration of the processor 120 according to an embodiment.

Referring to FIG. 37, the processor 120 according to an embodiment may include a data learner 121 and a data processor 122.

The data learner 121 may learn a standard for obtaining semantic information from an image, so as to train a first neural network, according to an embodiment. The data learner 121 may learn a standard about which information (for example, feature information) of the image is used to obtain the semantic information. The data learner 121 may learn a standard about how the semantic information is to be obtained by using the feature information of the image. The data learner 121 may learn a standard for obtaining the semantic information from the image by obtaining data (for example, the image) to be used for training and applying the obtained data to a data processing model (the first neural network).

The data learner 121 may learn a standard for obtaining emotion information from the image, so as to train a second neural network, according to an embodiment. The data learner 121 may learn a standard about which information (for example, feature information) of the image is used to obtain the emotion information. The data learner 121 may learn a standard about how the emotion information is to be obtained by using the feature information of the image. The data learner 121 may learn a standard for obtaining the emotion information from the image by obtaining data (for example, the image) to be used for training and applying the obtained data to a data processing model (the second neural network).

The data learner 121 may learn a standard for determining at least one piece of audio by using the semantic information and the emotion information, so as to train a third neural network, according to an embodiment. The data learner 121 may learn a standard about how to determine the at least one piece of audio by using the semantic information and the emotion information. The data learner 121 may learn a standard for determining the at least one piece of audio by obtaining data (for example, the semantic information and the emotion information) to be used for training and applying the obtained data to a data processing model (the third neural network). Alternatively, the data learner 121 may learn a standard for determining at least one piece of audio by using audio metadata and the emotion information, so as to train the third neural network.

The data processing models (for example, the first through third neural networks) may be built in consideration of application fields of a recognition model, a purpose of learning, computer performance of an apparatus, or the like. The data processing models may be, for example, based on a neural network. For example, a model, such as a deep neural network (DNN), a recurrent neural network (RNN), or a bidirectional recurrent deep neural network (BRDNN), may be used as the data processing model, but is not limited thereto.

The data learner 121 may train the data processing models by using a training algorithm, for example, error back-propagation or gradient descent.

The data learner 121 may train the data processing models via, for example, supervised learning using training data as an input value. The data learner 121 may train the data processing models via, for example, unsupervised learning that discovers a standard for data processing by self-learning a type of data required for the data processing, without any special supervision. The data learner 121 may train the data processing models via, for example, reinforcement learning using feedback about whether a result value according to learning is correct.

Also, when the data processing models are trained, the data learner 121 may store the trained data processing models. In this case, the data learner 121 may store the trained data processing models in a memory of a display apparatus. Alternatively, the data learner 121 may store the trained data processing models in a memory of a server connected to the display apparatus via a wired or wireless network.

In this case, the memory where the trained data processing models are stored may also store, for example, a command or data related to another at least one component of the display apparatus. The memory may store software and/or a program. The program may include, for example, a kernel, middleware, an application programming interface (API) and/or an application program (or an "application").

The data processor 122 may input an image into the data processing model including the trained first neural network, and the data processing model may output semantic information corresponding to the image, as a result value. The output result value may be used to update the data processing model including the first neural network.

The data processor 122 may input the image into the data processing model including the trained second neural network, and the data processing model may output emotion information corresponding to the image, as a result value. The output result value may be used to update the data processing model including the second neural network.

The data processor 122 may input the semantic information (or the audio metadata) and the emotion information into the data processing model including the trained third neural network, and the data processing model may output information about at least one piece of audio, as a result value. The output result value may be used to update the data processing model including the third neural network.

At least one of the data learner 121 or the data processor 122 may be manufactured as at least one hardware chip and mounted on the display apparatus. For example, at least one of the data learner 121 or the data processor 122 may be manufactured as an exclusive hardware chip for AI, or may be manufactured as a part of a related art general-purpose processor (for example, central processing unit (CPU) or an application processor) or a graphics exclusive processor (for example, a graphics processing unit (GPU)) and mounted on any display apparatus described above.

The data learner 121 and the data processor 122 may be mounted on one display apparatus or on different display apparatuses. For example, one of the data learner 121 and the data processor 122 may be included in the display apparatus and the other one may be included in the server. Also, in the data learner 121 and the data processor 122, model information built by the data learner 121 may be provided to the data processor 122 and data input to the data processor 122 may be provided to the data learner 121 as additional training data, via wires or wirelessly.

At least one of the data learner 121 or the data processor 122 may be a software module. When at least one of the data learner 121 or the data processor 122 is a software module (or a program module including an instruction), the software module may be stored in a non-transitory computer-readable media. The software module may be provided by an OS or a certain application. Alternatively, a part of the software module may be provided by an OS and the remaining part may be provided by a certain application.

Figure 38:
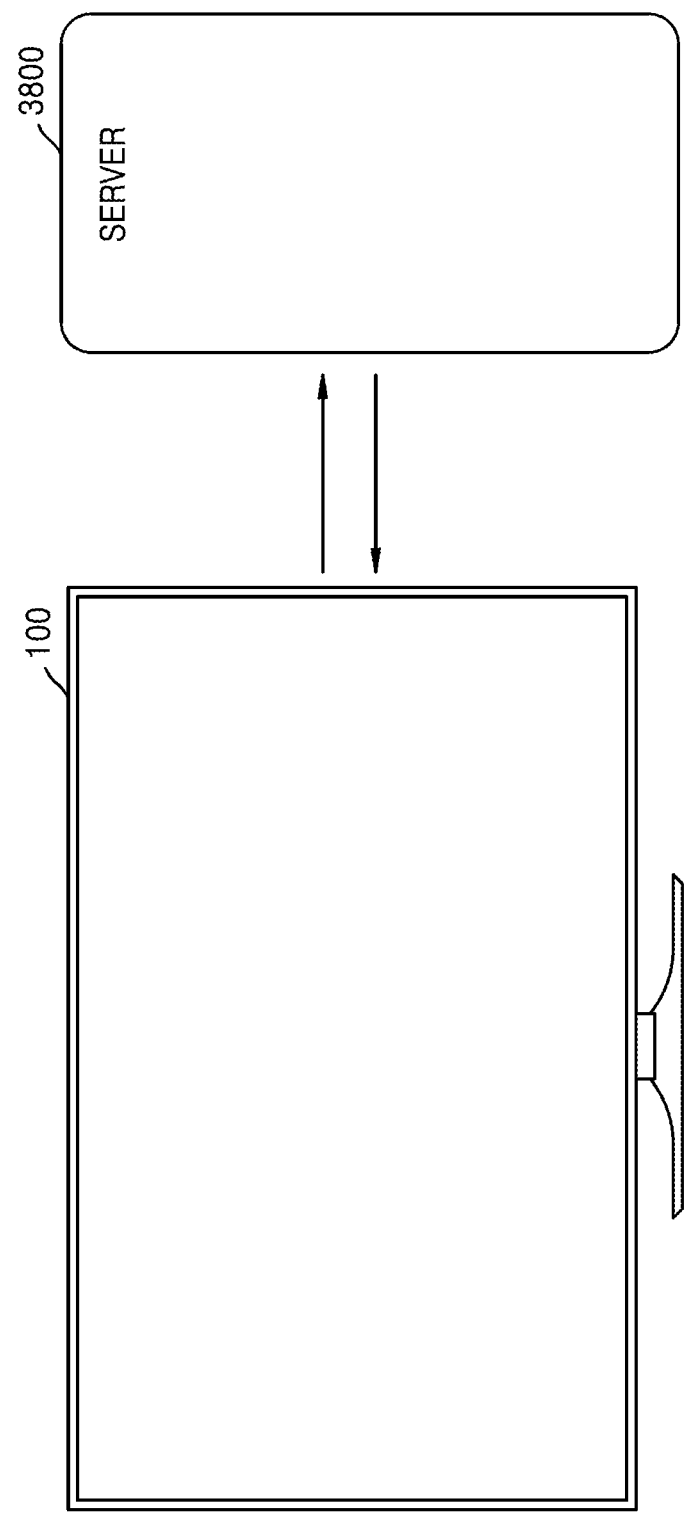
FIG. 38 is a diagram of an example in which a display apparatus and a server interwork with each other to learn and recognize data, according to an embodiment.

FIG. 38 is a diagram of an example in which the display apparatus 100 and a server 3800 interwork with each other to learn and recognize data, according to an embodiment.

Referring to FIG. 38, the server 3800 may train a first neural network by learning a standard for obtaining semantic information from an image. The server 3800 may train a second neural network by learning a standard for obtaining emotion information from the image. The server 3800 may train a third neural network by learning a standard for determining at least one piece of audio from the semantic information and the emotion information. The display apparatus 100 may obtain the semantic information from the image based on a learning result by the server 3800, obtain the emotion information from the image, and determine the at least one piece of audio from the semantic information and the emotion information.

The server 3800 may perform a function of the data learner 121 shown in FIG. 37. The server 3800 may learn a standard about which training data is to be used to obtain the semantic information from the image, a standard about which training data is to be used to obtain the emotion information from the image, and a standard about which training data is to be used to determine the at least one piece of audio from the semantic information and the emotion information. The server 3800 may learn a standard for obtaining the semantic information from the image by using data, a standard for obtaining the emotion information from the image, and a standard for determining the at least one piece of audio from the semantic information and the emotion information.

The server 3800 may train the data processing model (first neural network) used to obtain the semantic information, the data processing model (second neural network) used to obtain the emotion information from the image, and the data processing model (third neural network) used to determine the at least one piece of audio from the semantic information and the emotion information, by using training data.

The display apparatus 100 may transmit data to the server 3800 and request the server 3800 to apply and process the data to the data processing models (first through third neural networks). For example, the server 3800 may obtain the semantic information from the image, obtain the emotion information from the image, and determine the at least one piece of audio from the semantic information and the emotion information, by using the data processing models (first through third neural networks).

Alternatively, the display apparatus 100 may receive the data processing models generated by the server 3800 from the server 3800, and process data by using the received data processing models. For example, the display apparatus 100 may obtain the semantic information from the image, obtain the emotion information from the image, and determine the at least one piece of audio from the semantic information and the emotion information, by using the received data processing models (first through third neural networks).

Figure 39:
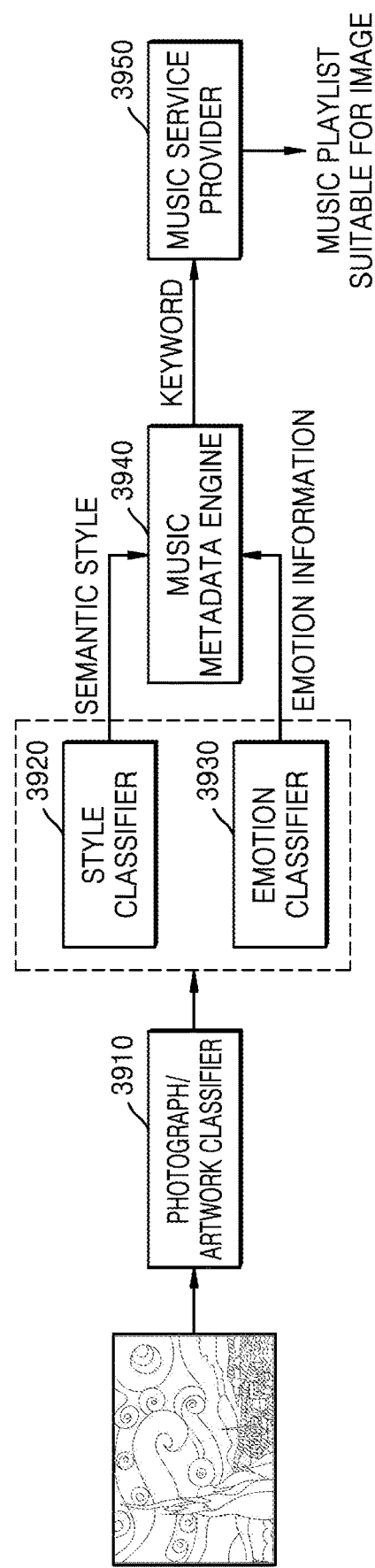
FIG. 39 is a block diagram of a system for providing a music service adaptively to an image, according to an embodiment.

FIG. 39 is a block diagram of a system for providing a music service adaptively to an image, according to an embodiment.

Referring to FIG. 39, when an image is input, a photograph/artwork classifier 3910 may classify whether the image is a photograph or an artwork.

A style classifier 3920 may classify a style of the image that has been classified as the artwork or the photograph.

An emotion classifier 3930 may classify emotion of the image as, for example, valence or arousal. The emotion classifier 3930 may classify emotion for each of the artwork and the photograph.

A music metadata engine 3940 may receive a semantic style from the style classifier 3920 and receive emotion information from the emotion classifier 3930, and extract music metadata corresponding to the semantic style and the emotion information.

A music service provider 3950 may receive the music metadata or a keyword from the music metadata engine 3940, and extract and provide a music playlist corresponding to the music metadata.

In FIG. 39, the photograph/artwork classifier 3910, the style classifier 3920, and the emotion classifier 3930 may use a neural network to classify the received image. Models of the neural network may include, for example, CNN, ResNet, Mobilenet, VGGNet, AlexNet, and the like. However, the models listed above are only examples, and any network model capable of receiving and classifying an image according to a purpose may be used.

Figure 40A:
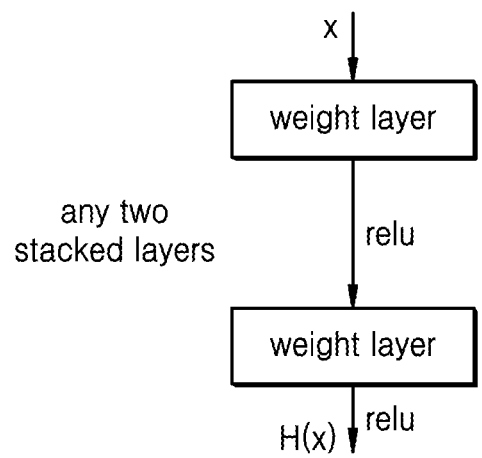
FIG. 40A is a diagram of a portion of a related art convolution neural network.
Figure 40B:
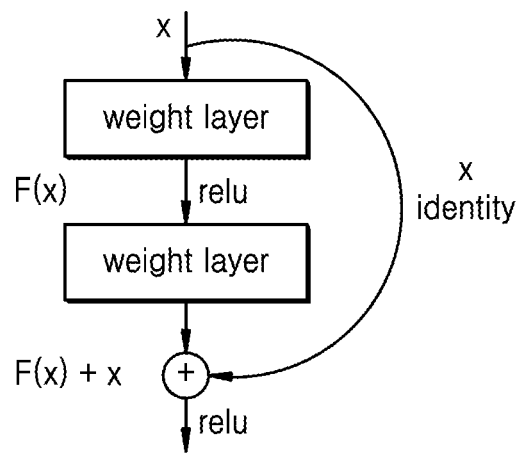
FIG. 40B is a diagram illustrating residual learning according to an embodiment.

FIGS. 40A and 40B are diagrams illustrating residual learning according to an embodiment.

In general, a learning effect is expected to be improved when the number of layers is increased. However, in practice, when a layer is deepened, it becomes more and more difficult to train a network such that the network obtains a good result. One of the causes is that, when a CNN updates a parameter, a gradient value is saturated with a too large value or a small value and thus no longer moves, thereby eliminating the learning effect or slowing down a learning speed. The other cause is that, when a network is deepened, the number of parameters is increased proportionally, thereby increasing errors. In this regard, a method called residual learning has been suggested.

FIG. 40A illustrates a related art CNN. The goal of the related art CNN network is to obtain an optimal H(x) via learning by receiving an input x and outputting an output H(x) through two weight layers, and thus, a parameter value of the weight layer may be determined such that an optimal H(x) is obtained.

However, when a target of the CNN is changed from obtaining H(x) to obtaining H(x)−x, i.e., when the CNN is trained to obtain a difference between the output and the input, the two weight layers may be trained to obtain H(x)−x. Here, when F(x)=H(x)−x, then H(x)=F(x)+x. Accordingly, the diagram of FIG. 40A is changed to that of FIG. 40B. As such, unlike the related art CNN, the residual learning provides a shortcut connection directly from an input to an output. Because such a shortcut connection has a structure in which the input and the output are directly connected without a parameter, a calculation amount to which only addition is added in terms of throughput is required. In the past, training is performed to obtain H(x), but now, training is performed to obtain H(x)−x, and because F(x) should be 0 in an optimal case, a training direction is pre-determined to function as pre-conditioning. When training is performed in a direction in which F(x) becomes almost 0, small movement of the input may be easily detected. Also, because the input, such as x, is directly connected to the output, there is no effect on the number of parameters and no increase in throughput via the shortcut connection, except that addition is increased. Also, because the input and the output are connected by skipping several layers, a forward or backward path become simplified. As such, in the residual learning, even a deep network may be optimized via shortcut connection, and accuracy may be increased due to an increased depth.

Such residual learning, for example, a residual network-50 (ResNet50) model may be used for training in an exemplary embodiment.

Figure 41:
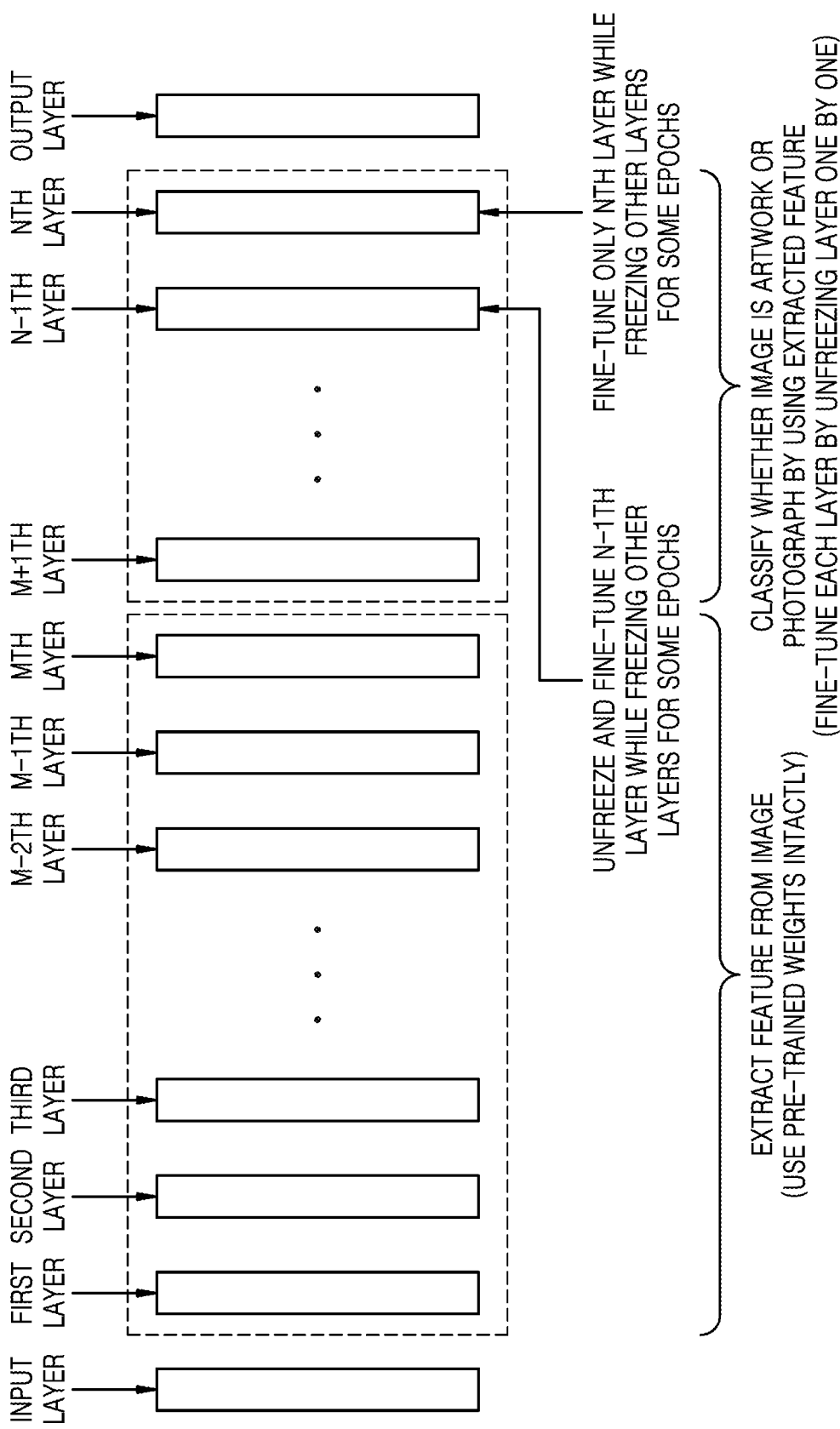
FIG. 41 is a block diagram illustrating fine tuning of a residual network-50 model, according to an embodiment.

FIG. 41 is a block diagram illustrating fine tuning of a ResNet50 model, according to an embodiment.

A neural network according to embodiments may use, for example, an ResNet50 model.

Referring to FIG. 41, the ResNet50 model may include an input layer, a plurality of hidden layers, and an output layer. In order to train the ResNet50 model, a parameter or a weight used in the plurality of hidden layers is trained. Because some of the plurality of hidden layers, which extract a feature from an input image, i.e., from a first layer to an Mth layer, may be used intact, a pre-trained weight of the first layer to the Mth layer may be used intact.

Some of the plurality of hidden layers, which classify, for example, whether the image is an artwork or a photograph by using the extracted feature, i.e., from an M+1th layer to an Nth layer, may perform fine tuning while unfreezing layers one by one for such classification.

For example, the ResNet50 model may be trained by freezing all layers, and then only the last layer may be fine-tuned for 2 or 3 epochs. Then, the layers may be unfroze one by one from the very last of the ResNet50 model. One additional convolution layer is unfroze at a time, and the additional convolution layer may be fine-tuned for 1 or 2 epochs.

For example, referring to FIG. 41, only the last Nth layer is fine-tuned while the other layers are all frozen for first some epochs. Then, the N−1th layer is unfrozen and fine-tuned while the other layers are all frozen for next some epochs. As such, fine-tuning may be performed by unfreezing one layer at a time.

Such a procedure may be repeated in 5 to 10 convolution layers, and early stopping may be used for model convergence.

Also, data augmentation may be used during training to prevent overfitting. Horizontal image flip, zoom, or rotation may be used as the data augmentation.

Also, stochastic gradient descent with warm restarts (SGDR) may be used as a learning rate policy in the entire ResNet50 model.

A Resnet50 architecture is used for training according to embodiments, and the Resnet50 architecture is initialized to a trained weight of an ImageNet data set. The last layer (including 1000 unit) of the ResNet50 may be removed and replaced by a softmax layer.

The softmax layer replacing the last layer according to an embodiment may include two units to classify whether an image is an artwork or a photograph.

The softmax layer replacing the last layer according to an embodiment may include two units to classify emotion of valence and arousal.

The softmax layer replacing the last layer according to an embodiment may include the number of units equal to the number n of styles to classify a style of an artwork.

Figure 42:
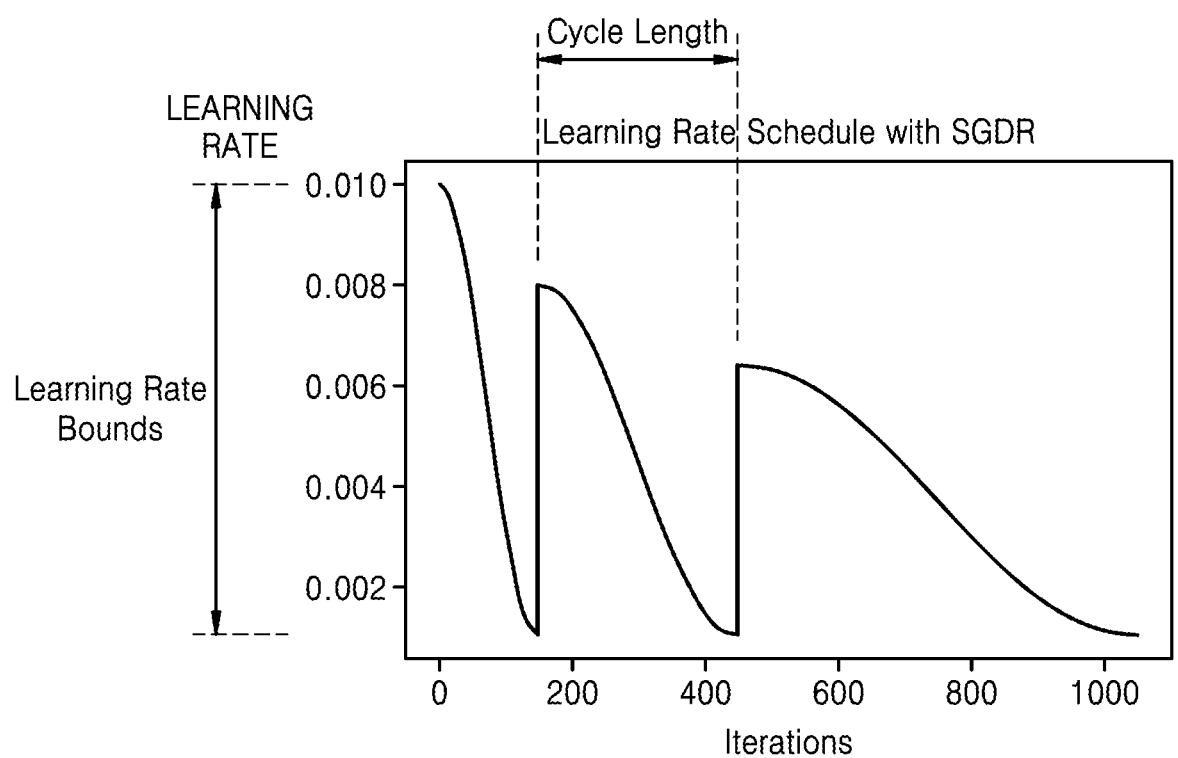
FIG. 42 is a diagram illustrating learning rate schedule according to stochastic gradient descent with warm restarts, according to an embodiment.

FIG. 42 is a diagram illustrating learning rate schedule according to SGDR, according to an embodiment.

In order to build a neural network model, a hypothesis H, a cost C, and a gradient descent algorithm G need to be commonly found. An operation of predicting an actual value needs to be performed by developing the hypothesis H of a machine model, measuring a difference (the cost C) between the hypothesis H and actual data, and minimizing the difference via the gradient descent algorithm G. In order to increase prediction, the difference needs to be minimized.

In a cost function, H(x) may be obtained via an equation.

To obtain a value that minimizes the cost function, the gradient descent algorithm G is used to find a minimum point of a graph, and a learning rate may be used as a concept of a step for finding the minimum point. When the learning rate is too large, an overshooting phenomenon in which the minimum point is past to an opposite side may occur, and when the learning rate is too small, it may take a long time to find the minimum point. Thus, setting an appropriate learning rate is essential.

For example, the hyper parameter that may be tuned to train a DNN is the learning rate.

A neural network includes parameters that need to be trained to accomplish a certain task. Training parameters mean finding and setting appropriate values therein, so that the training parameters minimize a loss function with each batch of training.

Typically seen in SGD, a single learning rate is set at the beginning of the training, and a learning rate decay strategy is set. This single learning rate is used to update all parameters. The single learning rate is gradually decayed with each epoch with the assumption a speed needs to be reduced to prevent overshooting when a desired minimum value is reached. However, it may be difficult to choose an initial learning rate, to set a learning rate update mechanism to decay the learning rate over time, and to apply the same learning rate to all parameters.

In this regard, a method of setting a cyclic learning rate without having to experimentally find such a learning rate has been suggested. Such a method reduces the learning rate monotonically, but periodically changes the learning rate between reasonable boundary values. Training with a periodic learning rate rather than a fixed value may improve classification accuracy with less iterations without having to perform tuning.

A cyclic learning rate and SGDR may be used as a learning rate policy with respect to models. An optimal bound of the learning rate may be calculated for each data set. During training, the learning rate periodically changes between a lower bound and an upper bound. Also, learning rate decay (generally 0.8 or 0.9) is employed between cycles while increasing a cycle length in continuous cycles. A learning rate schedule according to an embodiment is shown in FIG. 42. Such a strategy enables faster and more accurate model training. A rapid jump from the lower bound to the upper bound in the learning rate enables a model not to be held in a local minima, thereby enabling better model convergence.

FIG. 42 illustrates the learning rate schedule using SGDR. The learning rate periodically changes between boundaries found via a cyclic learning rate (CLR) strategy. The maximum learning rate is reduced by a decay factor in each of continuous cycles. The cycle length increases as the model approaches convergence.

According to various embodiments, the aesthetic experience of a user may be maximized by providing audio adaptively to an image when the image is displayed by a display apparatus.

According to various embodiments, audio may be accurately recommended by classifying a category of an image to be displayed on a display apparatus and determining a semantic style according to the category to elaborately analyze the image.

According to various embodiments, audio may be accurately recommended by reflecting an image, and an environmental element, by considering system metadata while determining the audio output together with the image to be displayed on a display apparatus.

According to various embodiments, a personalized system may be built by reflecting user preference by considering user interaction information while determining audio output with an image to be displayed on a display apparatus.

An operating method of a display apparatus, according to an embodiment, may be recorded on a computer-readable recording medium by being realized in computer program commands that can be executed by using various computers. The computer-readable recording medium may include at least one of a program command, a data file, or a data structure. The program commands recorded in the computer-readable recording medium may be specifically designed or known to one of ordinary skill in the computer software field. Examples of the computer-readable recording medium include hardware devices specially configured to store and perform program commands, such as magnetic media like a hard disk, a floppy disk, and a magnetic tape, optical media like CD-ROM and DVD, magneto-optical media like a floptical disk, and ROM, RAM, and a flash memory. Examples of the computer command include mechanical codes prepared by a compiler, and high-level languages executable by a computer by using an interpreter.

While the embodiments have been described in detail, it will be understood by those of ordinary skill in the art that various changes in form and details may be made therein without departing from the spirit and scope of the disclosure as defined by the following claims.

What is claimed is:

1. A display apparatus comprising:
a display;
a memory configured to store one or more instructions; and
a processor configured to execute the one or more instructions to:
select an image to be displayed on the display;
classify a category of the image by determining whether the category of the image is one of a photograph or an artwork based on a feature of the image;
based on the category of the image being the photograph, obtain semantic information by determining at least one first semantic style among a first plurality of semantic styles corresponding to the photograph;
based on the category of the image being the artwork, obtain the semantic information by determining at least one second semantic style among a second plurality of semantic styles corresponding to the artwork;
obtain emotion information corresponding to the image by analyzing the image;
determine an audio to be output together with the image, based on the semantic information of the image and the emotion information corresponding to the image; and
output the audio while displaying the image.

2. The display apparatus of claim 1, wherein the processor is further configured to execute the one or more instructions to:
obtain audio semantic metadata corresponding to the semantic information of the image by using a metadata table corresponding to the semantic information of the image;
obtain audio emotion metadata corresponding to the emotion information of the image by using a metadata table corresponding to the emotion information of the image; and
determine the audio to be output together with the image, based on the audio semantic metadata and the audio emotion metadata.

3. The display apparatus of claim 2, wherein the processor is further configured to execute the one or more instructions to:
transmit the audio semantic metadata and the audio emotion metadata to a music service providing server; and
receive the audio determined based on the audio semantic metadata and the audio emotion metadata from the music service providing server.

4. The display apparatus of claim 2, wherein the processor is further configured to execute the one or more instructions to:
configure a sound based on the audio semantic metadata and the audio emotion metadata; and
blend the configured sound with the audio.

5. The display apparatus of claim 2, wherein the processor is further configured to execute the one or more instructions to:
obtain user interaction information related to a reaction of a user to the image displayed on the display and the audio output with the image; and update at least one of the metadata table corresponding to the semantic information or the metadata table corresponding to the emotion information based on the user interaction information.

6. The display apparatus of claim 2, wherein the processor is further configured to execute the one or more instructions to:
receive a manual selection of a user with respect to the audio to be output together with the image;
extract metadata of the audio manually selected by the user; and
update at least one of the metadata table corresponding to the semantic information or the metadata table corresponding to the emotion information by using metadata of the image and the metadata of the audio manually selected with respect to the image.

7. The display apparatus of claim 1, wherein the processor is further configured to execute the one or more instructions to:
obtain system metadata comprising environment information around the display apparatus; and
determine the audio based on the system metadata together with the semantic information and the emotion information.

8. The display apparatus of claim 7, wherein the system metadata comprises at least one of a place where the display apparatus is installed, a weather at the place where the display apparatus is installed, or a time when the image is output.

9. The display apparatus of claim 1, wherein the processor is further configured to execute the one or more instructions to:
obtain user interaction information related to a reaction of a user to the image displayed on the display and the audio output with the image; and
update the output audio based on the user interaction information.

10. The display apparatus of claim 1, wherein the processor is further configured to execute the one or more instructions to:
extract a feature of the image and process the audio based on the extracted feature of the image, or extract a feature of the audio and process the image based on the extracted feature of the audio.

11. An operating method of a display apparatus, the operating method comprising:
selecting an image to be displayed on a display of the display apparatus;
by using at least one neural network, classifying a category of the image by determining whether the category of the image is one of a photograph or an artwork based on a feature of the image;
based on the category of the image being the photograph, obtaining semantic information by determining at least one first semantic style among a first plurality of semantic styles corresponding to the photograph;
based on the category of the image being the artwork, obtaining the semantic information by determining at least one second semantic style among a second plurality of semantic styles corresponding to the artwork;
obtaining emotion information corresponding to the image by analyzing the image;
determining an audio to be output together with the image, based on the semantic information of the image and the emotion information corresponding to the image; and
outputting the audio while displaying the image.

12. The operating method of claim 11, further comprising:
based on a first pre-stored table in which the first plurality of semantic styles of the artwork and the second plurality of semantic styles of the photograph are respectively mapped to a preset plurality of audio semantic metadata, obtaining audio semantic metadata by matching one of the at least one first semantic style of the photograph or the at least one second semantic style of the artwork to the preset plurality of audio semantic metadata;
based on a second pre-stored table in which a plurality of preset emotions is respectively mapped to a plurality of preset audio emotional configurations, obtaining audio emotion metadata by matching the emotion information of the one of the artwork or the photograph to the plurality of preset audio emotional configurations; and
determining the audio to be output together with the image based on the audio semantic metadata and the audio emotion metadata.

13. The operating method of claim 12, further comprising:
transmitting the audio semantic metadata and the audio emotion metadata to a music service providing server; and
receiving the audio determined based on the audio semantic metadata and the audio emotion metadata from the music service providing server.

14. The operating method of claim 12, further comprising:
obtaining user interaction information related to a reaction of a user to the image displayed on the display and the audio output with the image; and
updating at least one of a metadata table corresponding to the semantic information or a metadata table corresponding to the emotion information based on the user interaction information.

15. The operating method of claim 11, further comprising:
obtaining system metadata comprising environment information around the display apparatus,
wherein the determining the audio further comprises determining the audio based on the system metadata together with the semantic information and the emotion information.

16. The operating method of claim 11, further comprising:
obtaining user interaction information related to a reaction of a user to the image displayed on the display and the audio output with the image; and
updating the output audio based on the user interaction information.

17. The operating method of claim 11, wherein
the first plurality of semantic styles comprises at least two of an event, a person, a landmark, or a landscape, and
the second plurality of semantic styles comprises at least two of a creation year, an artistic movement, a genre, and a media.

18. A computer program product comprising a computer-readable recording medium having recorded thereon a program which, when executed by a processor of a display apparatus, causes the processor to execute a method including:
selecting an image to be displayed on a display of the display apparatus;
by using at least one neural network, classifying a category of the image, by determining whether the category of the image is one of a photograph or an artwork based on a feature of the image;
based on the category of the image being the photograph, obtaining semantic information by determining at least one first semantic style among a first plurality of semantic styles corresponding to the photograph;

based on the category of the image being the artwork, obtaining the semantic information by determining at least one second semantic style among a second plurality of semantic styles corresponding to the artwork;

obtaining emotion information corresponding to the image by analyzing the image;

determining an audio to be output together with the image, based on the semantic information of the image and the emotion information corresponding to the image; and outputting the audio while displaying the image.

\* \* \* \* \*